United States Patent [19]
Ames et al.

[11] Patent Number: 6,151,567
[45] Date of Patent: Nov. 21, 2000

[54] DATA COMMUNICATION ANALYSIS AND SIMULATION TOOL

[75] Inventors: Arnold A. Ames, Pecatonica; Charles H. Gooden, Rockford; Donald P. Krakauskas, Winnebago; Vinod George, Rockford, all of Ill.

[73] Assignee: Hamilton Sundstrand Corporation, Rockford, Ill.

[21] Appl. No.: 08/250,139

[22] Filed: May 27, 1994

[51] Int. Cl.$^7$ ....................................................... G06F 3/00
[52] U.S. Cl. ............................................. 703/13; 709/230
[58] Field of Search ........................ 364/424.04, 431.01; 395/500, 375; 705/13; 709/230

[56] References Cited

U.S. PATENT DOCUMENTS

| | | |
|---|---|---|
| 4,841,456 | 6/1989 | Hogan, Jr. et al. . |
| 5,019,980 | 5/1991 | Starr et al. . |
| 5,023,791 | 6/1991 | Herzberg et al. . |
| 5,111,402 | 5/1992 | Brooks et al. . |
| 5,222,402 | 6/1993 | Brooks et al. . |
| 5,260,874 | 11/1993 | Berner et al. . |

Primary Examiner—Zarni Maung
Attorney, Agent, or Firm—Jeffrey J. Makeever

[57] ABSTRACT

A data communication analysis and simulation tool capable of simulating in real time the transmissions and data responses of at least one line replaceable unit communicating on at least one communication bus with at least one line replaceable unit under test, comprising a computer operating under a real time operating system and having available memory and means for accepting user input, and a programmed simulator resident in said computer comprising a plurality of processes to effectuate the simulation of the transmissions and data responses of at least one line replaceable unit. The programmed simulator allocates a portion of the available memory as a shared memory segment serving as a central database and supporting inter-process communication. The programmed simulator further generates graphical and textural images in response to communicated data from the line replaceable unit under test and user input to a monitor coupled to the computer. The programmed simulator inputs digital and analog inputs and updates the data transmissions in real time, inputs communication data and outputs digital outputs in real time, and maintains data validity and freshness in real time. It allows entry of named engineering unit data to be transmitted and displays received data in engineering units. The simulator is automatically configured for transmission from user defined text file simplifying adaptation. Further, the simulator allows user defined configuration and monitor conditions to be inputed and saved by the user.

20 Claims, 76 Drawing Sheets

| REFRESH CONTROL | | | | | |
|---|---|---|---|---|---|
| TURN ON | | | TURN OFF | | |
| BUS | LRU | LABL | BUS | LRU | LABL |
| RT | LRU5 | 5500 | LT | LRU1 | 1100 |
| RT | LRU6 | 6600 | LT | LRU2 | 2200 |
| RT | LRU7 | 7700 | LT | LRU3 | 3300 |

~572

| OK | CANCEL |
|---|---|

FIG. 28

```
BUS_NUM: 1 <LT> CID:    5 LABEL:  500  WORD_NUM: 2 PARAM_NAME: Label 500 Fresh
COND_TYPE:   freshness  TRIP_IF:  not_fresh BITSPEC: 1111XXXXXXXXXXXX
MAX_UPDATE:  40 RAWVAL: 9502 hex TSTAMP:    3040782.139 BUS_DELTA:  0.000 ms
FILE_CNT: 1  STORE_MODE: all FILE_LIMIT: 1000 Tue Jun 29 10:59:00 1993

BUS_NUM: 1 <LT> CID:    5 LABEL:  500  WORD_NUM: 2 PARAM_NAME: Label 500 Fresh
COND_TYPE:   freshness  TRIP_IF:  not_fresh BITSPEC: 1111XXXXXXXXXXXX
MAX_UPDATE:  40 RAWVAL: 9502 hex TSTAMP:    3040807.139 BUS_DELTA: 25.00  ms
FILE_CNT: 2  STORE_MODE: all FILE_LIMIT: 1000 Tue Jun 29 10:59:00 1993

BUS_NUM: 1 <LT> CID:    5 LABEL:  500  WORD_NUM: 2 PARAM_NAME: Label 500 Fresh
COND_TYPE:   freshness  TRIP_IF:  not_fresh BITSPEC: 1111XXXXXXXXXXXX
MAX_UPDATE:  40 RAWVAL: 9502 hex TSTAMP:    3040832.140 BUS_DELTA: 25.001 ms
FILE_CNT: 3  STORE_MODE: all FILE_LIMIT: 1000 Tue Jun 29 10:59:00 1993

BUS_NUM: 1 <LT> CID:    5 LABEL:  500  WORD_NUM: 2 PARAM_NAME: Label 500 Fresh
COND_TYPE:   freshness  TRIP_IF:  not_fresh BITSPEC: 1111XXXXXXXXXXXX
MAX_UPDATE:  40 RAWVAL: 9502 hex TSTAMP:    3040857.140 BUS_DELTA: 25.000 ms
FILE_CNT: 4  STORE_MODE: all FILE_LIMIT: 1000 Tue Jun 29 10:59:00 1993

BUS_NUM: 1 <LT> CID:    5 LABEL:  500  WORD_NUM: 2 PARAM_NAME: Label 500 Fresh
COND_TYPE:   freshness  TRIP_IF:  not_fresh BITSPEC: 1111XXXXXXXXXXXX
MAX_UPDATE:  40 RAWVAL: 9502 hex TSTAMP:    3040882.141 BUS_DELTA: 25.001 ms
FILE_CNT: 5  STORE_MODE: all FILE_LIMIT: 1000 Tue Jun 29 10:59:00 1993
```

[ EXIT ] [ CLEAR ] [ PRINT ] [ STORE ALL ▯ ] [ SUMMARY ] [ UPDATE ]

DATA COMMUNICATION ANALYSIS AND SIMULATION TOOL

FIELD OF THE INVENTION

The instant invention relates generally to communication system simulators, and more particularly to a communication system simulation and analysis tool for the ARINC 629 communication protocol.

BACKGROUND ART

ARINC 629 is a relatively new aircraft communications bus used in the aerospace industry, and on, for example, the Boeing 777 aircraft (for a technical description of the ARINC 629 protocol see, for example, 'ARINC 629 Specification—Multi-Transmitter Data Bus: Part I—Technical Description—Oct. 16, 1991; Part II—Applications Guide—Jan. 26, 1988', and Boeing Document No. D227W003, 'ARINC 629 Communication System Description Document—Rev. A' dated May 21, 1992). This communication system is a time-division multiplex system which includes multiple transmitters with broadcast-type, autonomous terminal access. It supports quasi-real time data communication between many terminals over a common single-channel transmission medium.

The users, various flight control computers, avionics control units, and many other line replaceable units (LRUs), communicate to the bus by using current mode coupling upon expiration of all three of its protocol timers. This method of restricting bus access ensures that only a single user transmits on the bus at any given time. All connected users listen to all the data transmitted on the bus and decode the first word of a transmitted wordstring to determine if the information contained therein is required by that specific user. If it is, the information is passed to the local addressable memory space where it is available to that control unit. If the data is not required by that specific user, it is ignored.

The assignee of the instant invention designs and manufactures the Main and Back-up Electric Power Generating Systems for the Boeing 777 aircraft. As such, the control units of these two systems utilize the ARINC 629 communication protocol and must interface with various other system on the aircraft (see FIG. 1) via two ARINC 629 buses. As would be expected, a high degree of development, verification, and qualification testing is required of such systems before being certified for flight by the various regulatory agencies around the world. Each and every aspect of the control, protection, power transfer, error detection, and communication functions of the control units must undergo rigorous testing under both normal and abnormal, emergency conditions. This testing includes the development and qualification, at both a LRU and system level, of the ARINC 629 communication. At this time, however, very little commercial ARINC 629 test equipment is available. Of the limited amount of equipment which is commercially available, none meets all of the assignee's line replaceable unit (LRU) and system test requirements.

SUMMARY OF THE INVENTION

It is an objective of the instant invention to provide a data communication analysis and simulation tool for use in both LRU and system level development, verification, and qualification testing. It is a further objective of the instant invention to provide a data communication analysis and simulation tool which is capable of transmiting and receiving on one or more ARINC 629 buses while continuously monitoring bus, LRU, label activity, and bus errors in real-time. It is a further objective to provide a simulator which is able to continuously receive and display LRU/system ARINC 629 outputs in hexadecimal and in engineering units such as volts, amps, signal true/false, and breaker open/closed with color highlighting of state changes or when tolerances are exceeded. Further, it is an objective to provide a simulator which is able to continuously transmit LRU/system ARINC 629 inputs in hexadecimal and/or engineering units such as air/ground, autoland request true/false, switch on/off simulating data from many other LRUs, as well as monitor hardware discrete and analog signals and automatically drive corresponding transmit data to real values to suppress or test LRU/system responses, and monitor received data, drive corresponding hardware signals, and provide automatic transmit data responses to instrument LRU/system status and simulate reactions of other LRUs.

It is a further objective of the instant invention to provide a data communication analysis and simulation tool which can maintain the validity of transmit data by updating freshness counters at expected rates, and can create invalid data by changing transmit schedules, inhibiting freshness update, setting system status or parameter validity bits, or creating data/data or data/hardware disagreements. Further, it is an objective of the instant invention to continuously monitor hundreds of ARINC 629 parameters in real time for change-of-state, out-of-tolerance, pattern match, and invalid or stale data conditions.

It is yet a further objective of the instant invention to allow interface to an automatic test equipment (ATE) stand to permit automation of ARINC 629 functions during LRU/system integration, qualification, and acceptance testing. Further, it is an objective to allow rapid reconfiguration for different LRU combinations and test stand configurations. In particular, it is an objective to provide automatic transmit personality table (XPT) and receive personality table (RPT) generation, user defined engineering unit conversions, user defined data monitoring conditions, and user defined real-time calculations relating transmit and receive data and hardware signals.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

FIG. 28 illustrates a graphical and textural display in accordance with the instant invention;

FIG. 62 illustrates a graphical and textural display in accordance with the instant invention.

DESCRIPTION OF THE PREFERRED EMBODIMENTS

Figure 2:
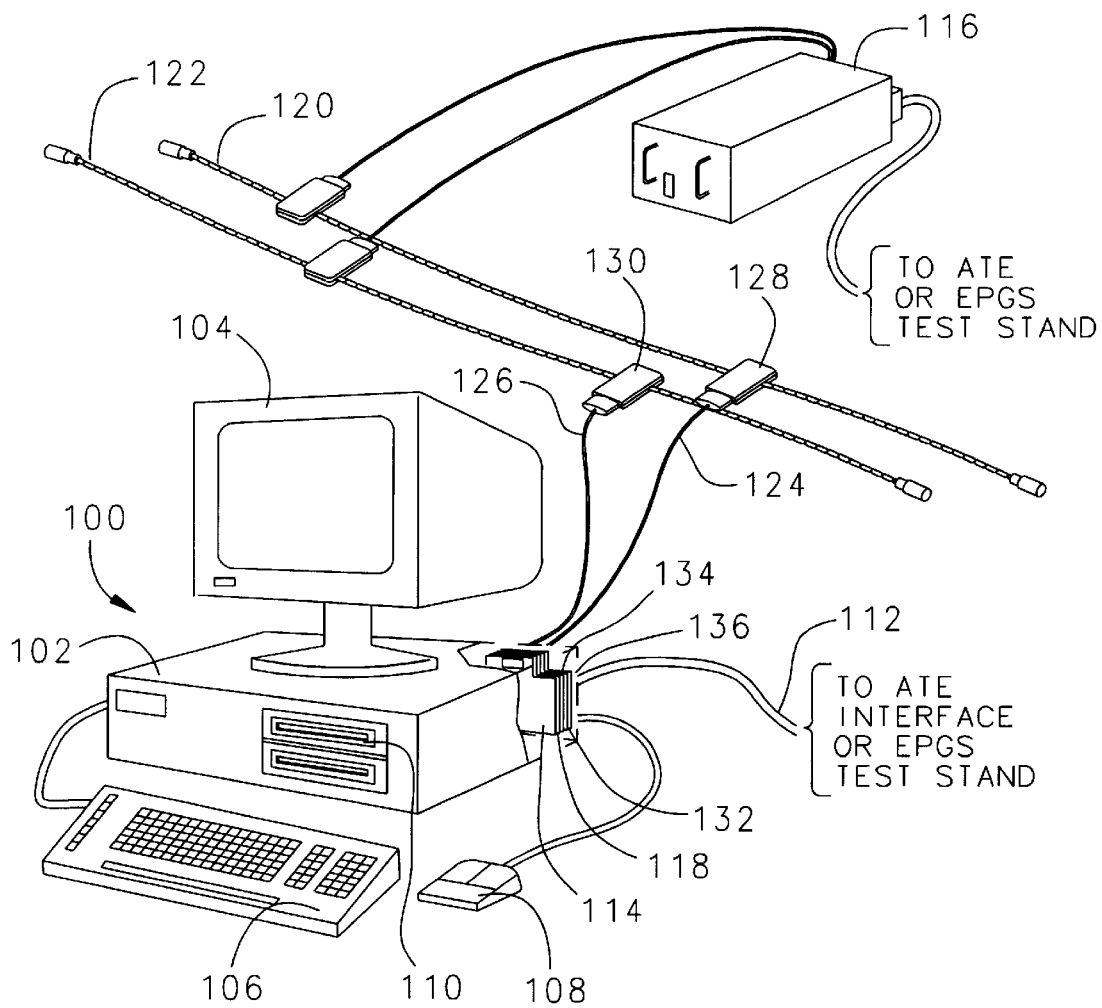
FIG. 2 is a pictorial illustration of the data communication analysis and simulation tool of the instant invention along with a line replaceable unit under test.

The data communication analysis and simulation tool 100, hereinafter simulator, of the instant invention, as shown in FIG. 2, comprises a computer 102, a monitor 104, a keyboard 106, and a mouse 108, as well as a programmed simulator (not shown) resident within the computer. The simulator 100 also comprises a means to input user defined configuration and monitor files, such as is shown by disk drive 110 or through a test stand interface bundled cable 112. The interface bundled cable 112 comprises analog, digitial, and discrete signal lines (not shown), as well as a computer Ethernet connection if the specific application so requires. At least one communication protocol interconnect module, such as is shown in FIG. 2 by ARINC 629 card 114, is installed in the simulator 100 to adapt it to the specific protocol in use by the line replaceable unit (LRU) 116 under test. As can be seen from FIG. 2, two ARINC 629 cards 114, 118 are used for this embodiment because the LRU communicates with two ARINC 629 buses 120 and 122. The simulator also comprises a communication bus interface, such as cable 124 and 126, for each communication bus 120 and 122 to which it communicates. These interface cables 124 and 126 couple to the communication buses 120 and 122 via current mode couplers 128 and 130 in this embodiment. The simulator 100 operates under a real time operating system in the preferred embodiment, and utilizes a custom designed software system (programmed simulator) involving a number of real-time and non real-time processes described in detail below.

This simulator 100 was designed to support LRU development, hardware/software integration testing (HSIT), qualification, electromagnetic effects (EME), and acceptance test procedure (ATP) testing. In addition, the preferred embodiment of the instant invention was designed to support complete electrical power generating system (EPGS) development and qualification testing. The instant invention provides simulated communication traffic from the various aircraft systems that communicate with the electric power systems, see FIG. 1, by providing a way of transmitting controlled, realistic data on the communication data buses, two ARINC 629 buses 120 and 122 for the preferred embodiment, and receiving and analyzing the data transmitted by the unit(s) under test (UUT) 116.

The simulator 100 of the instant invention, as adapted in the preferred embodiment for ARINC 629 communication simulation and data analysis, transmits and receives on two ARINC 629 buses 120 and 122 while continuously monitoring bus, LRU, and label activity. The simulator 100 also monitors for bus errors in real-time. The simulator 100 continuously receives and displays LRU/system ARINC 629 outputs via a graphical user interface (comprised of various processes, the monitor 104, the keyboard 106, and the mouse 108) in hexadecimal and engineering units on monitor 104 as will be described more fully hereinbelow. These outputs include volts, amps, signal true/false, and breaker open/closed information, and are displayed with color highlighting when the state of the output changes or when the tolerances defined by the user are exceeded. The simulator 100 also continuously transmits LRU/system ARINC 629 inputs in hexadecimal and/or as named parameters simulating the output from many other LRUs (see FIG. 1), such as air/ground, autoland request true/false, and switch on/off data. Additionally, the simulator 100 monitors hardware discrete and analog signals which are coupled through the interface bundled cable 112 in real-time while automatically driving corresponding transmit data to realistic values to suppress or test LRU/system responses. The simulator 100 also monitors received data, drives corresponding hardware signals through the interface bundled cable 112, and provide automatic transmit data responses in real-time to instrument LRU/system status and simulate reactions of other LRUs.

The preferred embodiment of the simulator 100 of the instant invention maintains the validity of transmit data by up dating freshness counters at expected rates. It also creates invalid data by changing transmit schedules, inhibiting freshness update, setting system status or parameter validity bits, o r creating data/data or data/hardware disagreements. Hundreds of ARINC 629 parameters are also continuously monitored in real-time for change-of-state, out-of-tolerance, pattern match, and invalid or stale data conditions. An interface to an automated test equipment (ATE) stand through the interface bundled cable 112, permitting automation of ARINC 629 functions during LRU hardware/software integration, qualification, and acceptance testing, is also provided.

In the preferred embodiment of the instant invention, rapid reconfiguration of the system for different test conditions, LRU combinations, and test stand configurations is also provided. In p particular, t he simulator 100 of the preferred embodiment provides automatic transmit personality table (XPT) and receive personality table (RPT) generation, user defined engineering unit conversions, user defined data monitoring conditions, and user defined real-time calculations relating transmit and receive data and hardware signals. In this way, the simulator 100 has been designed for future expansion and changing requirements.

The simulator 100 is configured with two commercially available ARINC 629 communication cards 114, 118 as, for example, can be purchased from Pacific Avionics Corporation. Each card provides the normal DATAC terminal controller, SIM, dual-port RAM, and XPT/RPT personality table circuitry used by other commercial cards as well as by LRUs for use in the assignee's EPGS for the Boeing 777 aircraft. The ARINC 629 cards 114 and 118 also provide double buffering to protect wordstring content integrity, CID multiplexing to simulate data transmissions from multiple sources, and an independent bus monitor, FIFO, and time stamp clock which allows the card to actually receive and time stamp its own transmissions as well as UUT transmissions. In a preferred embodiment of the instant invention, the simulator 100 is also configured with at least one opto-isolated digital input and relay output cards 132. Further, the simulator 100 also includes an analog input card 134 to enable the input of analog signals. In a highly preferred embodiment, the simulator 100 also includes an Ethernet interface card 136 which permits full automatic control and data access by an automatic test equipment (ATE) stand (not shown) via the ATL test language or other compatible language.

The software for the simulator 100 has been developed and operates under a real time operating system. In the preferred embodiment of the instant invention, the Lynx Real-Time Operating System manufactured by Lynx Real-Time Systems is used, although any operating system which is a UNIX compatible operating system designed for real-time multi-tasking applications and whose kernel is fully preemptable and re-entrant and which provides guaranteed task response times in an environment with multiple interrupt sources may be used. This simulator 100 allows the application designer to have complete control of system and application program priorities which permits important real-time processes to be prioritized above non real-time user and display processes. The graphical user interface has been developed in the preferred embodiment using the X Window System™ (registered trademark of MIT) and OSF/Motif™ (registered trademark of Open Software Foundation) packages which are commercially available through, for example, Lynx Real-Time Systems. Other commercially available graphical user interface systems may be appropriate based on user requirements.

The preferred embodiment of the instant invention has the ability to reconfigure rapidly for different test conditions and requirements changes that occur often during aircraft development. The application specific configuration files contain parameters which the user can easily relate to system requirements. Files are created off-line or in another window on the simulator 100 using a text editor which permits block copies, search/replace, etc. Modifications can be made to existing files quickly. The simulator of the instant invention also has the ability to automatically build the XPT, RPT, and other data tables needed to setup the ARINC 629 cards 114 and 118 from the lists of transmit and receive labels contained in the configuration files. The user is not required to understand the detailed operation of the ARINC 629 cards 114 and 118 and the complex structures of the XPT and RPT which would otherwise be needed. The ability to parse and execute mathematical and logical equations that allow the user to update ARINC transmit data in real-time based on digital and analog inputs, named parameters, and other ARINC 629 data is also provided in the preferred embodiment of the instant invention. Likewise, the ability to monitor hundreds of ARINC 629 parameters in real-time for various conditions and indicate when the event occurs and the relative time between events is provided.

Figure 3:
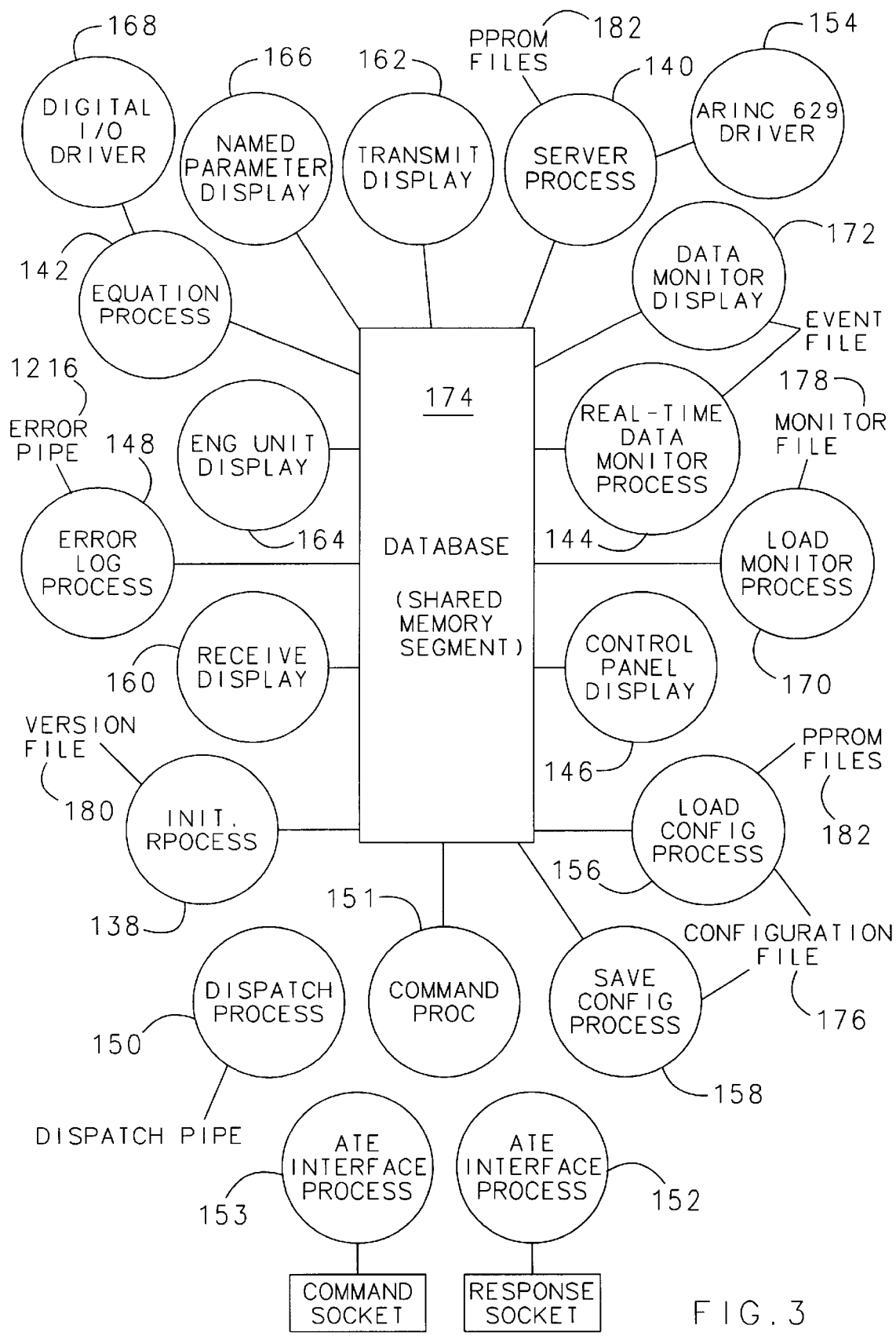
FIG. 3 is a process diagram illustrating the major processes utilized by the programmed simulator of the instant invention.

As illustrated in FIG. 3, the software processes (initialization process 138, server process 140, equation process 142, data monitor process 144, control panel display 146, error log process 148, dispatch process 150, command process 151, ATE interface process 152, 153, device driver 154, load configuration process 156, save configuration process 158, receive display process 160, transmit display process 162, engineering unit display process 164, named paramater display process 166, digital I/O device driver 168, load monitor process 170, and data monitor display process 172) that comprise the preferred embodiment of the simulator 100 of the instant invention attach to a common shared memory segment 174 which serves as a central database and supports the necessary inter-process communications. The database 174 provides storage for transmit and receive wordstring definitions, engineering unit conversions, and user equations which have been loaded from one of many possible application specific configuration files 176. It also holds the data monitor conditions which can be loaded from one of many possible monitor setup files 178. The database also provides storage for the latest ARINC 629 transmit and receive data, digital input and output data, and analog input data.

Access to the shared memory segment 174 is controlled by a semaphore. Each process locks the semaphore, accesses and/or modifies data needed, then unlocks the semaphore. When the semaphore is locked, other processes which attempt to access it are blocked thus allowing the original process to finish. The process holding the semaphore temporarily inherits the priority of the highest process waiting thus minimizing time delays to critical processes. Processes are required to minimize the time they hold the semaphore by avoiding operations which can be performed later. They are not permitted to execute display related operations such as prints or X Window and Motif library calls while holding the semaphore.

The simulator 100 of the preferred embodiment of the instant invention comprises various software processes, drivers, and files as described herein. The function of each item is described hereinbelow.

Initialization Process

The initialization process 138 is started automatically when the user logs in, and is responsible for allocating memory for the database 174 and for starting some other processes. These include the real-time processes (server 140, equations 142, and data monitor 144), the control panel 146, error log 148, dispatch 150, and command 151. A version file 180 is also created. All processes write their version to this version file 180 during startup to allow complete configuration identifications. In an embodiment which is equipped for ATE stand operation, the initialization process 138 may also be invoked by the ATE interface process 152, 153 when the ATE stand (not shown) connects over the Ethernet LAN and sends an initialization command.

Server Process

The server process 140 calls the device driver 154 to configure the ARINC 629 cards 114 and 118 (see FIG. 2) installed in the computer 102 (see FIG. 2) based on the parameters and modes defined in the configuration file 176 and loaded into the database 174. It reads the PPROM files 182 generated by the load configuration process 156, and calls the device driver 154 to load the data onto the ARINC 629 communication cards 114 and 118 (see FIG. 2). After the cards 114 and 118 (see FIG. 2) are initialized, the process 140 communicates with the ARINC 629 device driver 154 every 10 ms to move the data received by the ARINC 629 cards 114 and 118 (see FIG. 2) to the database 174, move transmit data in the database 174 which has changed to the ARINC 629 cards 114 and 118 (see FIG. 2), obtain the error status of each ARINC 629 bus 120 and 122 (see FIG. 2), and count receive and transmit errors.

Figure 4:
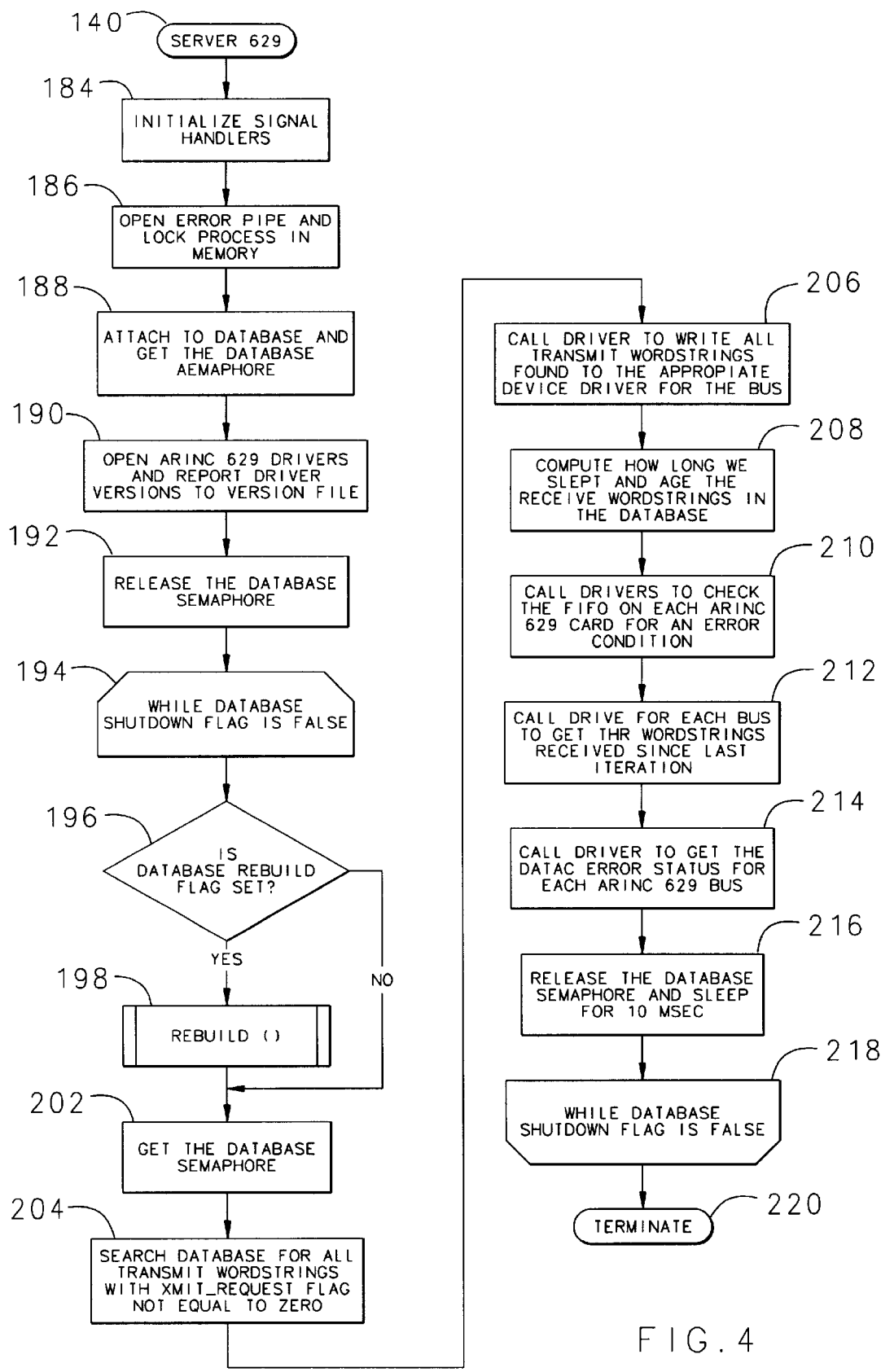
FIG. 4 is a process flow diagram illustrating the server process of the instant invention.

More particularly, as shown in FIG. 4, the server process 140 initializes the signal handlers 184, and opens an error pipe and locks the process in memory 186. It then attaches to the database and gets the database semaphore 188. The server process then opens the ARINC 629 drivers and reports the driver version to the version file 190. Once this is complete, the server process releases the database semaphore 192. The server process then enters a loop which continues while the database shutdown flag is false 194. It first checks to determine if the database rebuild flag is set 196, and if so, calls 198 the rebuild function 200 (see FIG. 5). Once this function 200 returns, or if the database rebuild flag was not set, the server process obtains the database semaphore 202. This function then searches the database for all transmit wordstrings with a transmit request flag not equal to zero 204. It calls the driver to write all transmit wordstrings found to the appropriate device driver for the bus 206, and then computes how long the function has slept and the age of the receive wordstrings in the database 208. The server process then calls the drivers to check the first-in-first-out (FIFO) memory on each ARINC 629 card for an error condition 210. The process then calls the driver for each bus to get the wordstrings received since last iteration 212. It then calls the drivers to get the DATAC error status for each ARINC 629 bus 214. At this point, the server process releases the database semaphore and sleeps for 10 mSec 216. The process continues to loop while the data base shutdown flag is false 218. Once the shutdown flag has been set true, the server function terminates 220.

Figure 5:
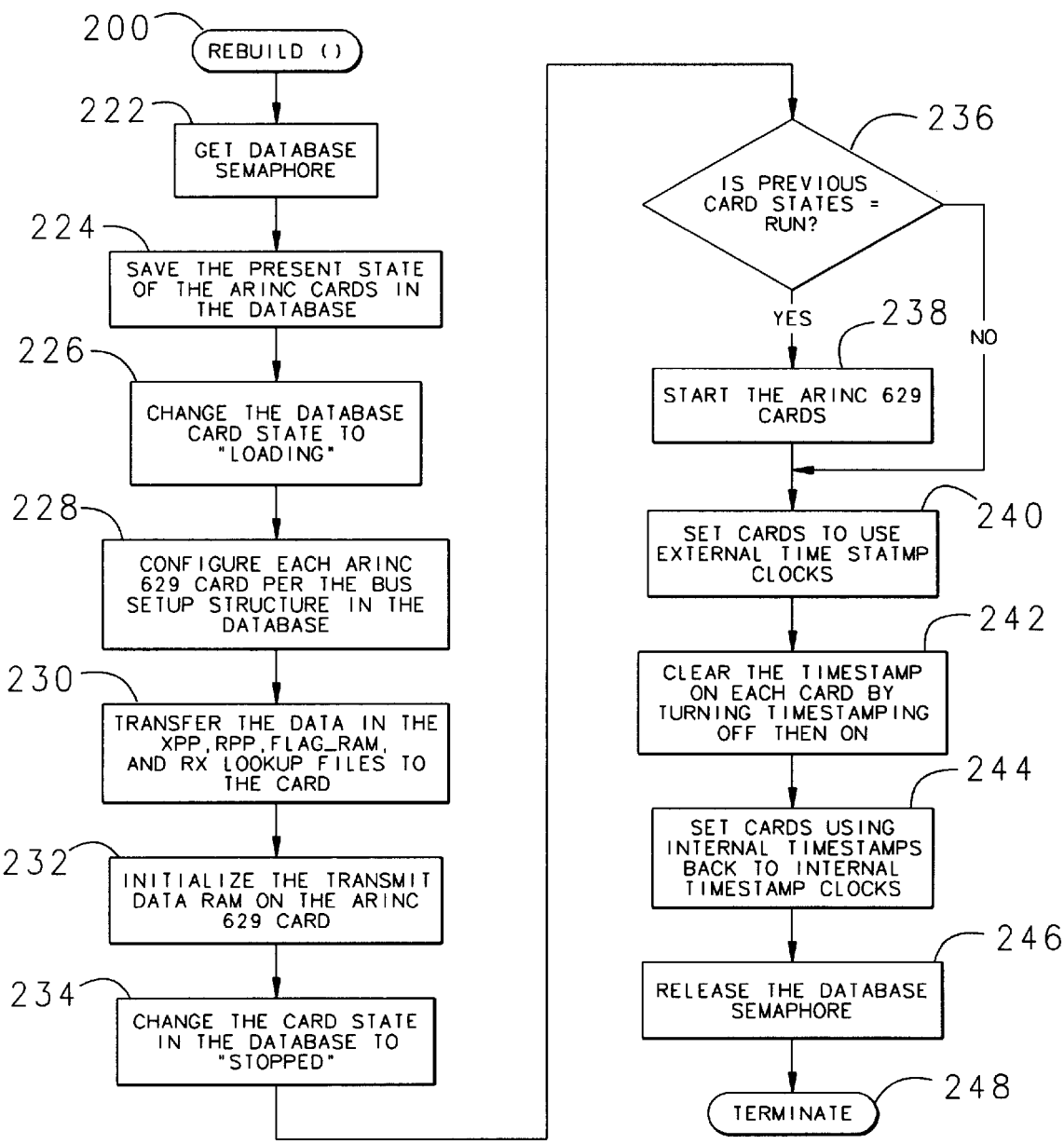
FIG. 5 is a process flow diagram illustrating the rebuild sub-process of the instant invention.

As illustrated in FIG. 5, the rebuild function 200, which is called as described above, first obtains the database semaphore 222 and saves the present state of the ARINC cards in the database 224. The rebuild function then changes the database card state to "LOADING" 226. The rebuild function then configures each ARINC 629 card per the bus setup structure in the database 228 and transfers the data in the XPP, RPP, Flag ram, and receive lookup files to the cards 230. The process then initializes the transmit data ram on the ARINC 629 card 232 and changes the card state in the database to "STOPPED" 234. At this point the rebuild function checks to determine if the previous cards state was equal to "RUN" 236. If it was, the rebuild function then starts the ARINC 629 cards 238. If it was not, or once the cards have been started if the previously state was run, the rebuild function sets the cards to use the external time stamp clocks 240. It then clears the time stamp on each card by turning time stamp off then back on 242. At this point the rebuild function sets the cards using internal time stamps back to internal time stamp clocks 244, it then releases the database semaphore 246 and returns 248.

ARINC 629 Device Driver

The ARINC 629 device driver 154 (see FIG. 3) provides a high level means of controlling the various registers and memory contained on the ARINC 629 communication cards 114 and 118 located in the computer. The device driver is called by the server process 140 to perform the initialization of the ARINC 629 communication cards 114 and 118, read received data, read error registers, move transmit data. The device driver is called by the control panel process 146 or the command processor 151 to allow the user to start and stop the cards transmitting, or change pages of the XPT.

Received data may be retrieved in either of two methods: datalog mode, or double buffering mode. The datalog mode uses the FIFO on the card to store the label and CID, flag value, time stamp, and data words. As wordstrings are retrieved from the FIFO, the flag value is used as an index into the Rx lookup table to obtain a pointer to the appropriate database record. The double buffering mode uses two dual-port RAM receive buffers, one is actively receiving data from the DATAC and the other is accessed by the PC. The cards are requested to switch buffers between data receptions. After the buffers switch, the label, flag value, and time stamp are retrieved from the FIFO as before. The data words are retrieved from the now inactive receive buffer. Both methods insure wordstring integrity and return the received wordstrings in an array of structures. The datalog mode is preferred since it allows the card to receive its own transmissions.

Transmit data is written to the transmit data RAM as changes are required. After all of the updated transmit data is written, the transmit double buffer is requested to switch between transmissions. This method is used to ensure transmit wordstring integrity.

Control Panel Process

Figure 7:
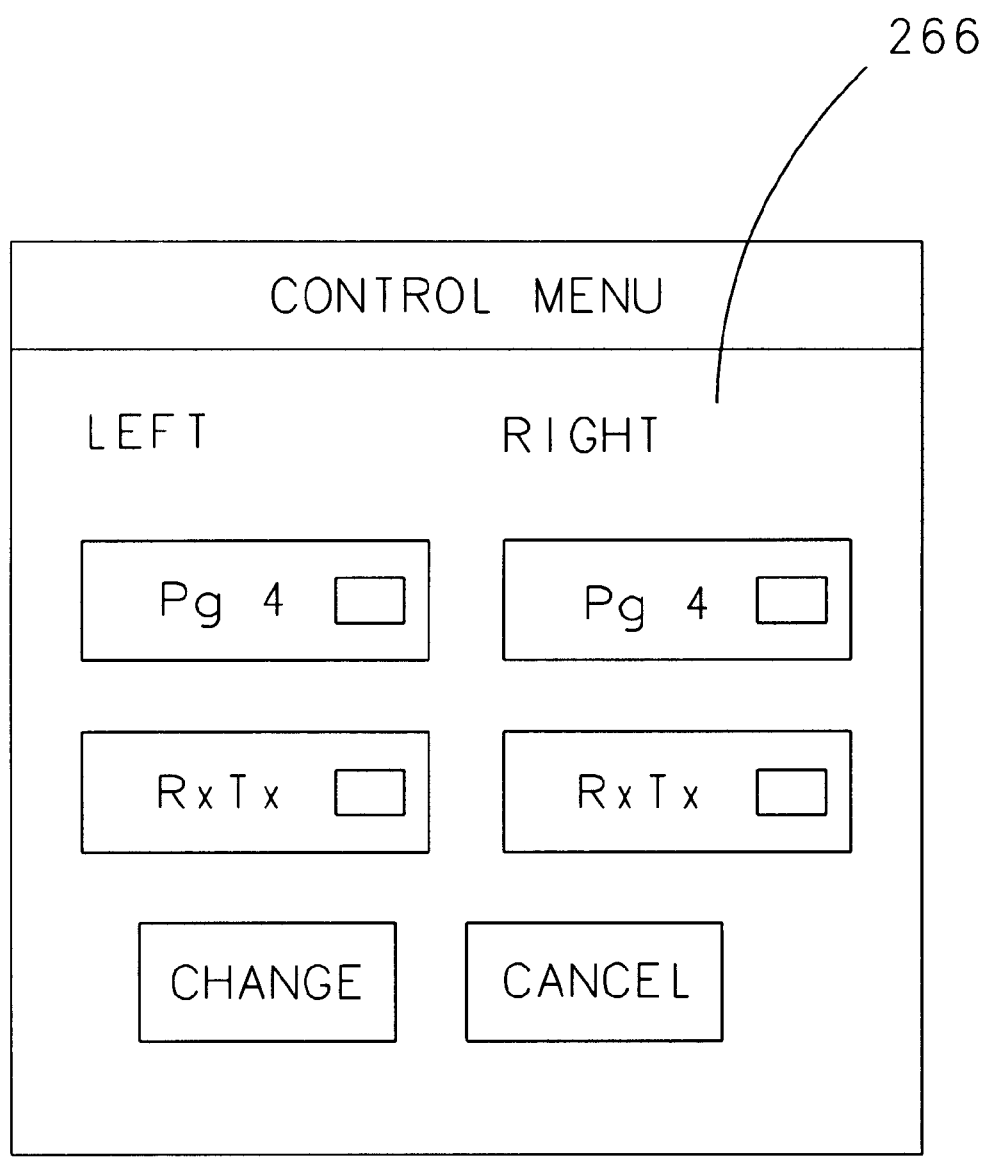
FIG. 7 illustrates a graphical and textural display in accordance with the instant invention.
Figure 8:
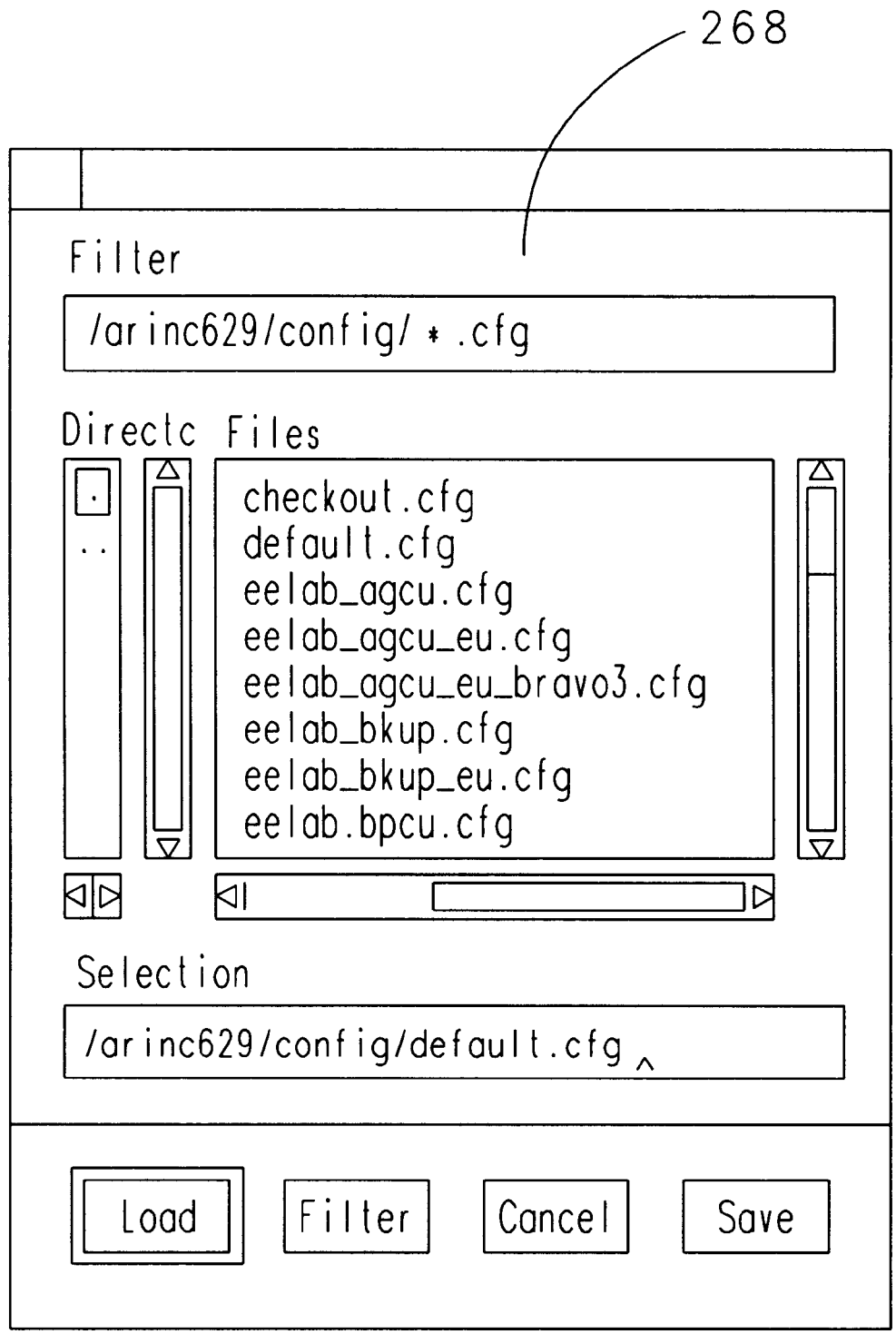
FIG. 8 illustrates a graphical and textural display in accordance with the instant invention.

The control panel process 146 provides a display 264 (see FIG. 7) that is used to control the simulator 100. The user may start and stop communications on one or both buses, change XPT pages (see FIG. 7, menu display 266), select receive only or receive/transmit modes of operation, select a configuration file to load, save the present configuration, view a file, and start execution of a selected application or display process from a menu by selecting the proper icon with the mouse 108 (FIG. 2). When the user chooses to load a configuration file (see FIG. 8, load/save config file menu 268), save a configuration, or start a process from the application menu (see FIG. 9, applications menu 270), the name of the process, necessary pass parameters, and the desired process priority are written to the dispatch pipe 272 (see FIG. 3). The dispatch process 150 will start the requested process executing at the specified priority.

Figure 10:
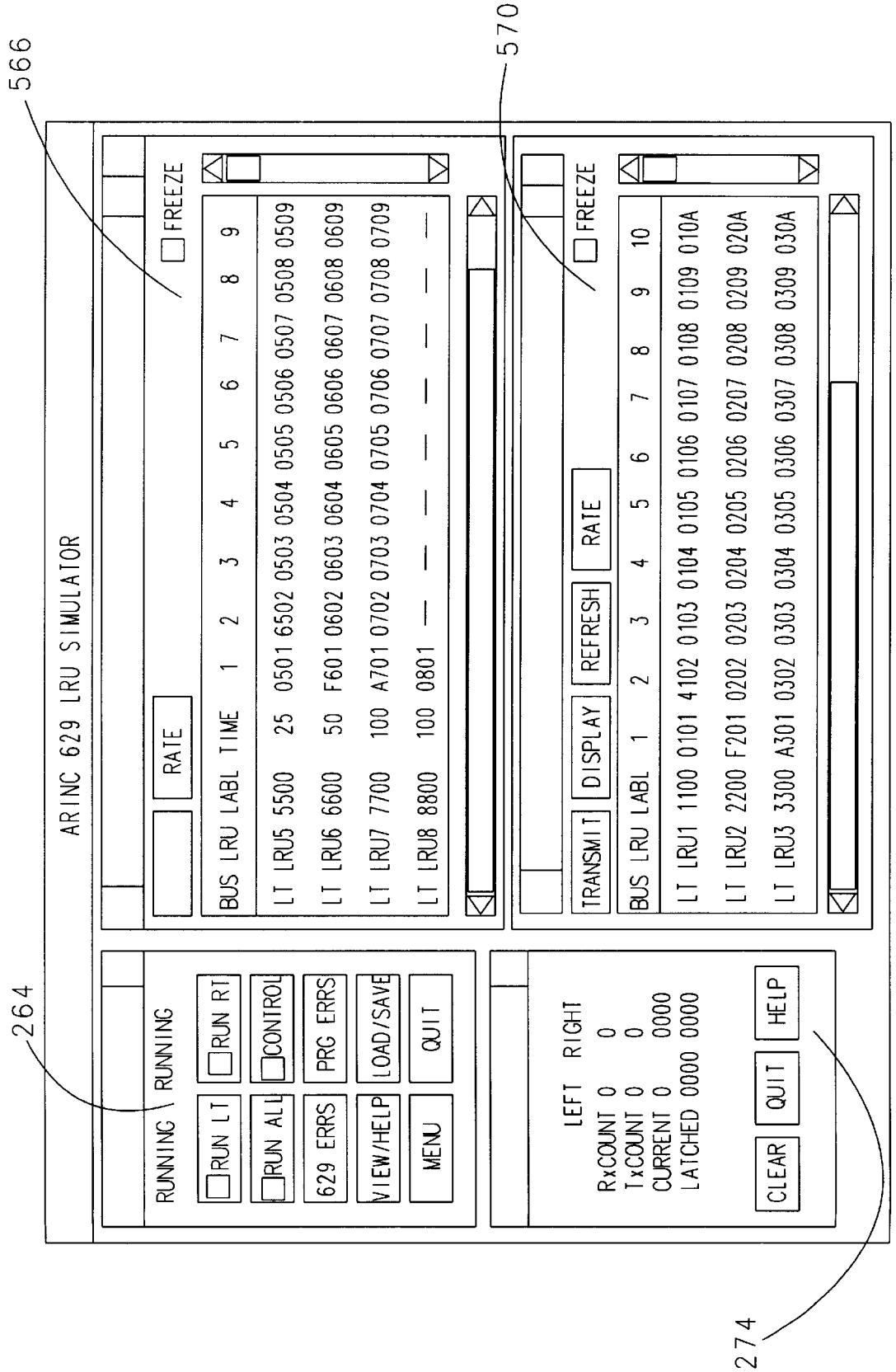
FIG. 10 illustrates a graphical and textural display in accordance with the instant invention.

The control panel also displays some status information to the user, including the status of the two ARINC 629 cards, receive activity, DATAC terminal controller error register contents (see FIG. 10, DATAC errors menu 274), and receive and transmit error counts. It also indicates the occurrence of program errors (see FIG. 11, program errors menu 276) and allows the user to view configuration files, help files, and program error messages.

Load Configuration Process

Figure 12A:
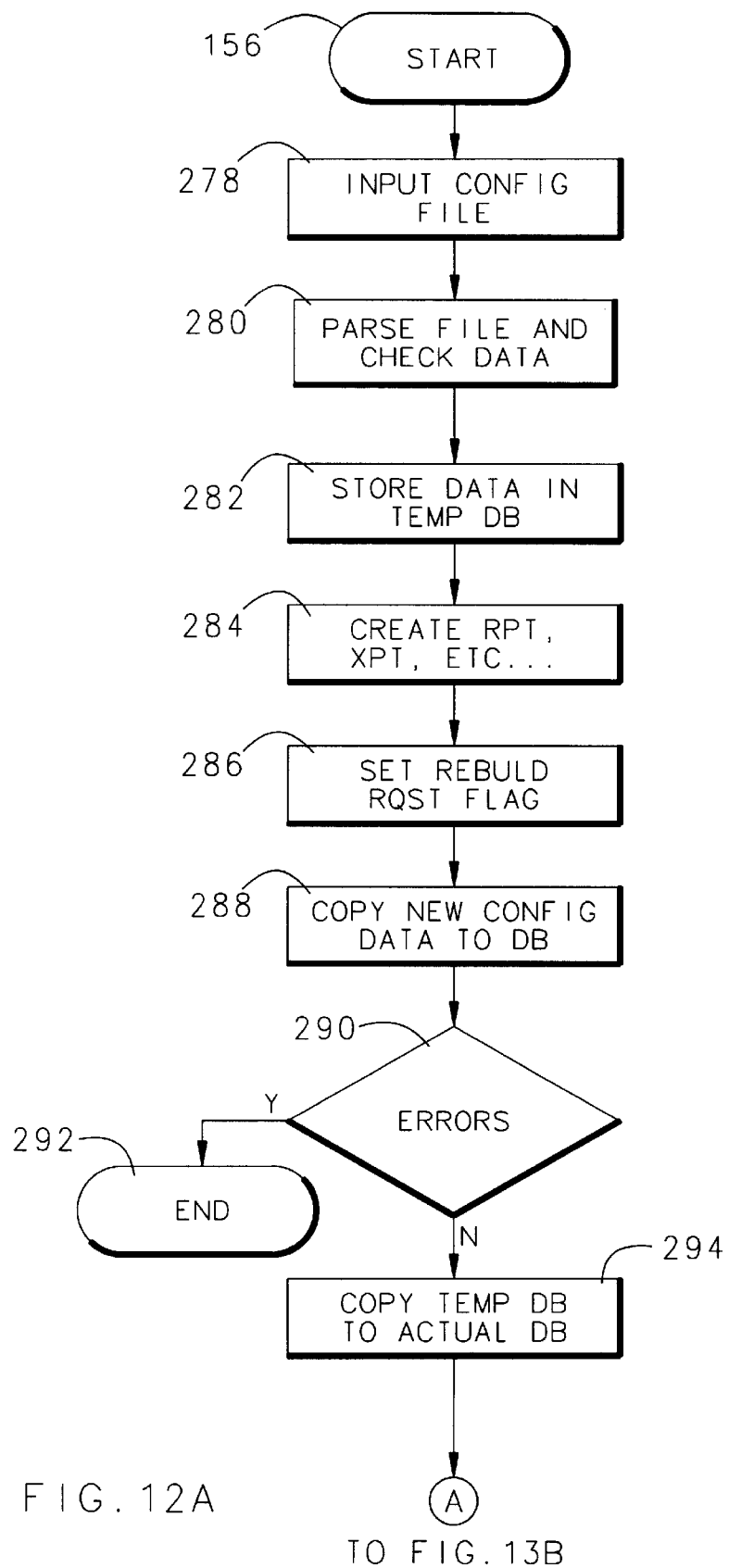
FIGS. 12A–B are a process flow diagram illustrating the load configuration process of the instant invention.
Figure 12B:
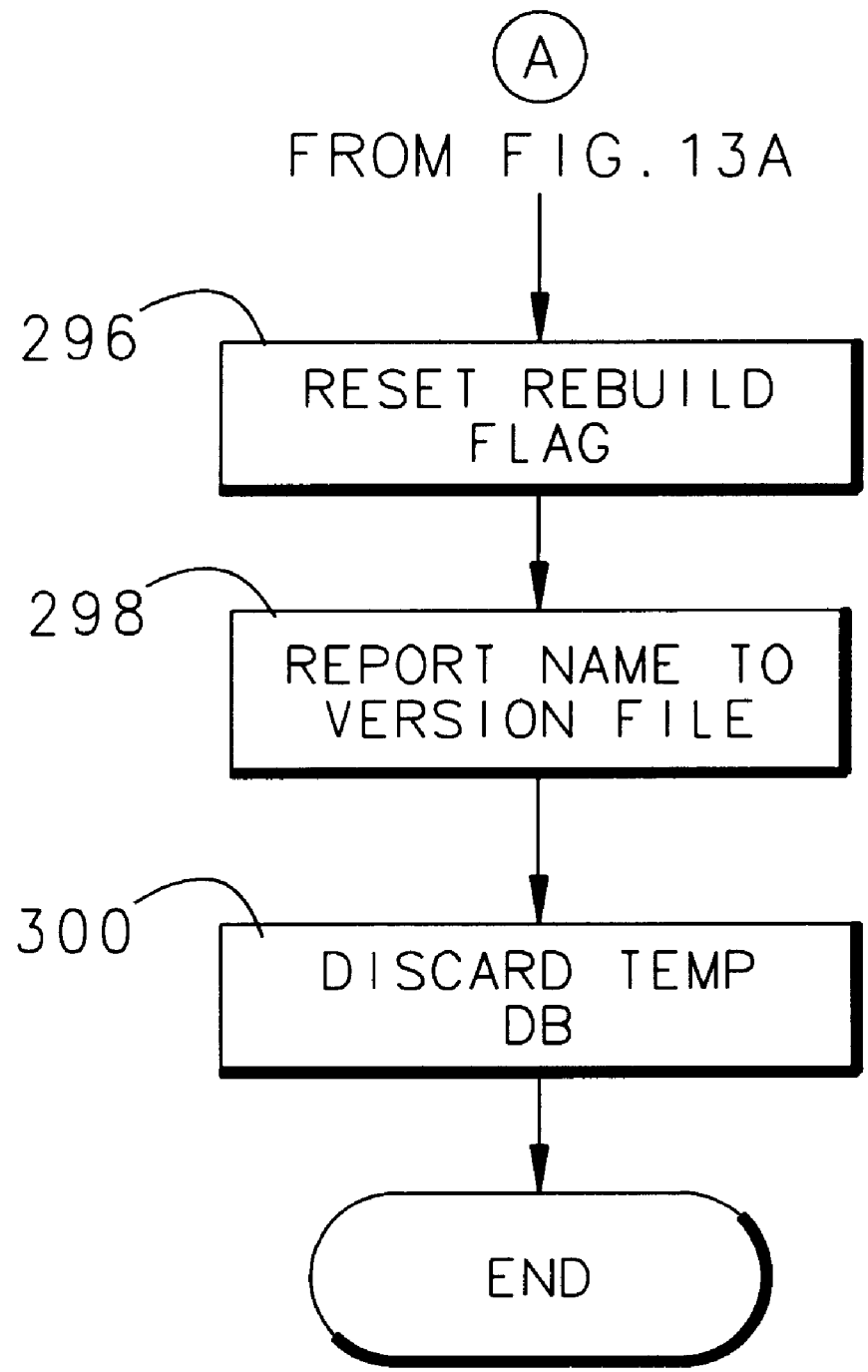

The load configuration process 156 is started by the dispatch process 150 when the user chooses to load a new configuration file 176 (see FIG. 3). The load configuration process 156 is used to load application specific configuration files 176 selected by the operator through the control panel process (see FIG. 8, load/save configuration file menu 268)) and/or selected by the ATE stand through the command process. Both of these methods invoke the load configuration process indirectly through the dispatch process 150 (see FIG. 3) and provide the pathname of the desired configuration file in a command line argument. As shown in FIG. 12, the load configuration process 156 reads 278 and parses 280 the configuration file into a temporary copy of the ARINC 629 database 282. It builds PPROM files 284 which are compatible with the server process described above, the ARINC 629 driver, and the ARINC 629 cards. It then sets the rebuild request flag in the database 286 and waits for the other simulator processes to acknowledge. It copies the new configuration data into the temporary database 288, and checks for errors 290. If errors are discovered, the process exits 292. If not, the temporary database is copied to the actual database 294 and then it clears the rebuild request flag 296 which tells the other processes to reconfigure. The name of the configuration file is reported to the VERSION log file 298 and the temporary database is discarded 300.

Figure 13A:
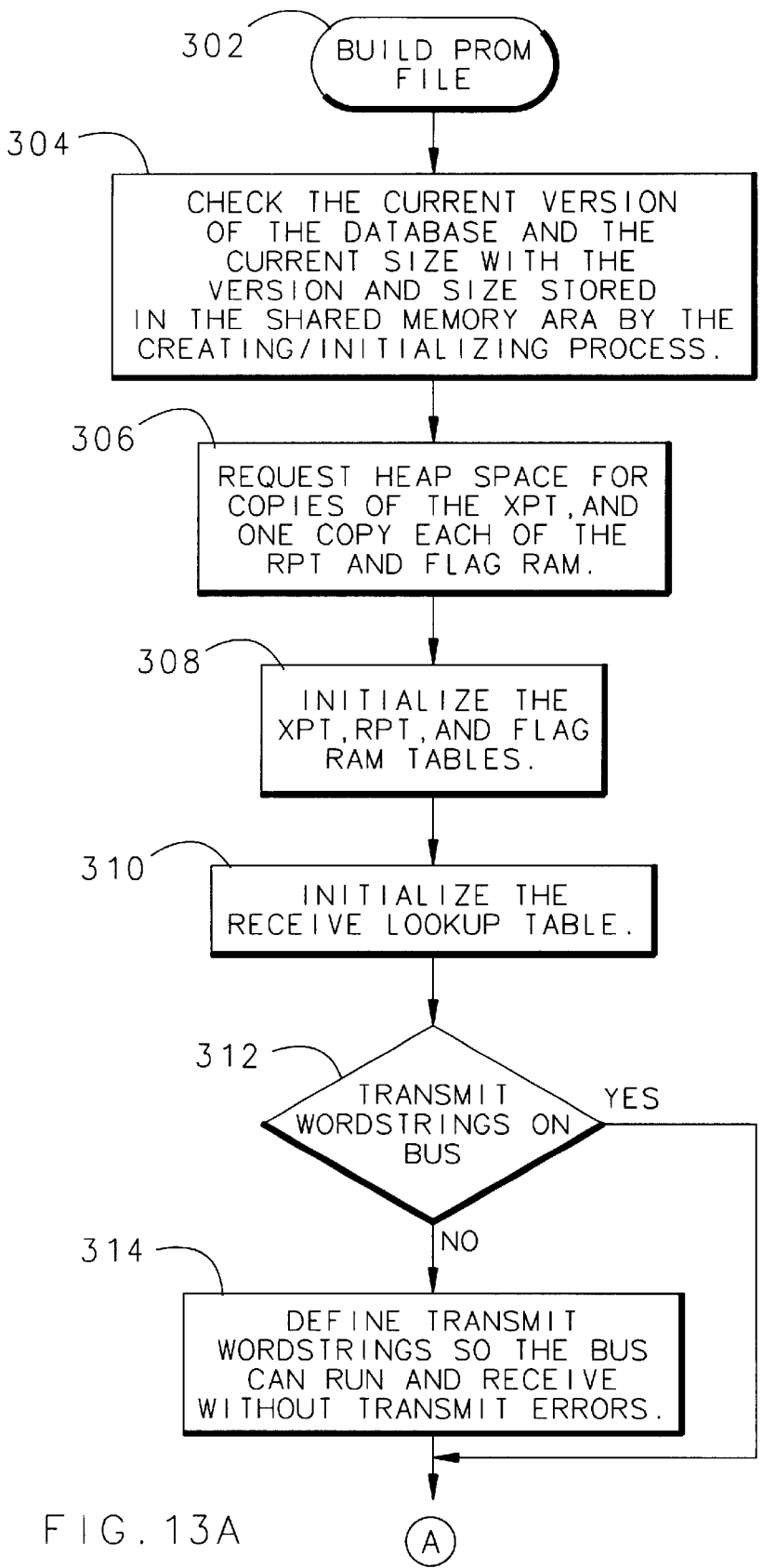
FIGS. 13A–C are a process flow diagram illustrating the build PPROM file sub-process of the instant invention.
Figure 13B:
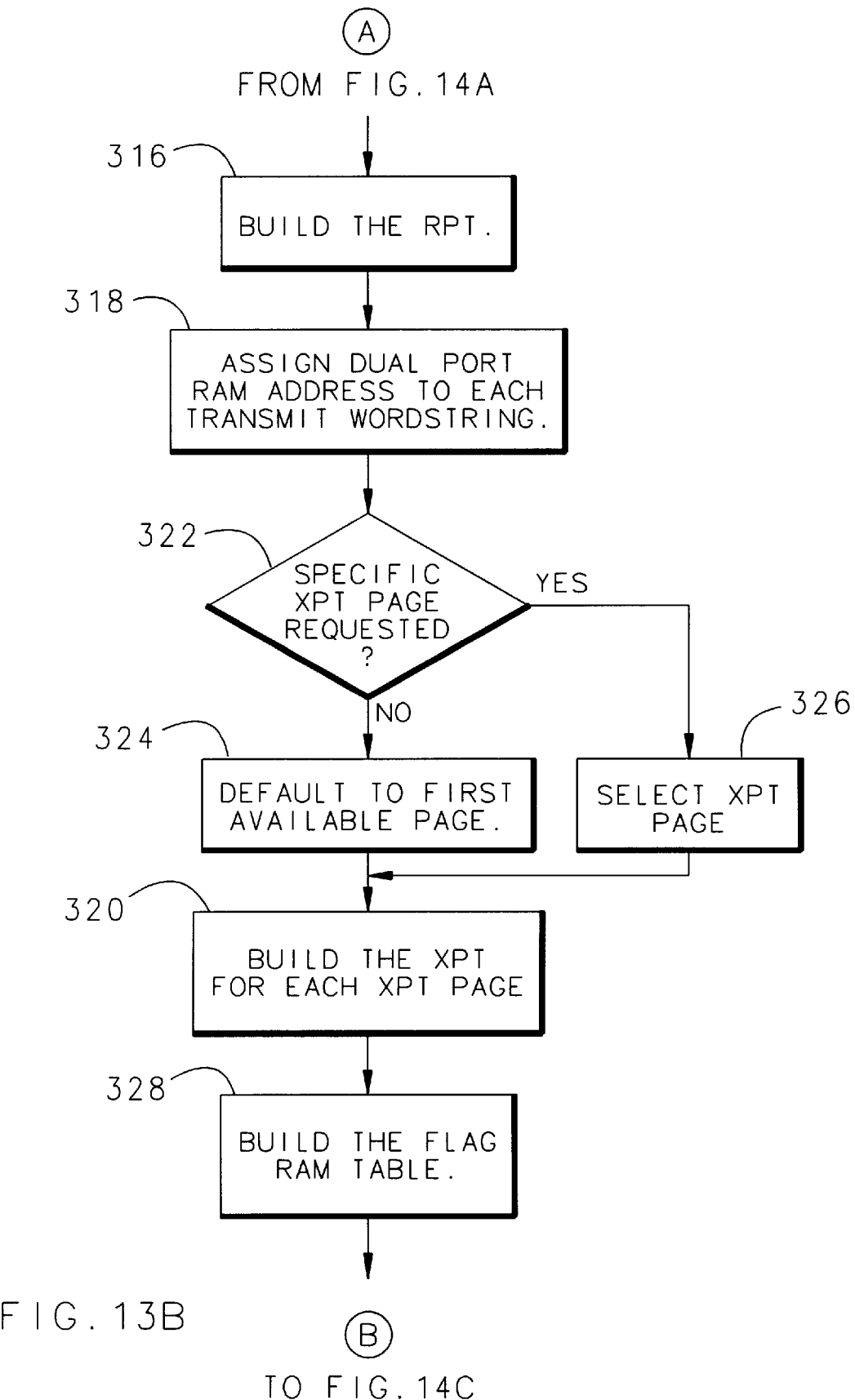
Figure 13C:
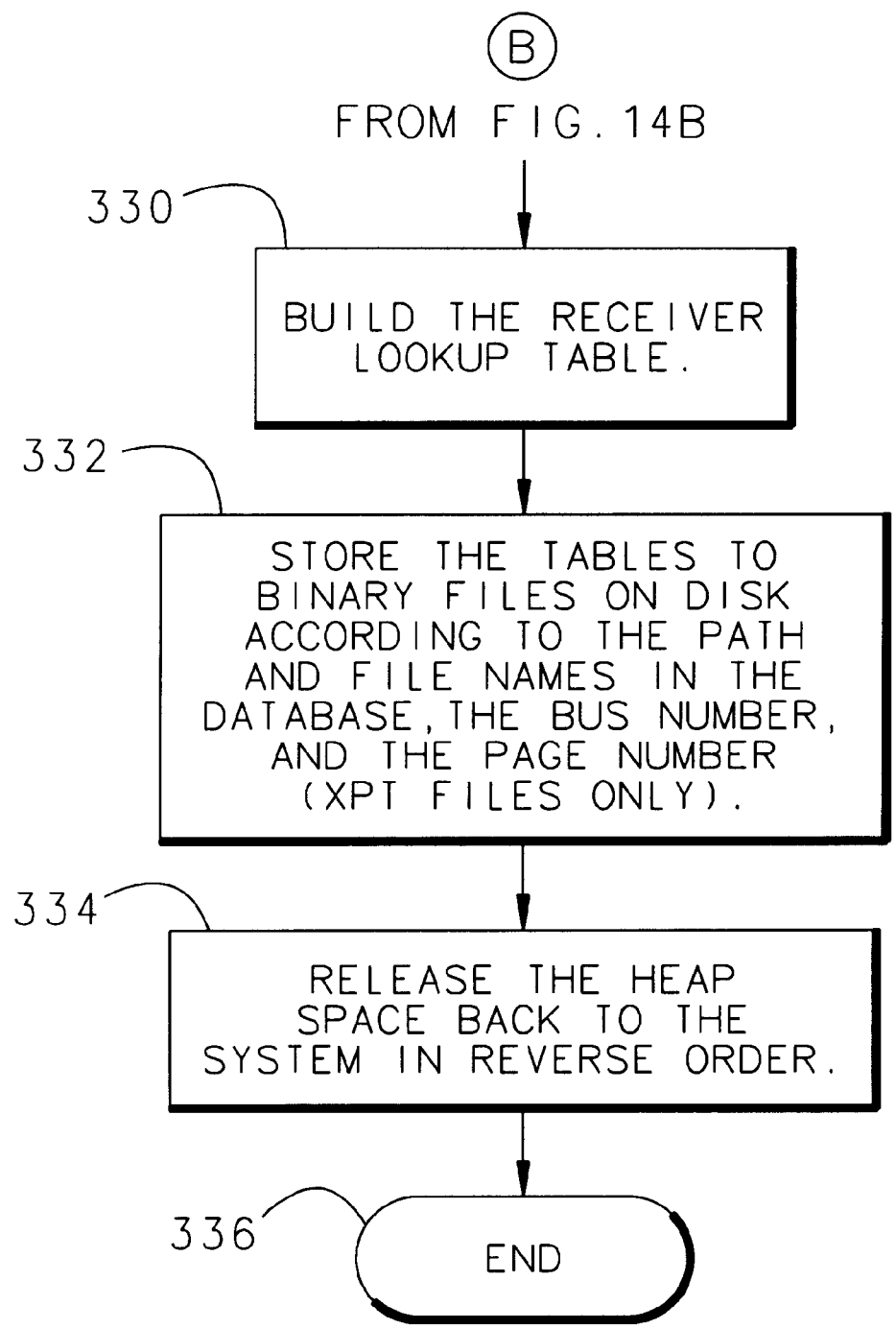

As shown in FIG. 13, the function build prom files 302 builds the XPT, RPT, flag, and receive lookup files for the passed bus number using data from the database at the passed pointer. This is normally a temporary copy of the database structure which is being used while a new configuration file is being loaded. The temporary copy is used so that a configuration file syntax error will not destroy an operating database, and so ARINC 629 transmit/receive can continue during the rather lengthy (approximately 4 seconds in the current implementation) load and build operation. Once the build is complete, the user will transfer the data from the temporary structure into the real database in shared memory. The receive lookup table built by this function includes pointer references to the real database as described above. Initially, this function checks the current version of the database and the current size with the version and size stored in the shared memory area by the creating/initializing process 304. It then requests heap space for copies of the XPT, and one copy each of the RPT and flag ram 306. The XPT, RPT, and flag ram tables are initialized 308, as is the receive lookup table 310. If there are no transmit wordstrings on the bus 312, this function defines one so the bus can run and receive without transmit errors 314.

At this point the RPT is built 316 as will be described more fully below. Dual port ram addresses are then assigned to each transmit wordstring 318, and the XPT for each XPT page is built 320, also as more fully described below. If no specific XPT was requested 322, the function defaults to the first available page 324. If a specific XPT was requested, it verifies that that page is selected 326. Next, the flag ram table 328 and the receive lookup table are built 330. The tables are then stored to binary files on disk according to the path and file names in the database, the bus number, and the page number (XPT files only) 332. The standard binary file suffix is also added. For an XPT file it might be "xpt14.bin" for bus 1 page 4. The heap space is then released back to the system in reverse order 334, and the process exits 336.

XPT layout can also be done manually in either independent or block mode if desired as described more fully below. The user is then required to assign cell locations for each wordstring. The flag table contains a unique value for each wordstring to be received from the data bus. The values are assigned sequentially in two groups so the server process can distinguish wordstrings received from the units under test from those the simulator itself has transmitted and received. The receive lookup table contains pointers to the specific database storage areas for each receive wordstring and other data used for hardware error detection.

Figure 14:
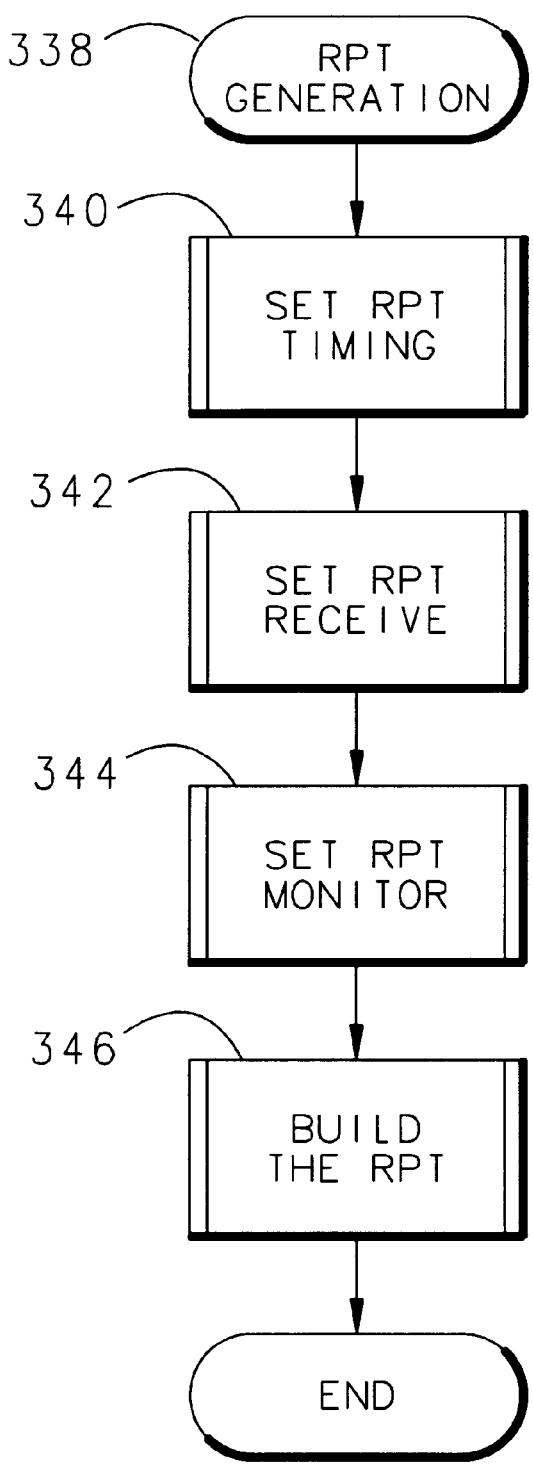
FIG. 14 is a process flow diagram illustrating the RPT generation sub-process of the instant invention.
Figure 15:
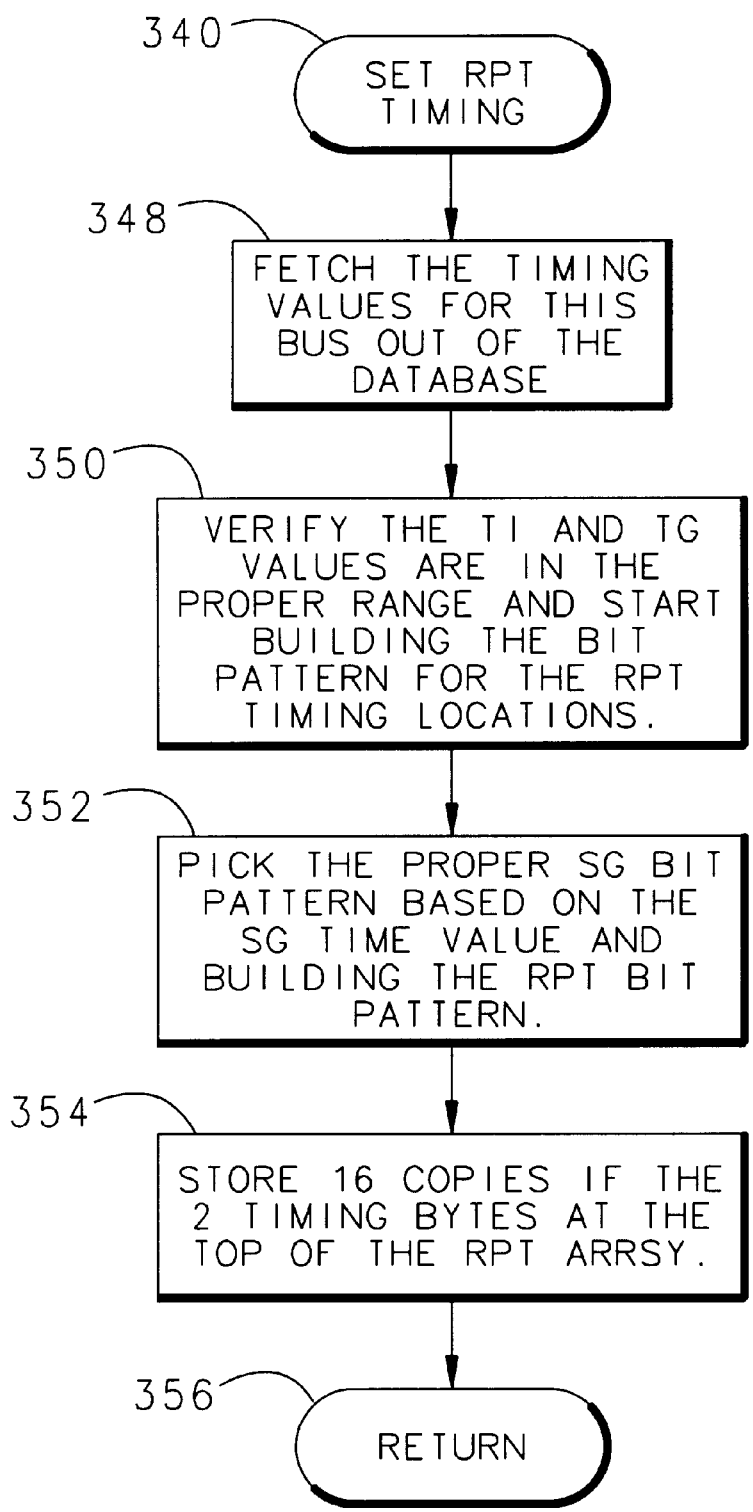
FIG. 15 is a process flow diagram illustrating the set RPT timing sub-process of the instant invention.

As shown in FIG. 14, the RPT for each bus is built 338 through four functions: the set RPT timing function 340; the set RPT receive function 342; the set RPT monitor function 344; and finally the build RPT function 346. During the set RPT timing function 340 (see FIG. 15), the ti, tg, and sg protocol timing values are stored into the passed RPT array for the given bus using the values in the database. All 16 sets of values are set identically to allow cid multiplexing. Specifically, this function 340 fetches the timing values for the bus out of the database 348. It then verifies that the ti and tg values are in the proper range and starts building the bit pattern for the RPT timing locations 350. This function then picks the proper sg bit pattern based on the sg time value and finishes building the RPT bit patterns 352. Finally, this function stores 16 copies of the 2 timing bytes at the top of the RPT array 354, and returns 356.

Figure 16A:
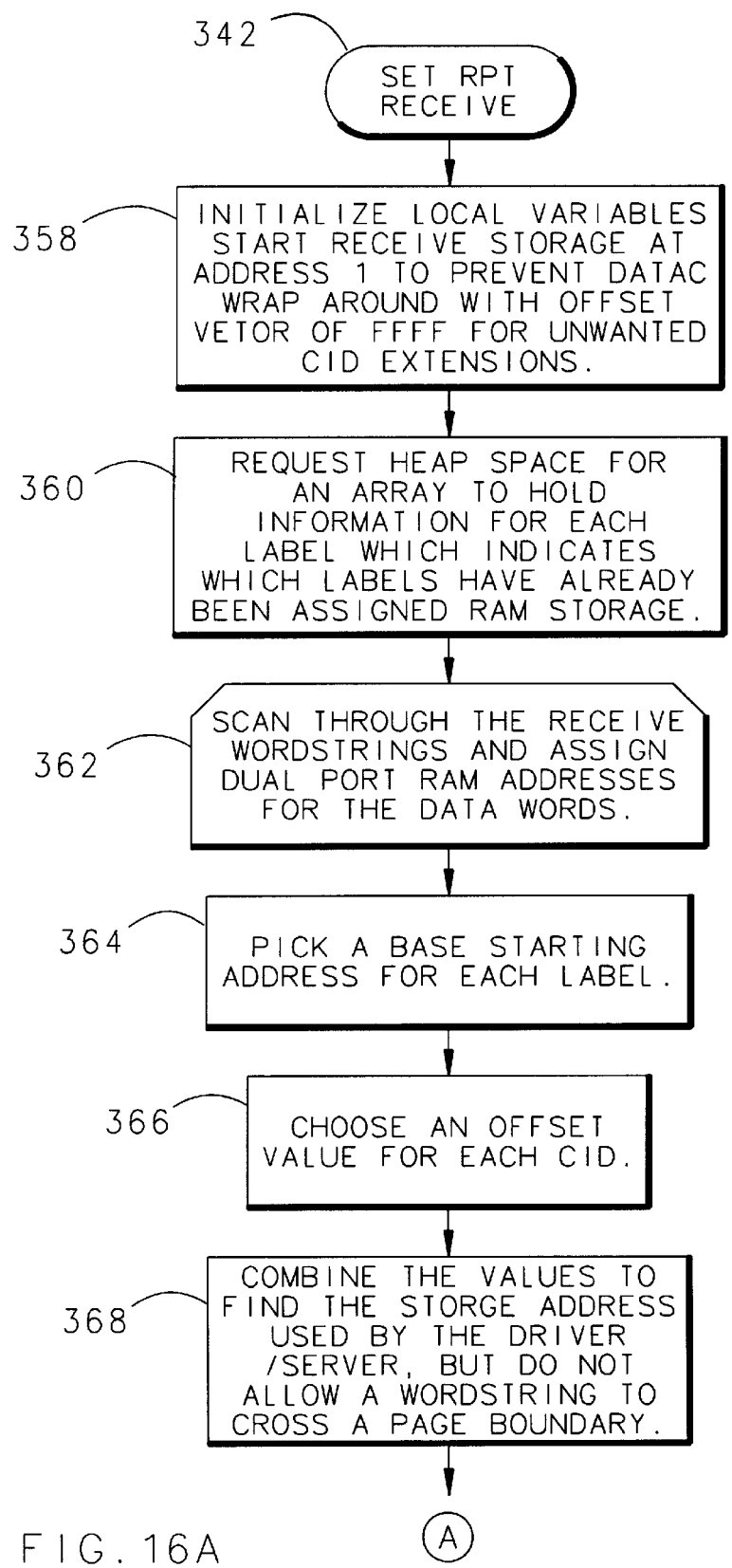
FIGS. 16A–16C are a process flow diagram illustrating the set RPT receive sub-process of the instant invention.
Figure 16B:
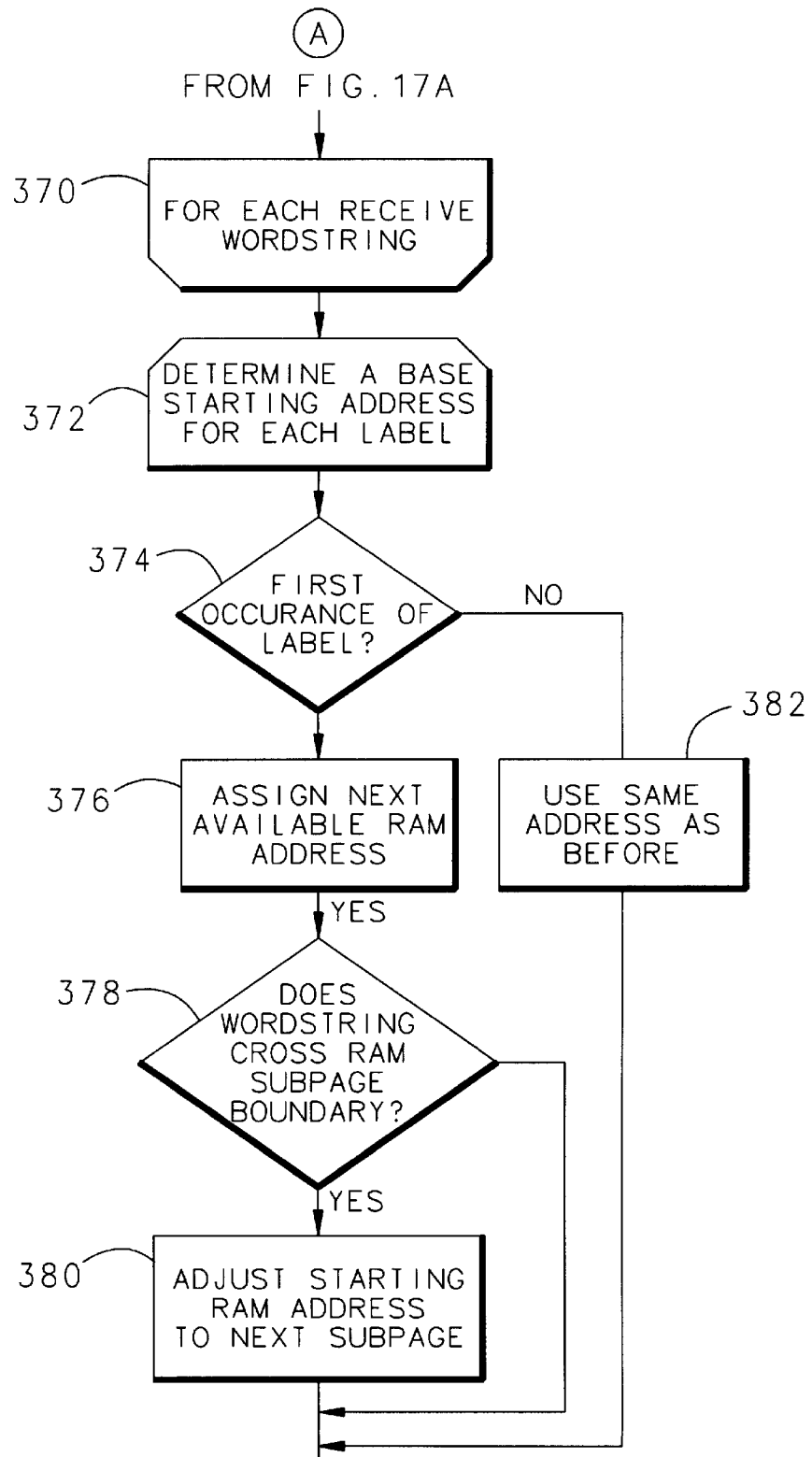
Figure 16C:
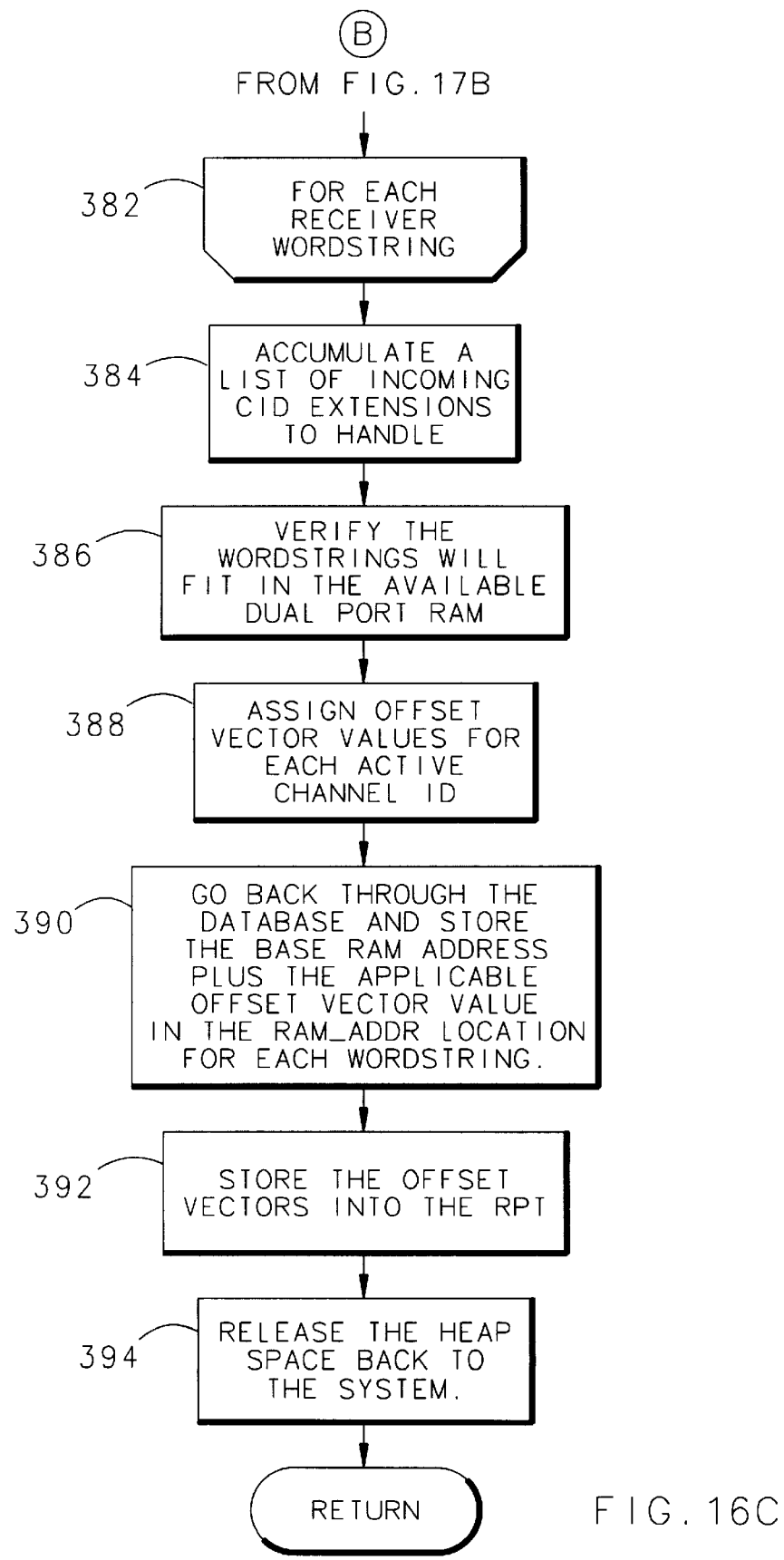
Figure 17A:
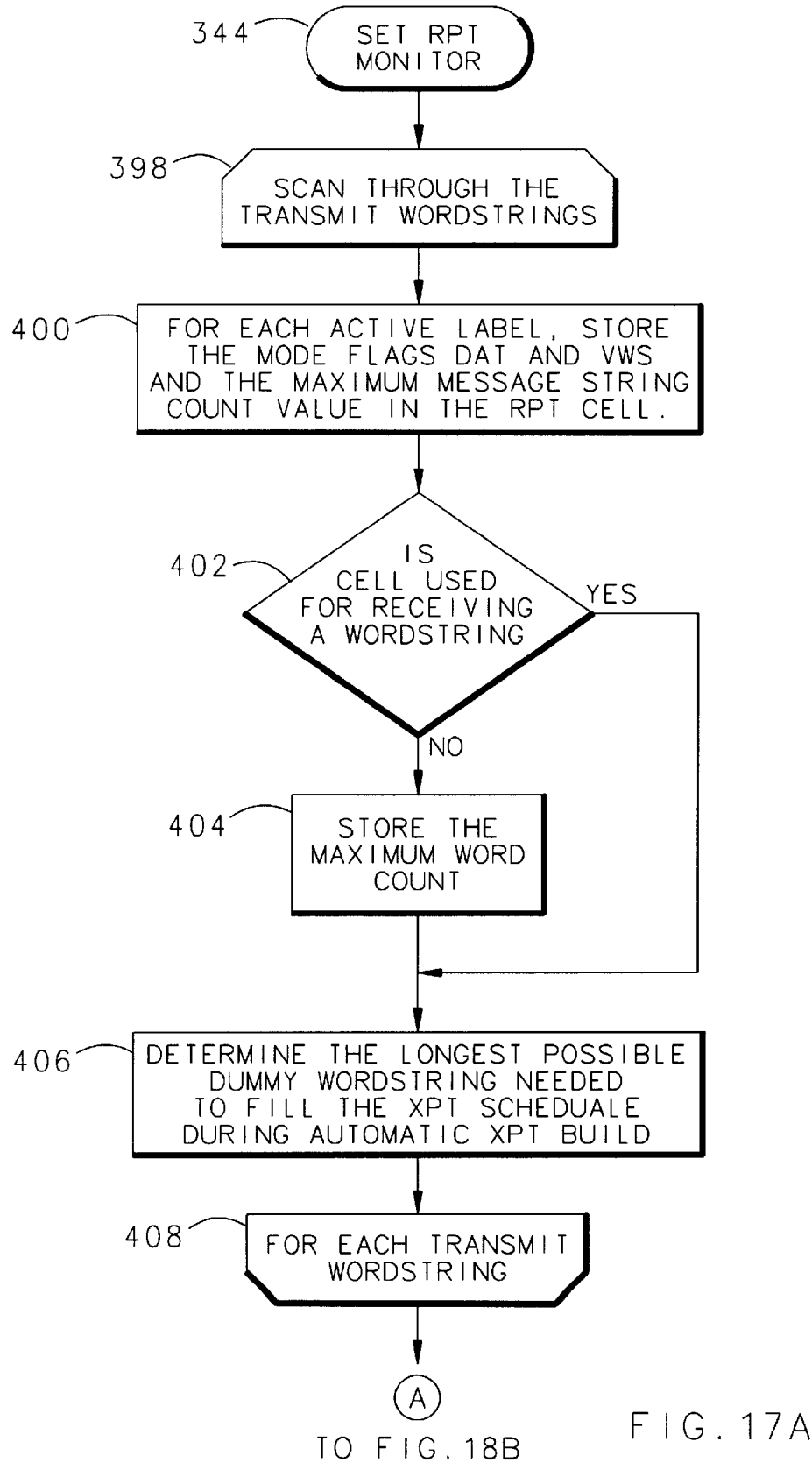
FIGS. 17A–17B are a process flow diagram illustrating the set RPT monitor sub-process of the instant invention.
Figure 17B:
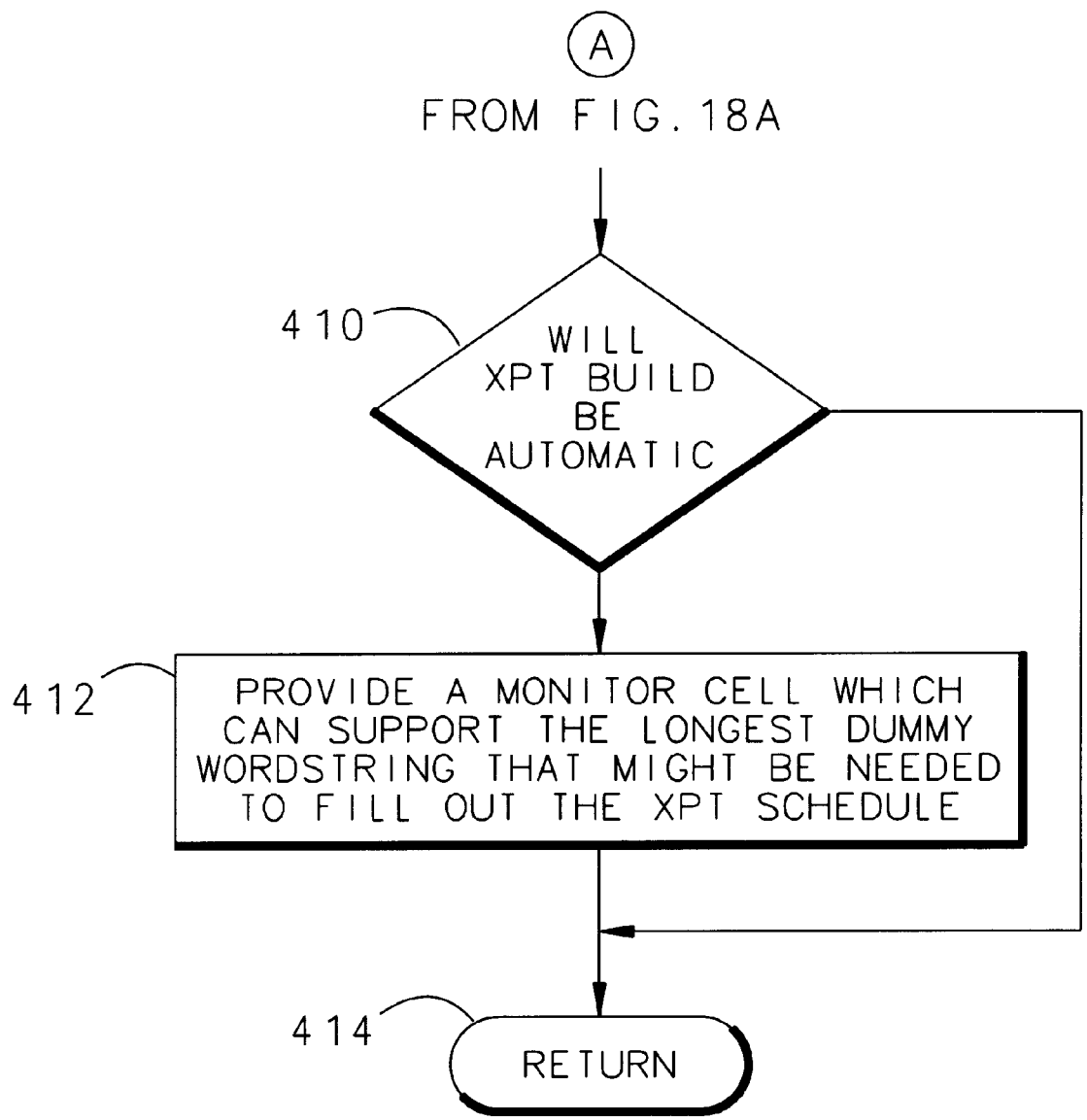

Next, the set RPT receive function 342 (see FIG. 16) determines the ram addresses and offsets needed for the receive labels defined for the passed bus. The final dual port ram destination for each wordstring is stored back into the database. Dual port ram base addresses are assigned to wordstrings sequentially using the maximum length with no regard to the incoming extension. Once the total ram area is determined, offset vectors are chosen for each extension and the preset card cid. Although this does not efficiently utilize all of the card ram area, it makes op and offset values easy to determine. This function also stores the receive mode flags, receive word count, offset pointer (op), interrupt vector, and the base ram address in the RPT. Specifically with reference to FIG. 17, this function 342 starts by initializes local variables 358. Receive storage is started at address 1 to prevent DATAC wrap around with an offset vector of FFFF for unwanted cid extensions. This function then requests heap space for an array to hold information for each label which indicates which labels have already been assigned ram storage 360. It then scans through the receive wordstrings and assigns dual port ram addresses for the data words 362. The addresses are from the DATAC chip's viewpoint and range from 0X0000 to 0X7FFF. The function first picks a base starting address for each label 364. Later an offset value is chosen for each cid 366. These are used in the RPT. Finally, the values are combined to find the storage address used by the driver/server 368. This continues for each receive wordstring 370.

To minimize the complexity and execution time in the driver/server, data word storage crossing a page boundary in the middle of a wordstring on the card will not be allowed. The 32 k words of receive word storage is broken into 4 pages, and the simulator can only access one page at a time. To avoid complexity here, the data is not packed as tightly as could be done if an analysis of was done to determine exactly which cids are active for each label. Instead, the function allocates the memory as if all wordstrings could be received with all cids in the database, and uses an offset value for each active cid. Although this does not efficiently utilize memory, it minimizes page changes, which wastes valuable CPU time, and allows all 16 cids to be handled. If the function only avoided the 8 k page boundaries, it could only use page-multiple offset values and could thus only handle 4 cids, or less, even if very little storage was used. Instead, this function pretends the pages are a submultiple of the actual page. This allows the offsets to be smaller, squeeze the data into fewer pages, and still miss the real page boundaries.

To continue, this set RPT receive function 342 determines a base starting address for each label 372. If this is the first occurrence of a label 374, the next available address is assigned 376. If the wordstring would cross a ram subpage boundary 378, this function adjusts the starting ram address to the next subpage 380. If, however, the label was already defined, the same address is used as before 382. This continues for each receive wordstring 382. A list of incoming cid extensions which must be handled is then accumulated 384, and the function then verifies that the wordstrings will fit in the available dual port ram 386. An offset vector values for each active channel id is then assigned 388. The function then goes back through the database and stores the base ram address plus the applicable offset vector value in the ram_addr location for each wordstring 390. Specifically, the base ram address, op value, I/E bit value, word count, message string count, interrupt vector, and the applicable receive mode flags are stored in the RPT cell for each wordstring. The offset vectors are then stored into the RPT 392. The RPT address for each offset vector is chosen using the low 3 bits of the op value (0 is chosen for all labels in the preferred embodiment), the base cid for this card from the bus setup record, and the received cid extension. These 11 bits when shifted left 4 places for a base address. The MSB of the offset vector is stored 7 bytes beyond the base and the LSB is stored 15 bytes from the base. Finally, the function releases the heap space back to the system 394 and returns 396.

The third major function, set RPTs monitor 344, sets up the RPT cells used to monitor the simulator's own transmission for the passed bus. The receive/monitor word count, VWS flag, and message string count will be written into the RPT for each transmit wordstring. If the RPT is being built automatically, a monitor cell is included for the dummy label used to fill gaps in the XPT. Initially, with reference to FIG. 17, this function 344 scans through the transmit wordstrings 398. For each active label, the function stores the mode flags DAT and VWS and the maximum message string count value in the RPT cell 400. If the cell is not already used for receiving a wordstring 402, this function also stores the maximum word count 404. The longest possible dummy wordstring needed to fill the XPT schedule during automatic XPT build is also determined 406. This continues for each transmit wordstring 408. If the XPT build will be automatic 410, this function provides a monitor cell which can support the longest dummy wordstring that might be needed to fill out the XPT schedule 412. Once it has done this, the function returns 414.

Figure 18:
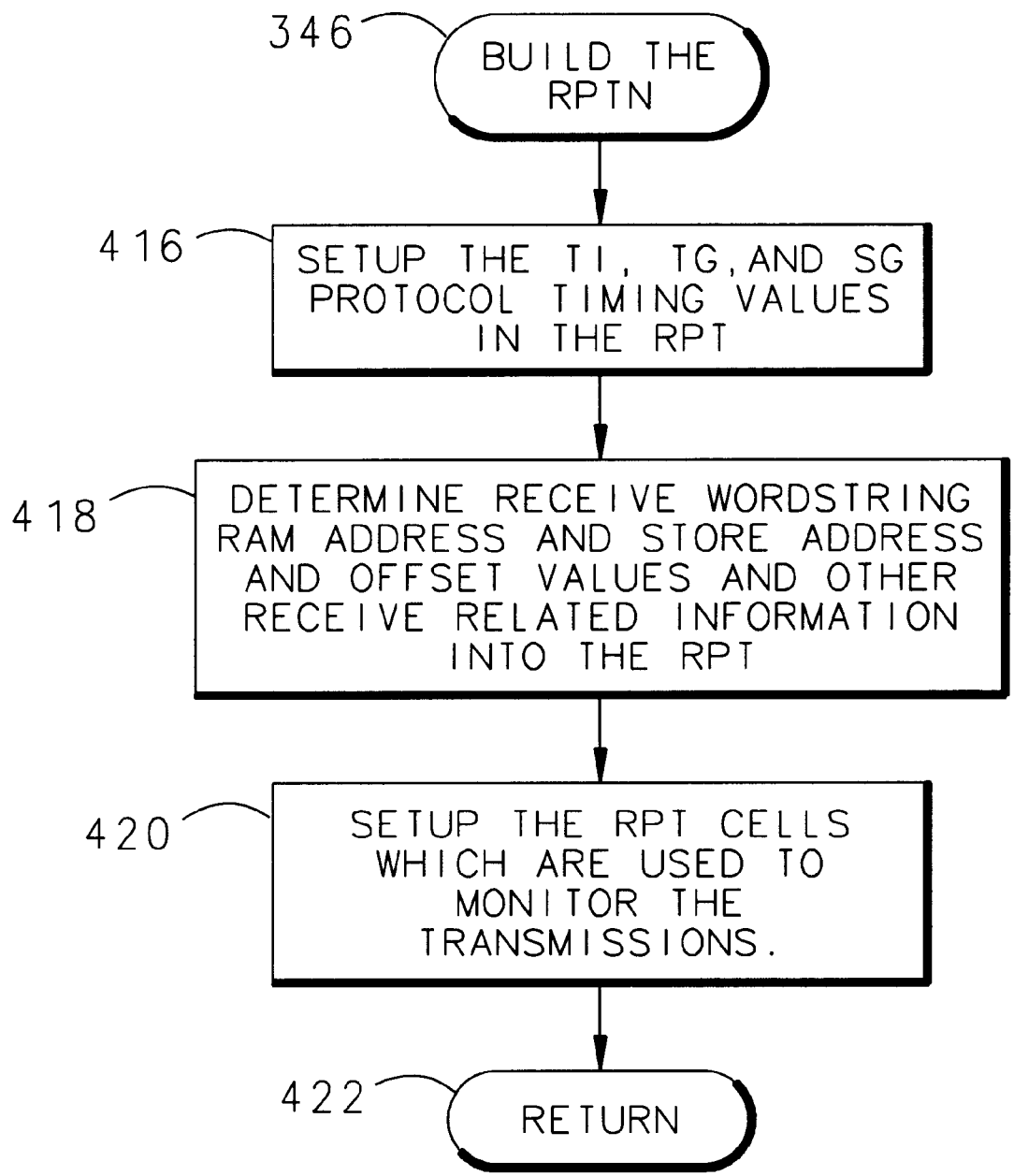
FIG. 18 is a process flow diagram illustrating the build the RPT sub-process of the instant invention.

The fourth major function in the RPT generation, build the RPT 346, builds the RPT for the passed bus from the information contained in the database. Specifically, with reference to FIG. 18, this function sets up the ti, tg, and sg protocol timing values in the RPT 416. It then determines receive wordstring ram addresses and stores these addresses and offset values and other receive related information into the RPT 418. Finally, this function sets up the RPT cells which are used to monitor the transmissions 420. Upon completion, this function returns 422.

Figure 19:
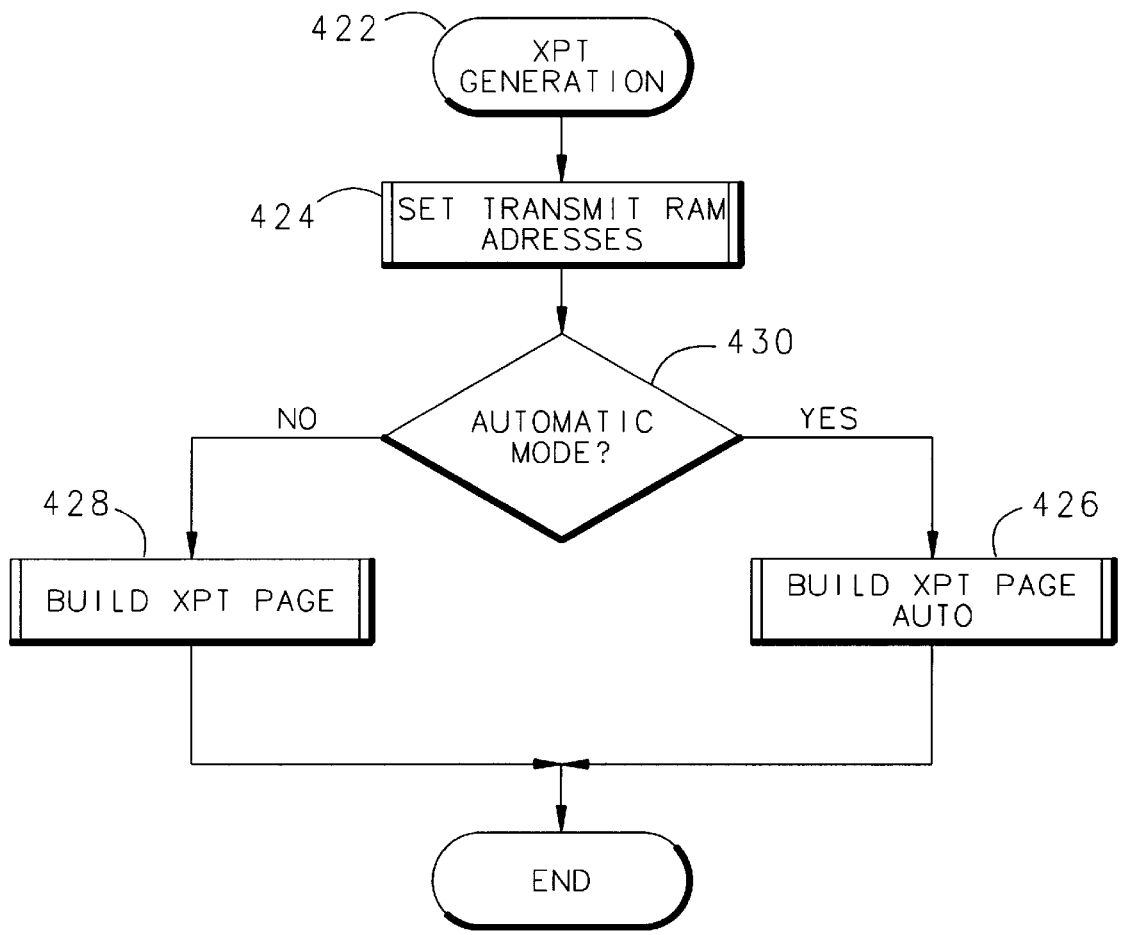
FIG. 19 is a process flow diagram illustrating the XPT generation sub-process of the instant invention.
Figure 20A:
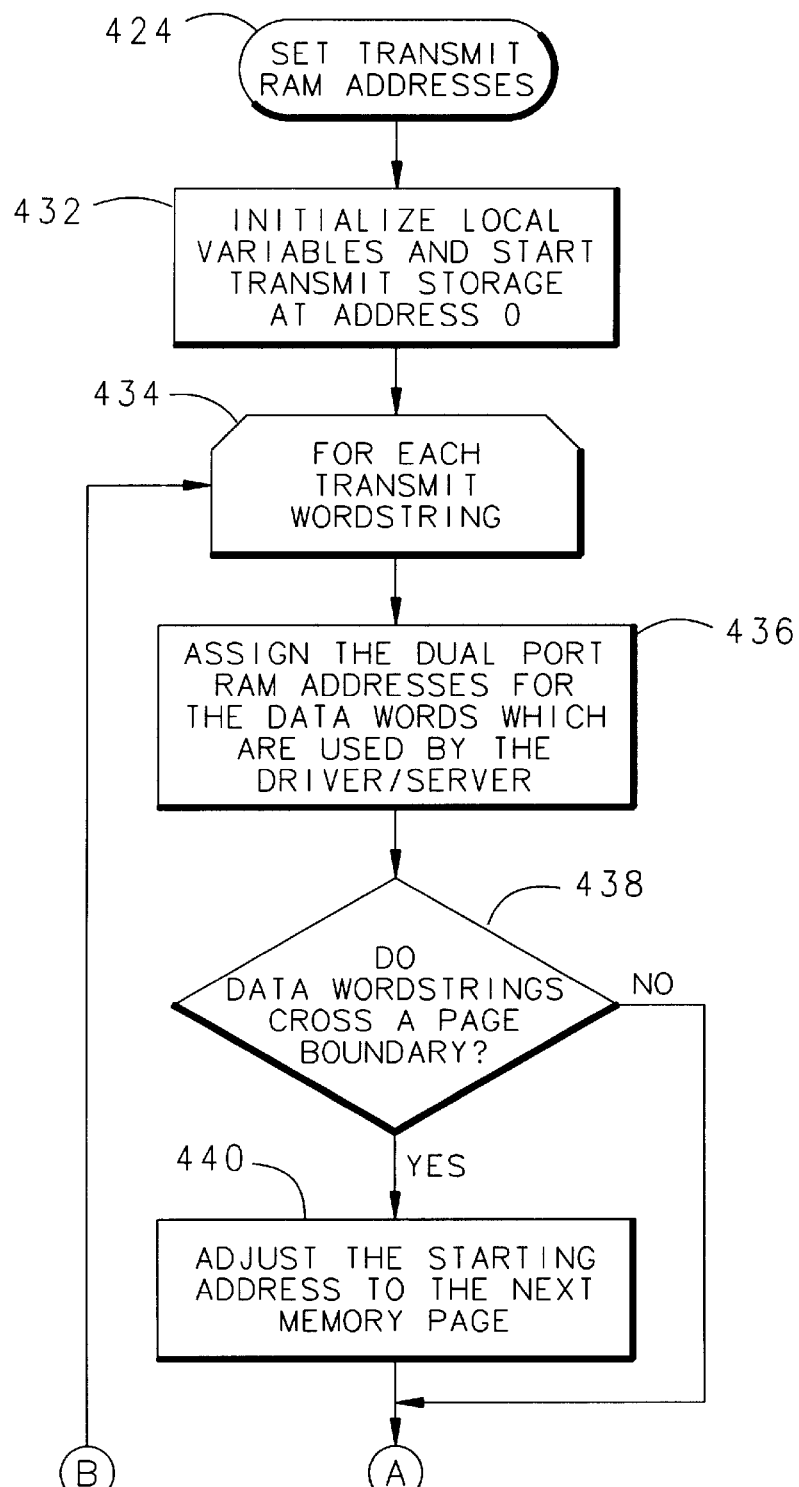
FIGS. 20A–20B are a process flow diagram illustrating the set transmit ram address sub-process of the instant invention.
Figure 20B:
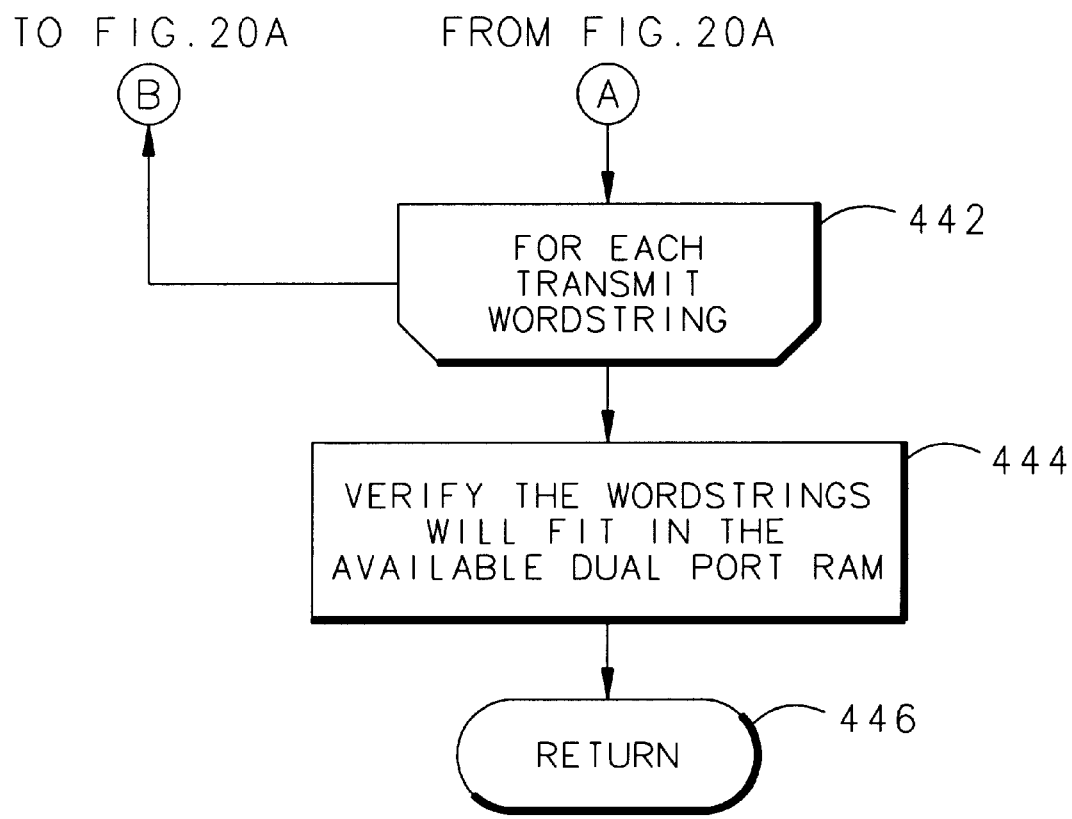
Figure 21A:
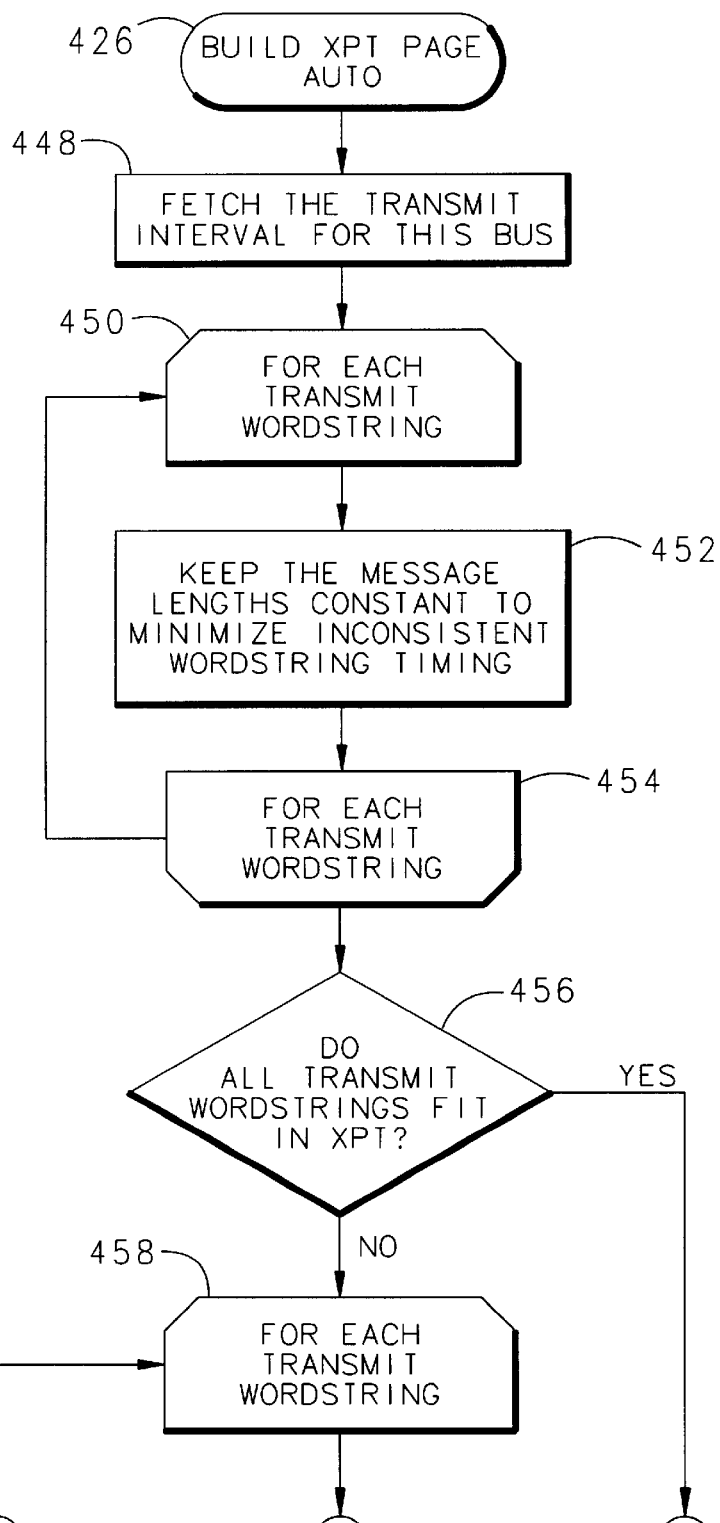
FIGS. 21A–21E are a process flow diagram illustrating the build XPT page auto sub-process of the instant invention.
Figure 21B:
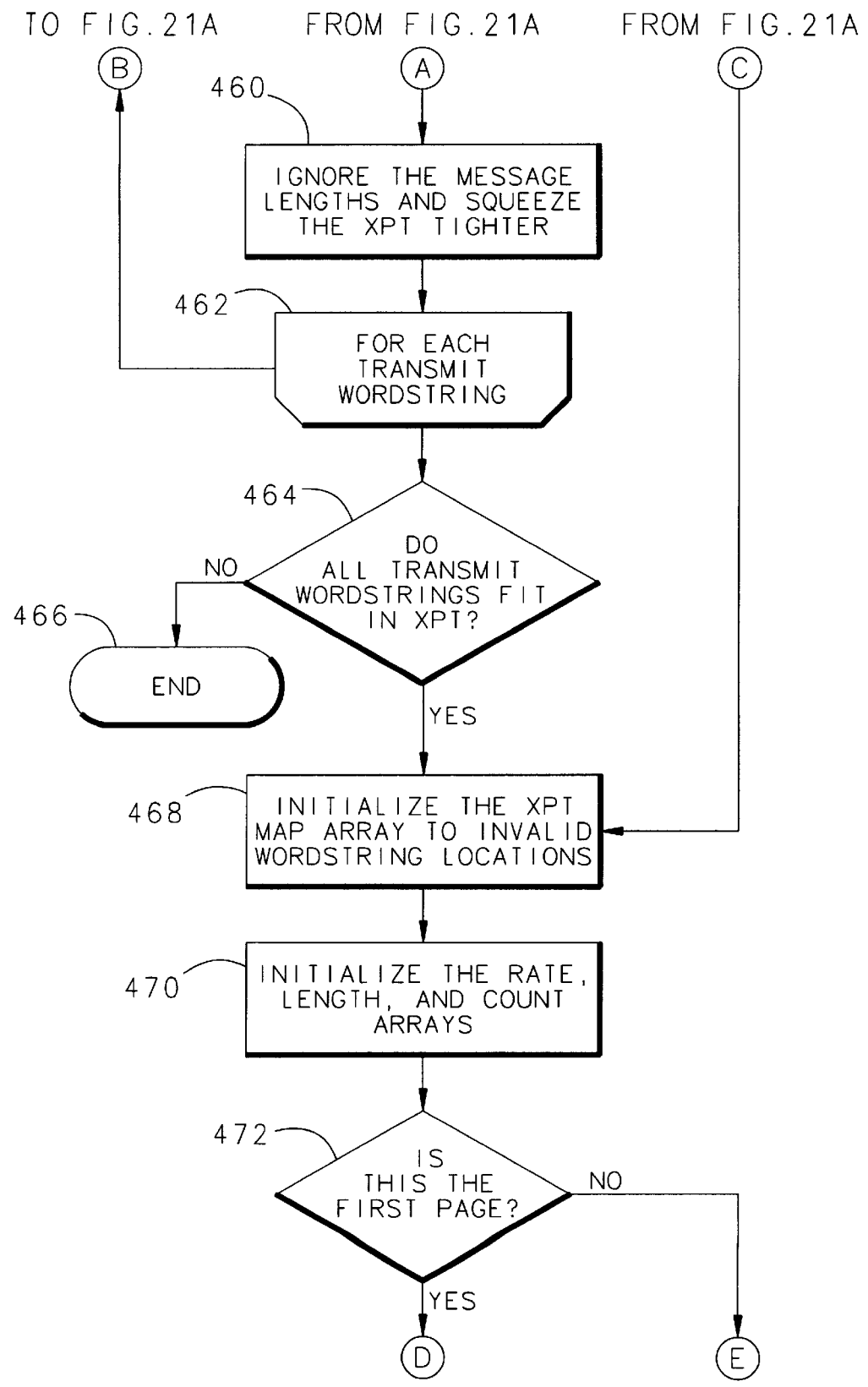
Figure 21C:
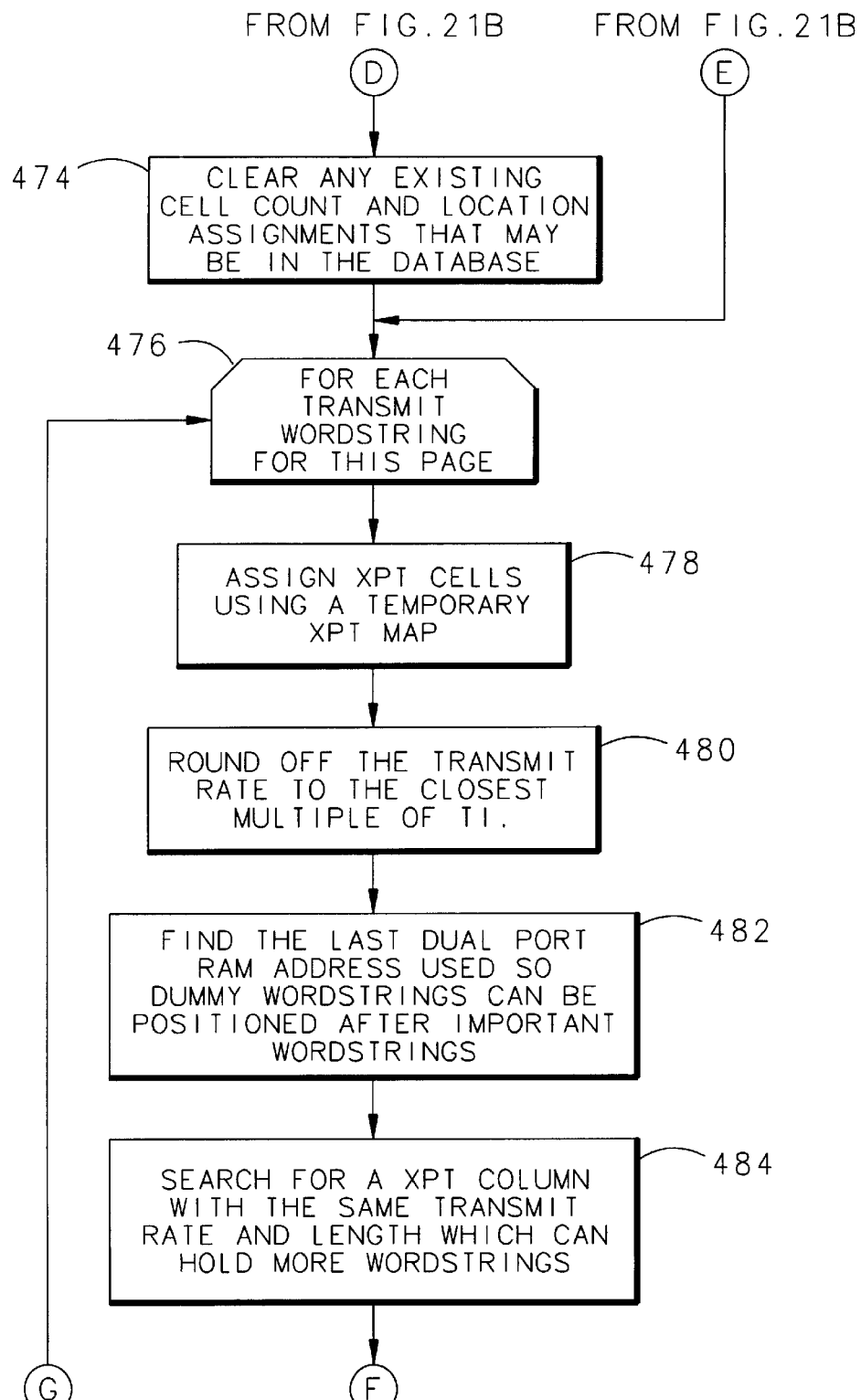
Figure 21D:
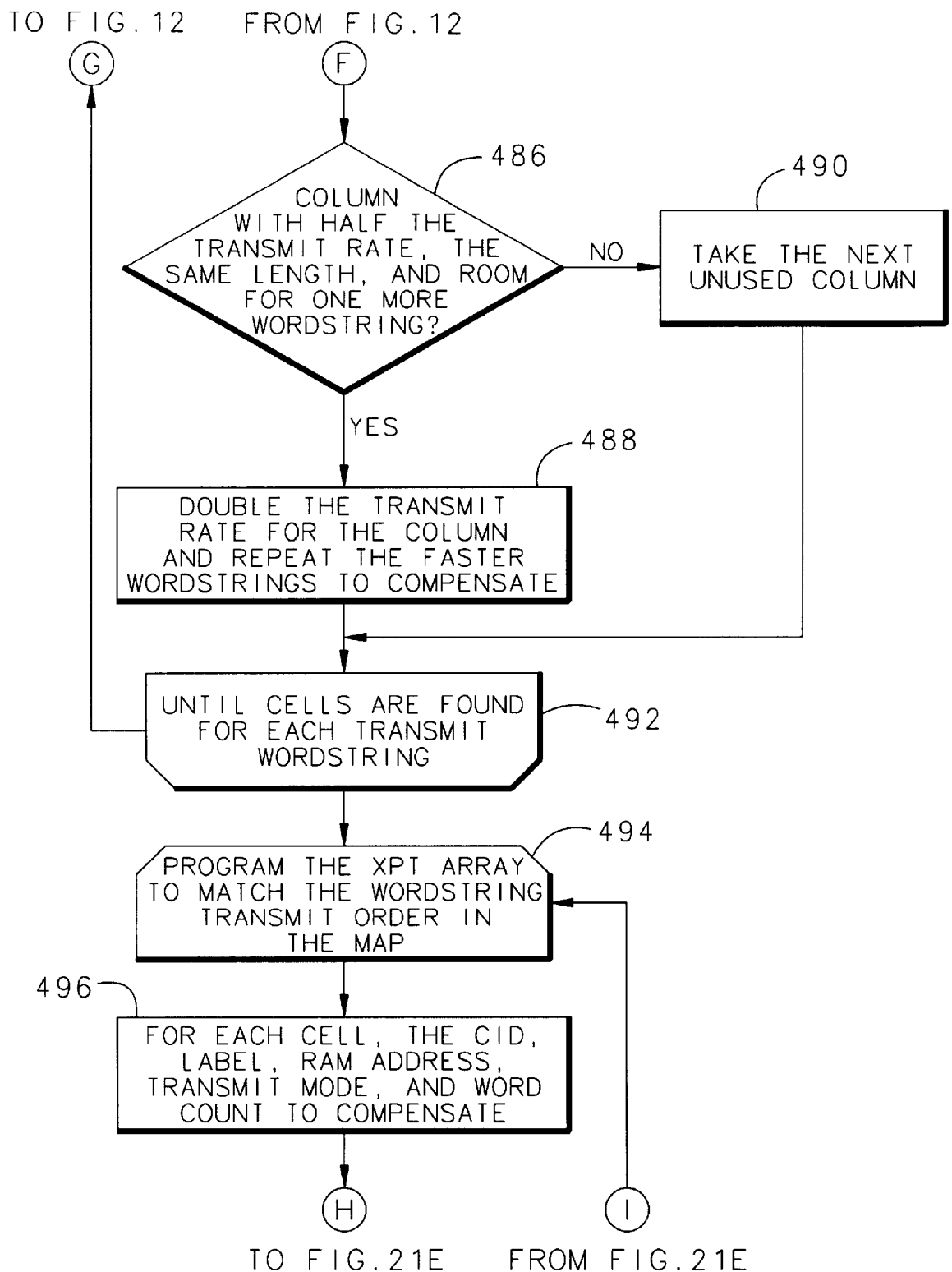
Figure 21E:
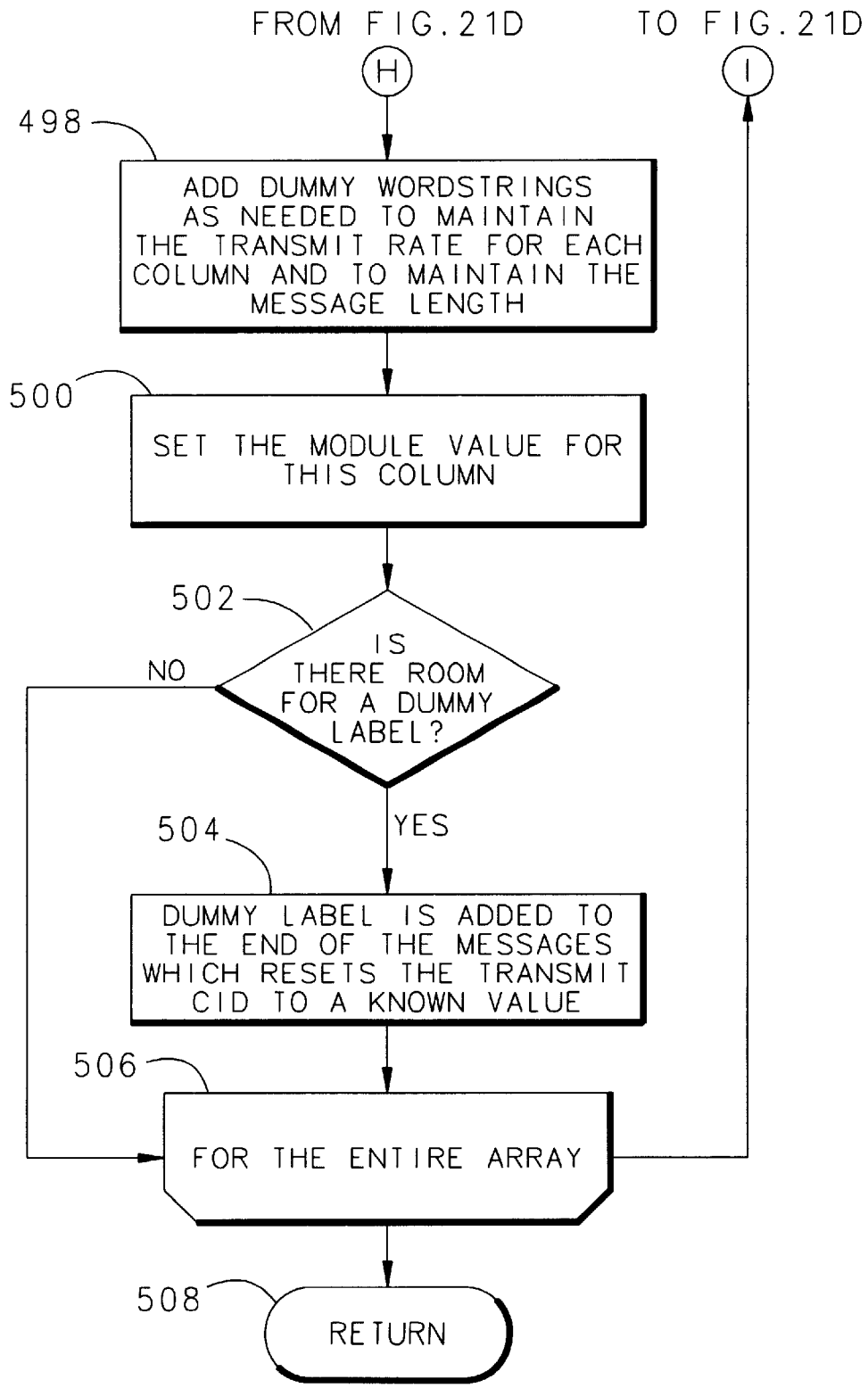

As shown in FIG. 19, four XPTs, one for each page, for each bus are built 422 through two functions: set transmit RAM addresses 424; and build XPT page auto 426, or build XPT page 428 (for manual build only 430), depending on the configuration file. The first function 424 determines the dual port ram addresses needed for the transmit labels defined for the passed bus on any page and stores them back into the database. The ram addresses are assigned to wordstrings sequentially. First, with reference to FIG. 20, this function 424 initializes local variables and starts transmit storage at address 0 432. It then scans through the transmit wordstrings 434 and assigns the dual port ram addresses for the data words which are used by the driver/server 436. The addresses are from the DATAC chip's viewpoint and range from 0X0000 to 0X7FFF. To minimize the complexity and execution time in the driver/server, data word storage crossing a page boundary in the middle of a wordstring on the card will not be allowed. The 32 k words of receive word storage is broken into 4 pages, and the simulator can only access one page at a time. If a data wordstring crosses a page boundary 438, the function adjusts the starting address to the next memory page 440. Once this is complete 442, this function verifies that the wordstrings will fit in the available dual port ram 444 and returns 446.

Next, the function build XPT page auto 426 builds the transmit personality table (XPT) for the passed bus and page from data contained in the database. Cell locations are assigned automatically to achieve the desired transmit rate for each wordstring. Dummy labels are used to fill the transmit schedule where needed. This function requires use of the independent mode. Initially, with reference to FIG. 21, this function 426 fetches the transmit interval for the particular bus 448. On the first pass through the build process 450, this function attempts to keep the message lengths constant to minimize inconsistent wordstring timing or jitter 452. This continues for each transmit wordstring 454 If the function cannot fit all the wordstrings into the XPT 456, the second pass 458 will ignore the message lengths and pack the data a little tighter 460. This will continue for each transmit wordstring 462 If all the wordstrings still will not fit 464, the process is terminated 466. If they do fit, this function initializes the XPT map array to invalid wordstring locations 468, thereafter initializing the rate, length, and count arrays 470. If this is the first page 472, the function clears any existing cell count and location assignments that may be in the database 474. It then scans through the transmit wordstrings for this XPT page 476 and assigns XPT cells using a temporary XPT map 478.

This function will maintain the requested transmit rate for each wordstring and, if pass 1, a constant length for each message by choosing a transmit rate and length for each XPT column. The XPT is packed as tightly as possible by combining wordstrings at one rate with wordstrings at twice that rate together in one column. At least one wordstring must be defined for the XPT page to be available for use. The transmit rate for each wordstring is rounded off to the closest multiple of ti 480. The last dual port ram address used is then found so that dummy wordstrings can be positioned after important wordstrings if needed 482. The function then searches for a XPT column with the same transmit rate and length which can hold more wordstrings 484. If a column with half the transmit rate, the same length, and room for one more wordstring is found 486, the function doubles the transmit rate for the column and repeats the faster wordstrings to compensate 488. If no such column is found, the function positions the wordstring in the next unused column 490. If no labels are enabled for this page the function quits. If cells were found for every wordstring the function exits; if not, it loops 492.

Next, the XPT array is programmed to match the wordstring transmit order in the map 494. For each cell, the cid, label, ram address, transmit mode, and word count are programmed from data in the corresponding wordstring in the database 496. Dummy wordstrings are added as needed to maintain the transmit rate for each column and to maintain the message length 498. The EOM bit is set high in only the last wordstring of each row, but only if a dummy label cannot be added at the end. The SYNC bits will be high in all cells since the alternate schedule is not being used. Finally, the modulo value for this column is set 500. If there is room 502, a dummy label is added to the end of the messages which resets the transmit cid to a known value 504 in order to eliminate an incorrect impersonation error indication from the card which appears with some mixes of cids and labels. This continues for the entire array 506. Once complete, the function returns 508.

Figure 22:
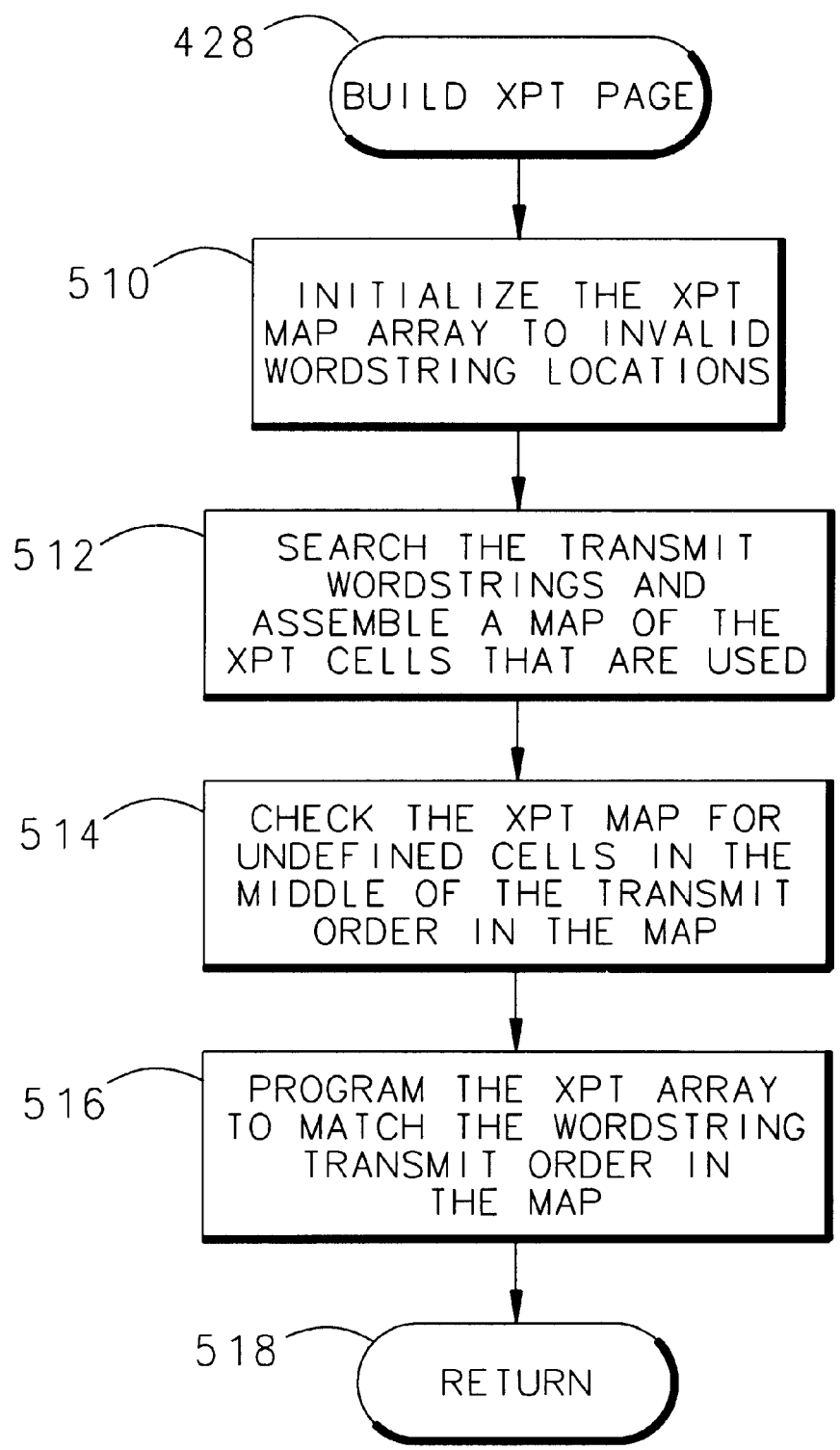
FIG. 22 is a process flow diagram illustrating the build XPT page sub-process of the instant invention.
Figure 23:
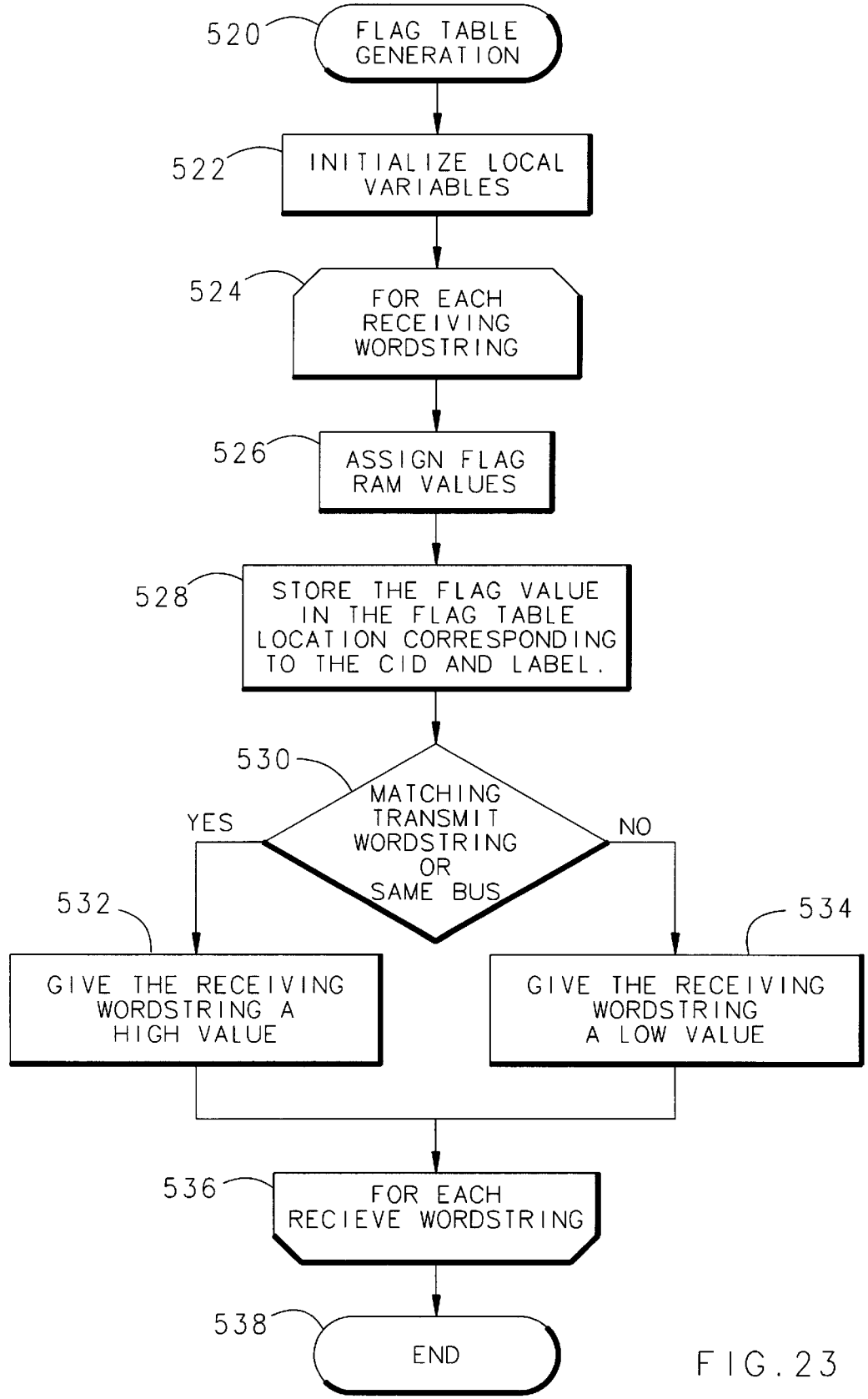
FIG. 23 is a process flow diagram illustrating the flag table generation sub-process of the instant invention.

If, instead, a manual build were requested 430 (see FIG. 22), the function build XPT page 428 would build the transmit personality table for the passed bus and page from data contained in the database, including cell locations specified in the configuration file. First, with reference to FIG. 23, this function initializes the XPT map array to invalid wordstring locations 510. The function then searches the transmit wordstrings and assembles a map of the XPT cells that are used 512. It is an error if the cell address is out of range or if the same cell is referenced twice. The value placed in the map is the wordstring number rather than the label number because the function needs to parse the map later and get more information from the database. Next, this function checks the XPT map for undefined cells in the middle of the transmit schedule 514. All primary schedules begin at cell 0,0. In block mode, all messages start at column 0 and use consecutive cells in each row horizontally. Column 0 must use consecutive cells vertically. In independent mode, each column must start in row 0 and use consecutive cells vertically. Since row 31 and column 31 are not used as transmit cells, these areas in the map will be used as temporary counters. In the preferred embodiment, the use of alternate schedules is not supported, although 4 primary schedules are supported.

Finally, this function programs the XPT array to match the wordstring transmit order in the map 516. For each cell, the cid, label, ram address, transmit mode, and word count are programmed from data in the corresponding wordstring in the database. The same wordstring can appear in several places in the XPT using the same cell data with one exception, the EOM bit is set high in only the last wordstring of each row. The SYNC bits will be high in all cells since the simulator is not using the alternate schedule. XIVL and XIVT will also be high. Row 31 and column 31 contain the highest row(s) and columns found in the previous step. The final step is programming the control cell(s) in row 31 of the XPT array with the modulo value(s). Once this is complete, the function returns 518.

Another function 520 (see FIG. 23) generates the flag table. This function determines the flag values for the receive labels defined for the passed bus and builds the flag ram table. First, with reference to FIG. 23, the local variables are initialized 522. Next for each receive wordstring 524, this function goes through the database and assigns flag ram values 526. It then stores the flag value in the flag table location corresponding to the cid and label 528. The function then searches for a matching transmit wordstring on the same bus 530. If found, it gives the receive wordstring a high flag value so it can be distinguished later 532. If there is no matching transmit wordstring, the receive wordstring is given a low flag value 534. This continues for each receive wordstring 536, and then ends 538.

Figure 24:
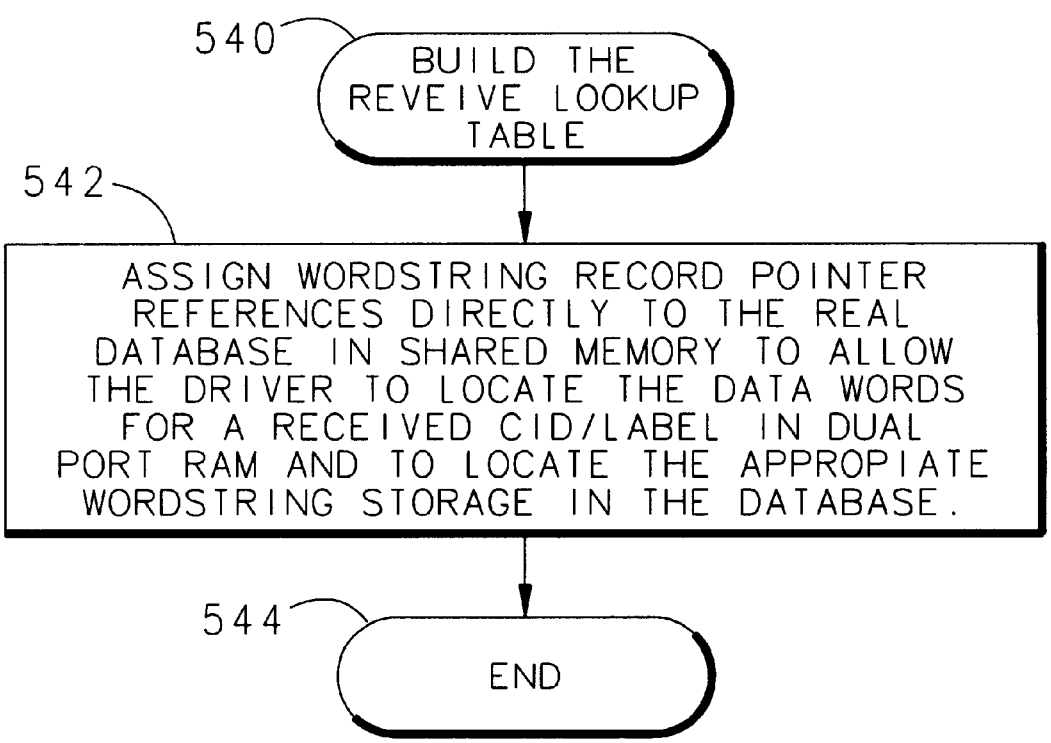
FIG. 24 is a process flow diagram illustrating the build the receive lookup table sub-process of the instant invention.

A further function 540 illustrated on FIG. 24, builds the receive lookup table for the passed bus. The calling function should store the table in a disk file. During startup or following a rebuild, the server loads the file and passes the table to the driver. The driver uses this table to locate the data words for a received cid/label in dual port RAM, and to locate the appropriate wordstring storage in the database. The receive lookup table includes pointer references directly to records in the real database in shared memory even though most everything is currently being built from a temporary copy just loaded from a new configuration file. Specifically, this function assigns wordstring record pointer references directly to the real database in shared memory to allow the driver to locate the data words for a received cid/label in dual port ram and to locate the appropriate wordstring storage in the database 542. Once this is complete for each receive wordstring, this function returns 544.

Figure 25:
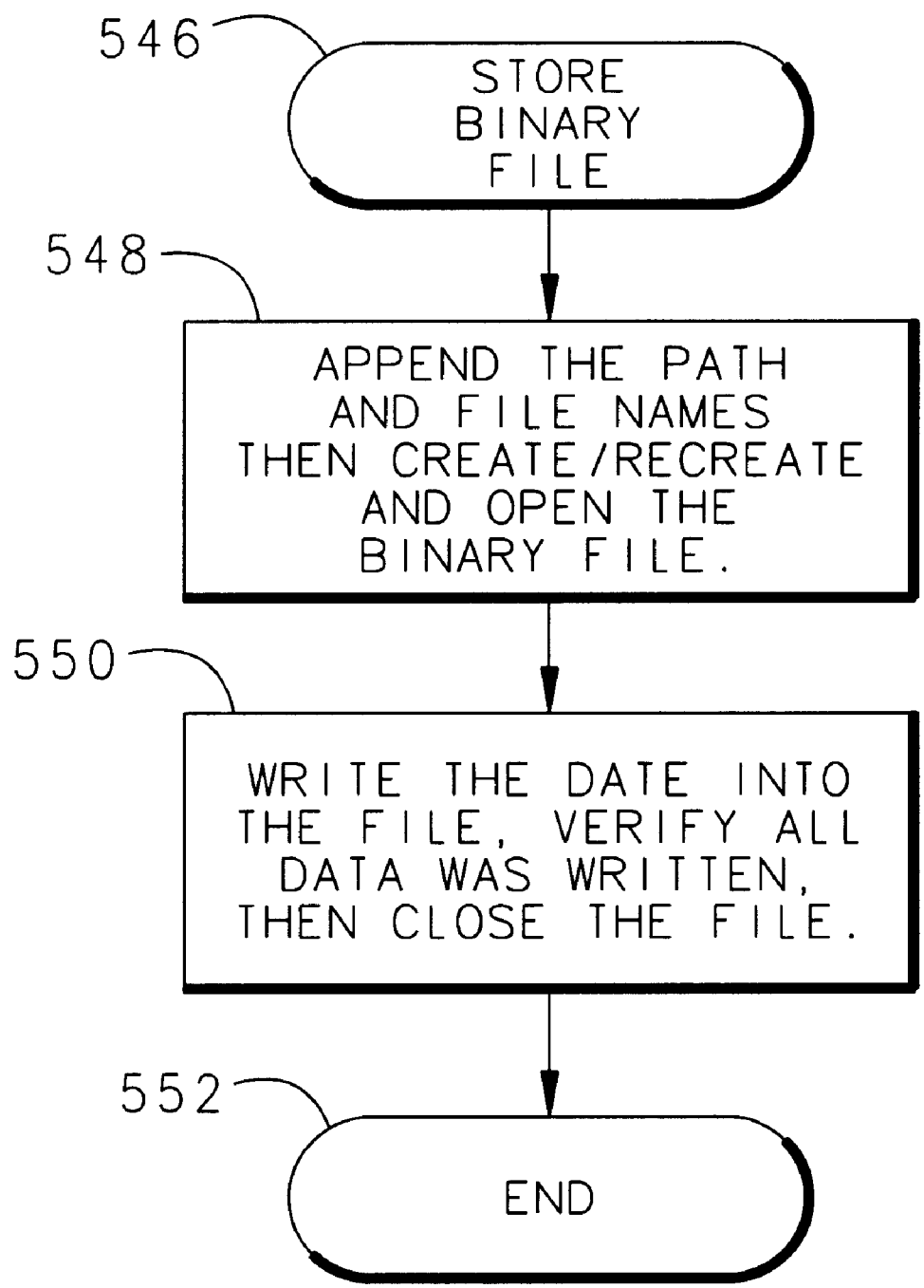
FIG. 25 is a process flow diagram illustrating the store binary file sub-process of the instant invention.

FIG. 25 illustrates the store binary file function 546. This process first appends the path and file names, creates/recreates, and opens the binary file 548. It then writes the date into the file, verifies all data was written, and closes the file 550. The function then ends 552.

Save Configuration Process

This process 158 (see FIG. 3) is started by the dispatch process 150 when the user chooses to save the present state of the database 174 to a file 176. The database may be saved in two formats. The first format is that of a configuration file (.cfg) which may be reloaded by the user, and the second format (.dump) contains system debug information. The saved configuration file contains the current values of all transmit data words and named parameter menu items, the current freshness counter and equation enable states, and the current wordstring, engineering unit group, and named parameter group display selections. The saved diagnostic dump file contains all user defined and system data in the ARINC 629 database.

Figure 9:
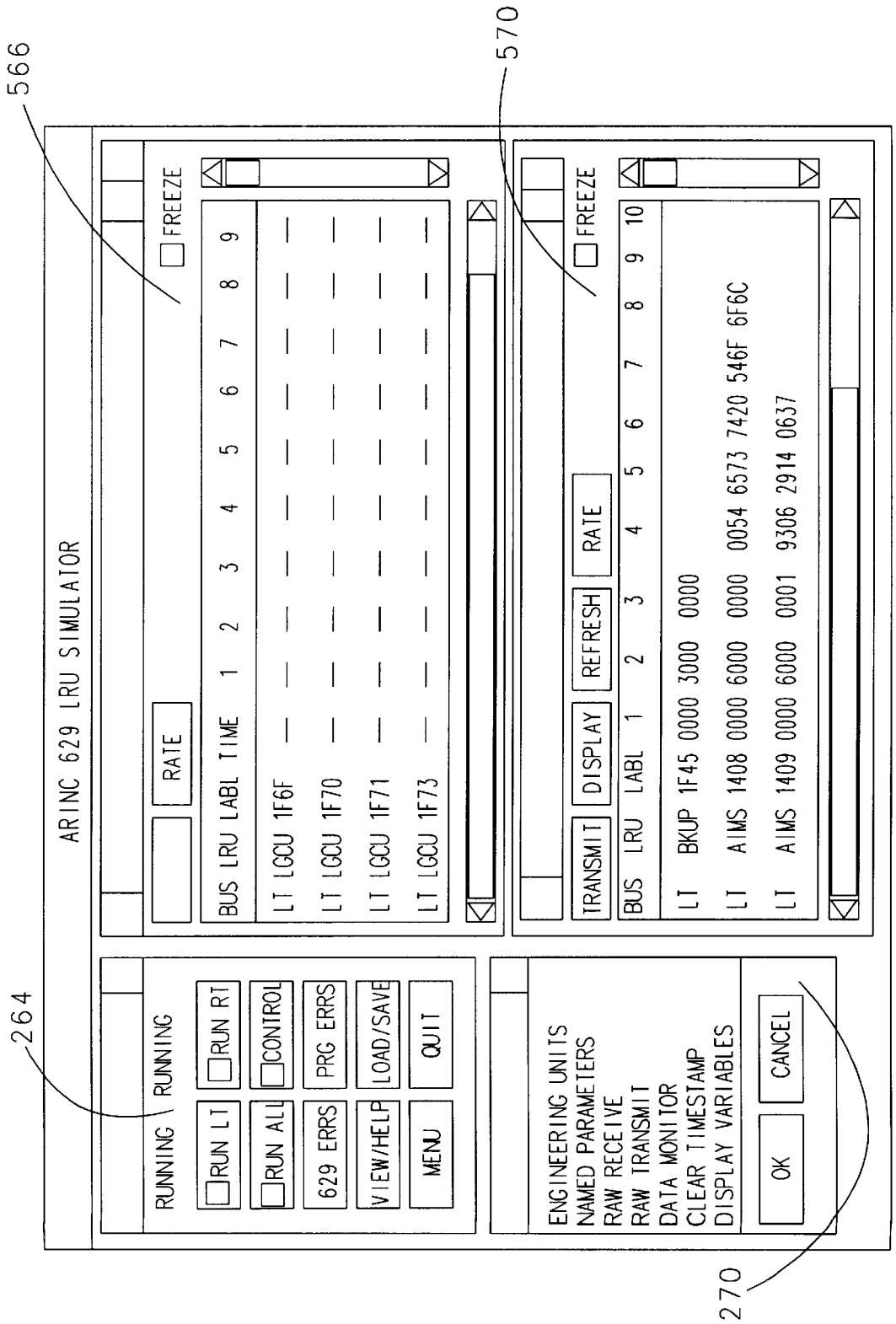
FIG. 9 illustrates a graphical and textural display in accordance with the instant invention.
Figure 26:
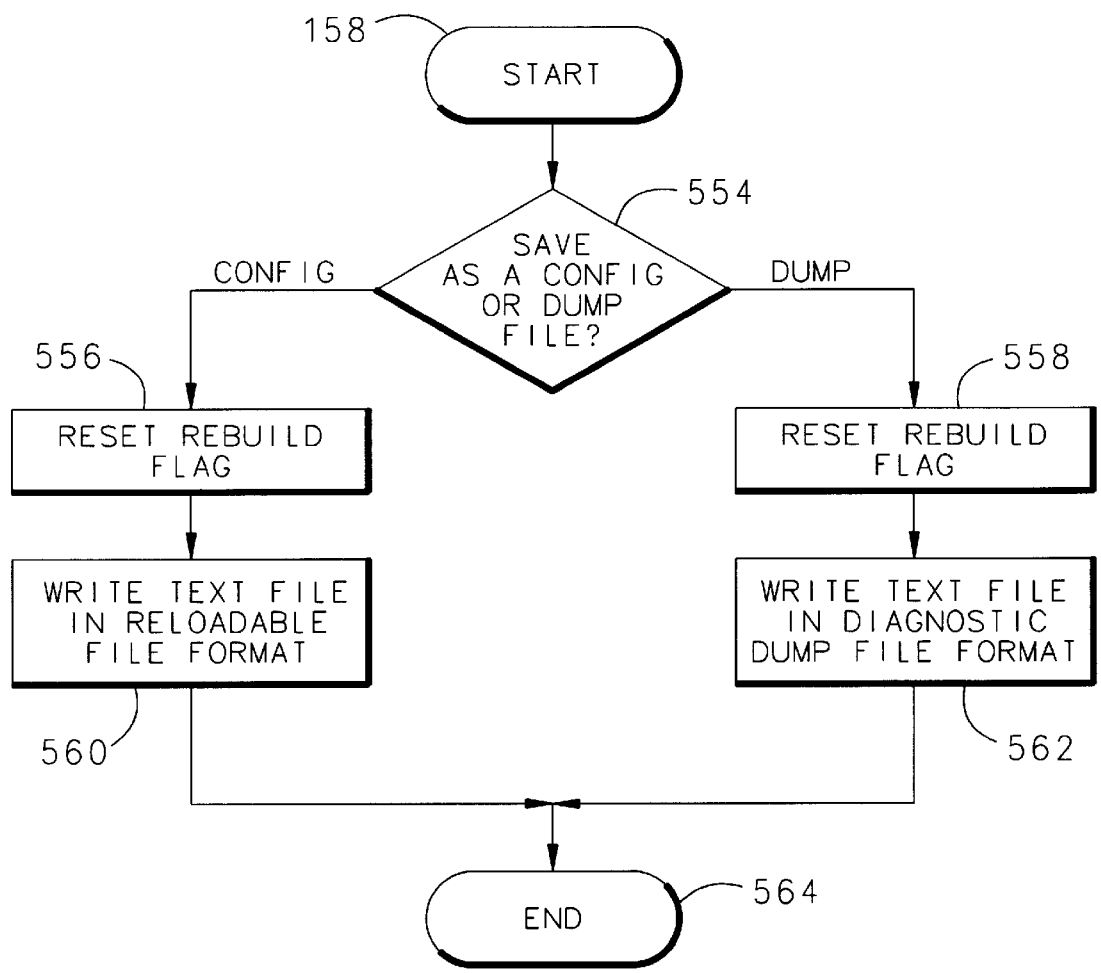
FIG. 26 is a process flow diagram illustrating the save configuration process of the instant invention.

The save configuration process is normally activated through the control panel process which permits the operator to select or enter the desired filename (see FIG. 9). Reloadable files normally reside in a configuration directory and the file names end with a .cfg extension. Diagnostic dump file names end with a .dump extension. The control panel process invokes the save configuration process indirectly through the dispatch process and provides the path name of the desired output file in a command line argument. As illustrated in FIG. 26, the save configuration process 158 first determines whether to save the configuration as a text file in reloadable configuration file format or diagnostic dump format 554. It then reads the ARINC 629 database 556 or 558 and outputs a text file in reloadable configuration file format 560, or diagnostic dump format 562. Once this is complete, this function ends 564.

Raw Receive Display Process

Figure 27:
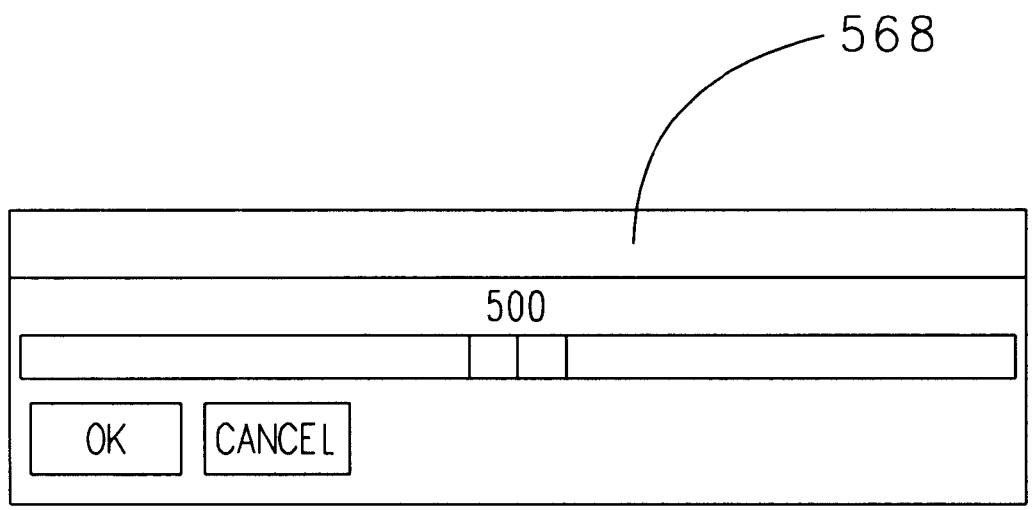
FIG. 27 illustrates a graphical and textural display in accordance with the instant invention.

The raw receive display process provides a display of the wordstrings received from the ARINC 629 communication buses, see FIG. 9, raw receive data display menu 566. The bus name, LRU name, cid and label, and the data words are displayed in a hexadecimal format for each of the labels selected by the user. The relative time (in ms) since the label was last received is also displayed. The user has the ability to adjust the update rate of the display, or freeze the display. The update rate adjust menu 568 is illustrated in FIG. 27, and allows the user to adjust the rate via the mouse.

Raw Transmit Display Process

The raw transmit display process provides a display 570 (see FIG. 10) of the wordstrings transmitted on the ARINC 629 communication buses. The bus number, simulated LRU name, cid and label, and data words are displayed in hexadecimal format for each of the labels selected by the user. The user may also adjust the update rate of the display or freeze the display. The update rate adjust menu 568 is illustrated in FIG. 27, and allows the user to adjust the rate via the mouse. The raw transmit display allows the user to select and edit one or more data words in hexadecimal or binary. All data changes to the same wordstring are made in the same transmit interval to insure wordstring integrity. Other data changes will be updated within one transmit interval of the slowest wordstring selected. The raw transmit display also allows the user to enable or disable the automatic update of freshness counters of selected labels, see refresh control menu 572, FIG. 28, as well as observe changes made to transmit data by other processes, in particular the equation process.

Engineering Unit Display Process

Figure 6:
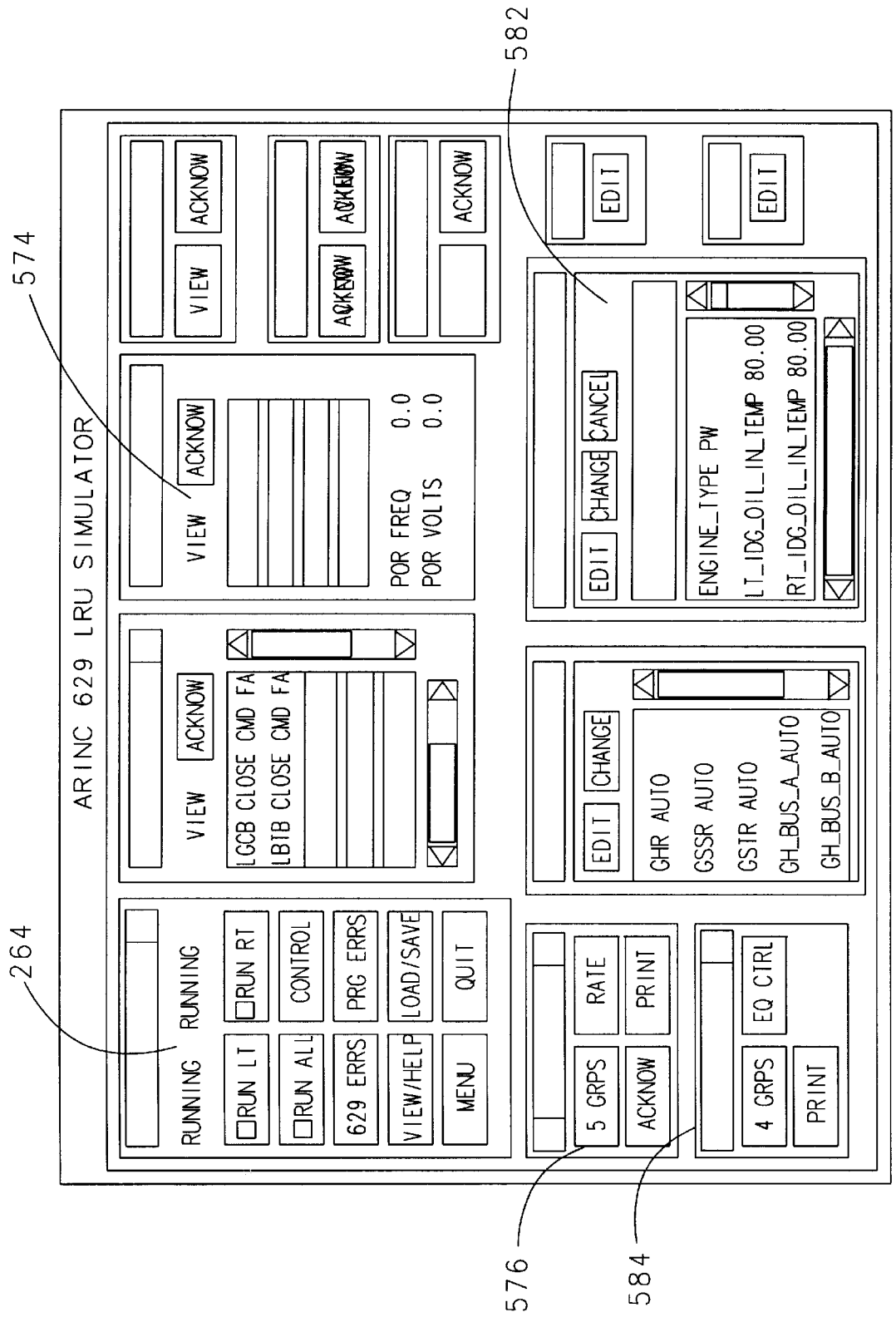
FIG. 6 illustrates a graphical and textural display in accordance with the instant invention.
Figure 29:
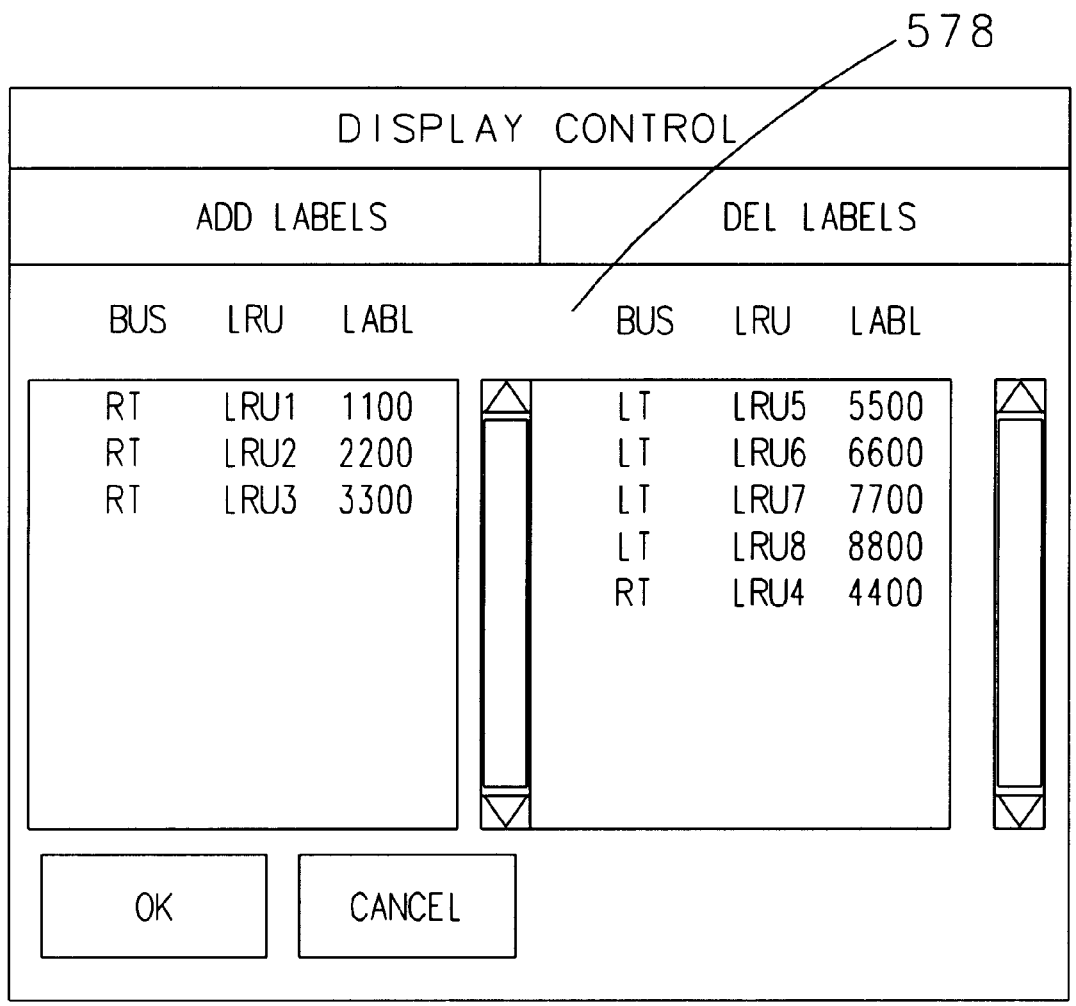
FIG. 29 illustrates a graphical and textural display in accordance with the instant invention.

The engineering unit display process provides a display 574, see FIG. 6, of received or transmitted ARINC 629 data in engineering unit terms rather than in hexadecimal. It accomplishes this by associating user defined parameter names, state names, scale factors, and limits to data words or bits. The color of each parameter changes to indicate the item is in or out of tolerance or not in an expected state. The user has the ability, through menu 576, to select which groups of engineering units to display (see display control menu 578, FIG. 29), select the update rate of the display (see menu 568, FIG. 27), print out the current engineering unit values, and acknowledge out of tolerance conditions. The display is configured through definitions in the configuration file allowing complete flexibility.

Named Parameter Process

Figure 30:
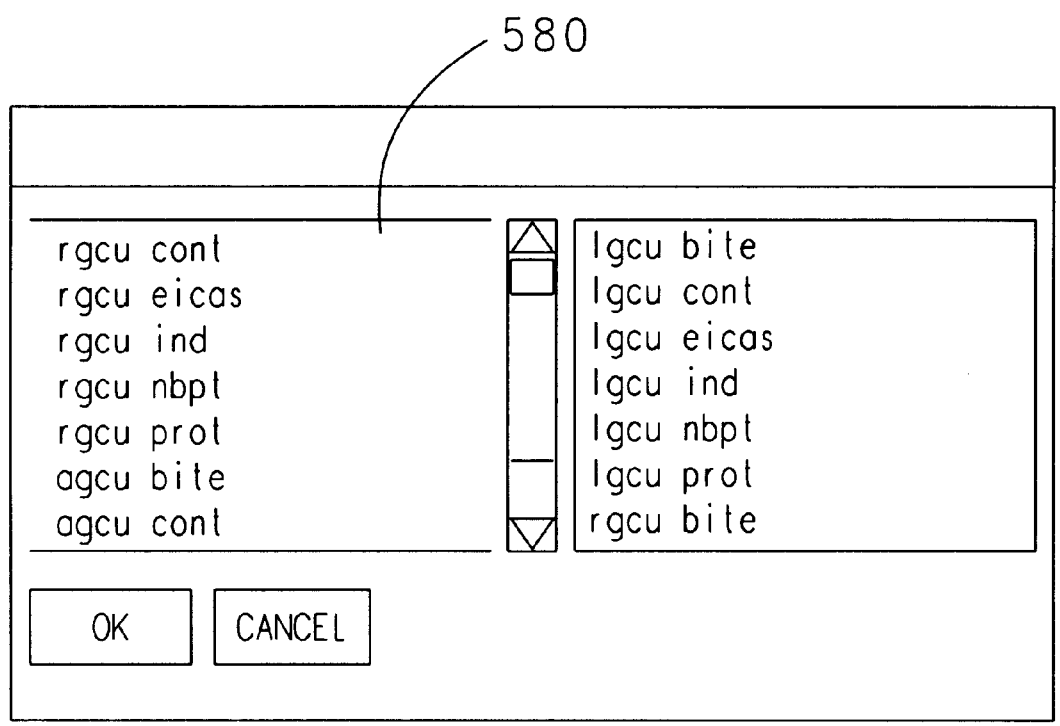
FIG. 30 illustrates a graphical and textural display in accordance with the instant invention.
Figure 31:
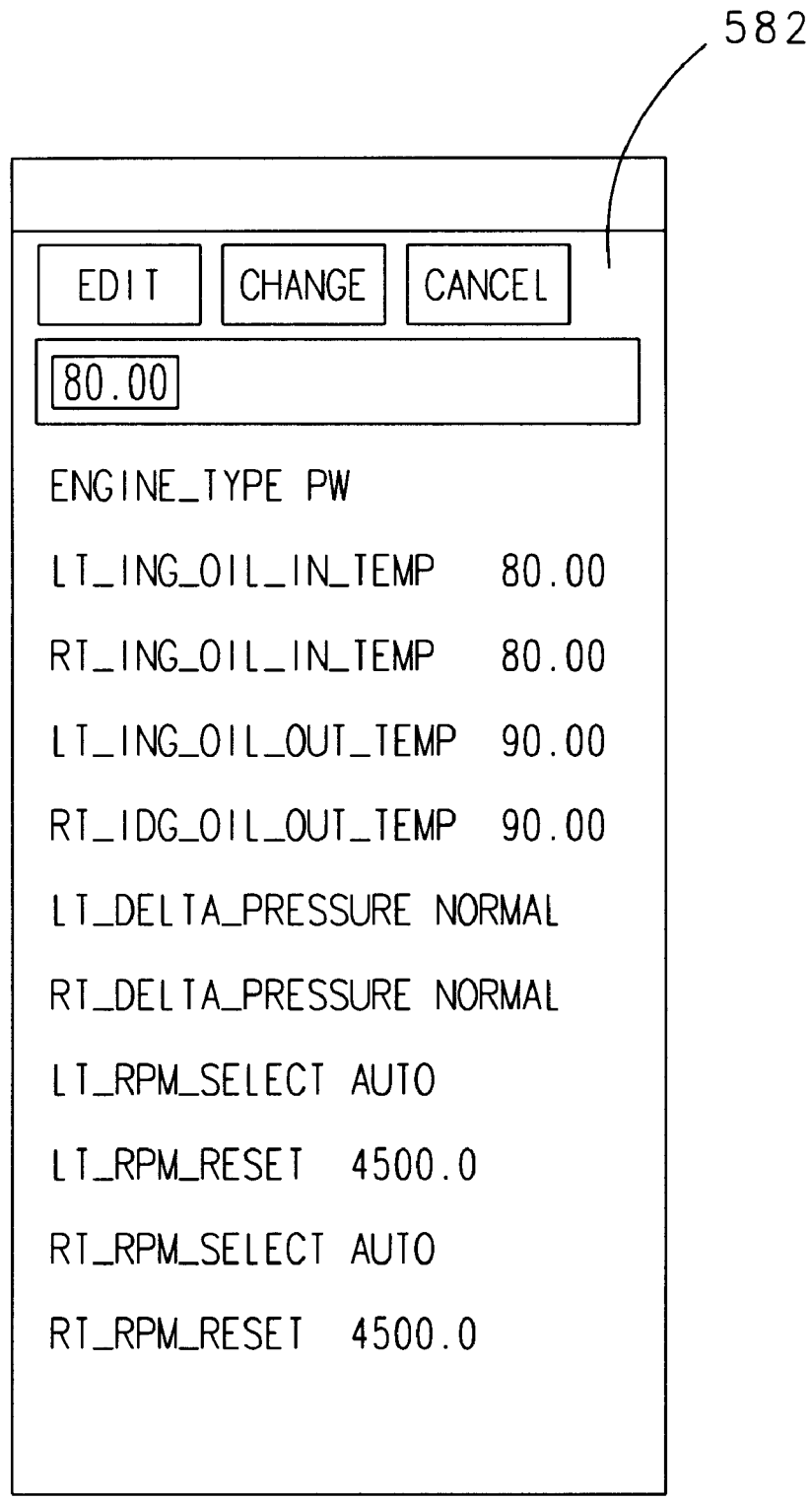
FIG. 31 illustrates a graphical and textural display in accordance with the instant invention.

The named parameter process allows the user to change ARINC 629 transmit data using on-screen menu selections via the display changes menu 580, FIG. 30, and engineering unit value entries for named variables, for example via menu 582, FIG. 21. The user may select the named parameter groups to display via menu 584, FIG. 6, select a parameter to edit, and enter a value, select an option from a menu, or toggle the parameter between two values. The user entry changes a variable which is then used by equations to update the data in one or more transmit wordstrings. The named parameter process is configured through definitions in the configuration file allowing complete flexibility including group names, parameter names, state names, and numeric limits.

Digital I/O Device Driver

The digital I/O device driver provides a means to access the digital input, digital output, and analog input ports used by the equation process. This permits real-time update of ARINC 629 data based on digital and analog inputs and provides digital outputs based on ARINC 629 data received.

Equation Process

The equation process provides the ability to automatically update ARINC 629 transmit data or digital outputs based on digital inputs, analog inputs, named parameters controlled by the user or ATE stand, and ARINC 629 receive data in any combination. This is accomplished by defining variables in the configuration files for individual bits of digital input and output ports, analog input ports, named parameters, and user variables in the configuration file as described above. Additional variables that reference ARINC 629 receive or transmit data in the equations must be in the following form:

ARINC[mode, bus, CID, label, word, type]

Where:

| | |
|---|---|
| mode | Either TX for transmit or RX for receive data |
| bus | defines which bus (1, 2, etc.) |
| CID | The channel id of the ARINC label in hexadecimal |

-continued

| | |
|---|---|
| label | The ARINC label in hexadecimal |
| word | The data word number (1 . . . 256) |
| type | Either U for Unsigned short, or S for signed short depending on how the data should be interpreted. |

The user may define equations in the configuration file using any of the following operators (listed from highest precedence to lowest):

| | |
|---|---|
| INT( ) | integer conversion from float |
| ( ) | parenthesis |
| − + ~ ! | unary minus, plus, bitwise not, logical not |
| * / % | multiply, divide, modulo |
| + − | add, subtract |
| < < > > | shift left, shift right |
| < > <= => | relational |
| == != | equality, inequality |
| & | bitwise and |
| ^ | bitwise exclusive or |
| \| | bitwise or |
| && | logical and |
| \|\| | logical or |
| = | assignment. |

Figure 32:
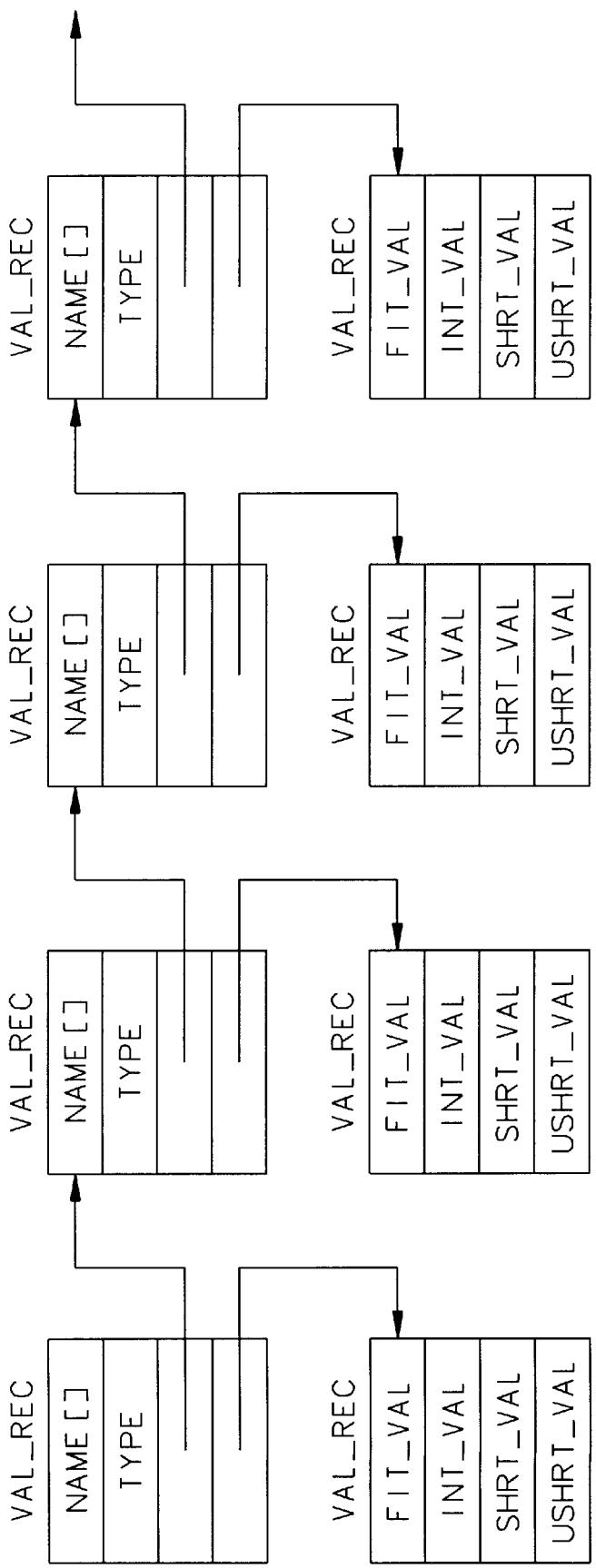
FIG. 32 illustrates a linked list containing defined variables generated in accordance with the instant invention.
Figure 33:
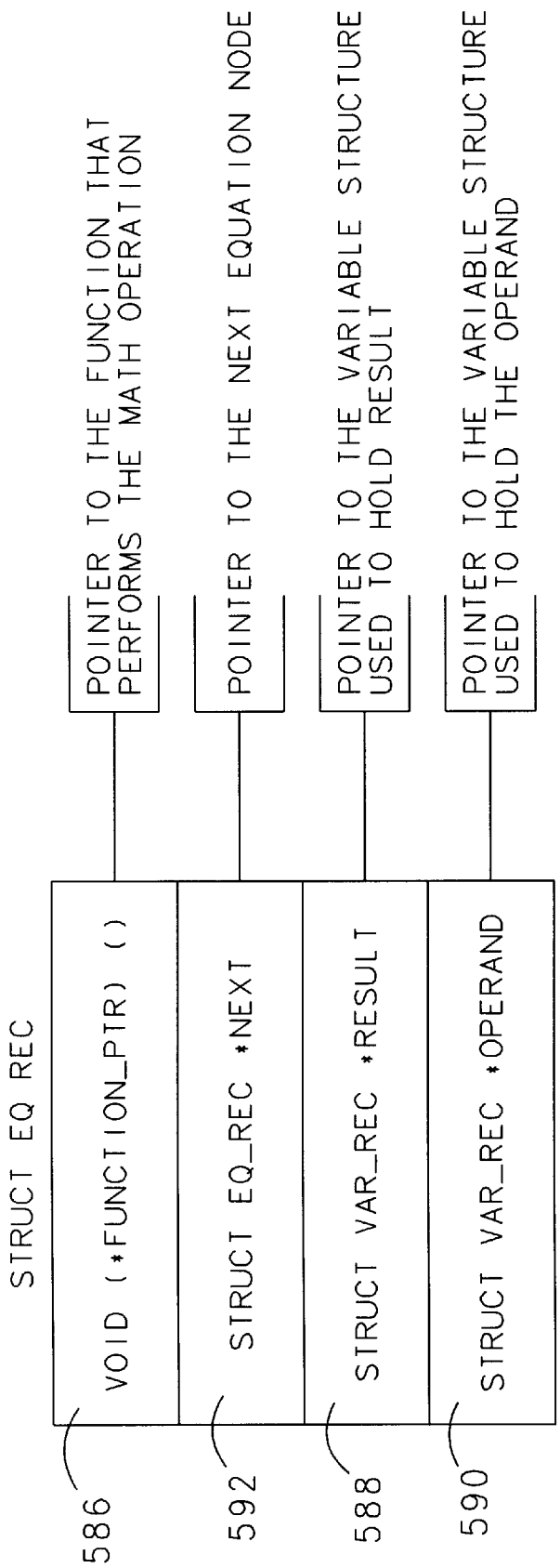
FIG. 33 illustrates an equation node structure in accordance with the instant invention.
Figure 34:
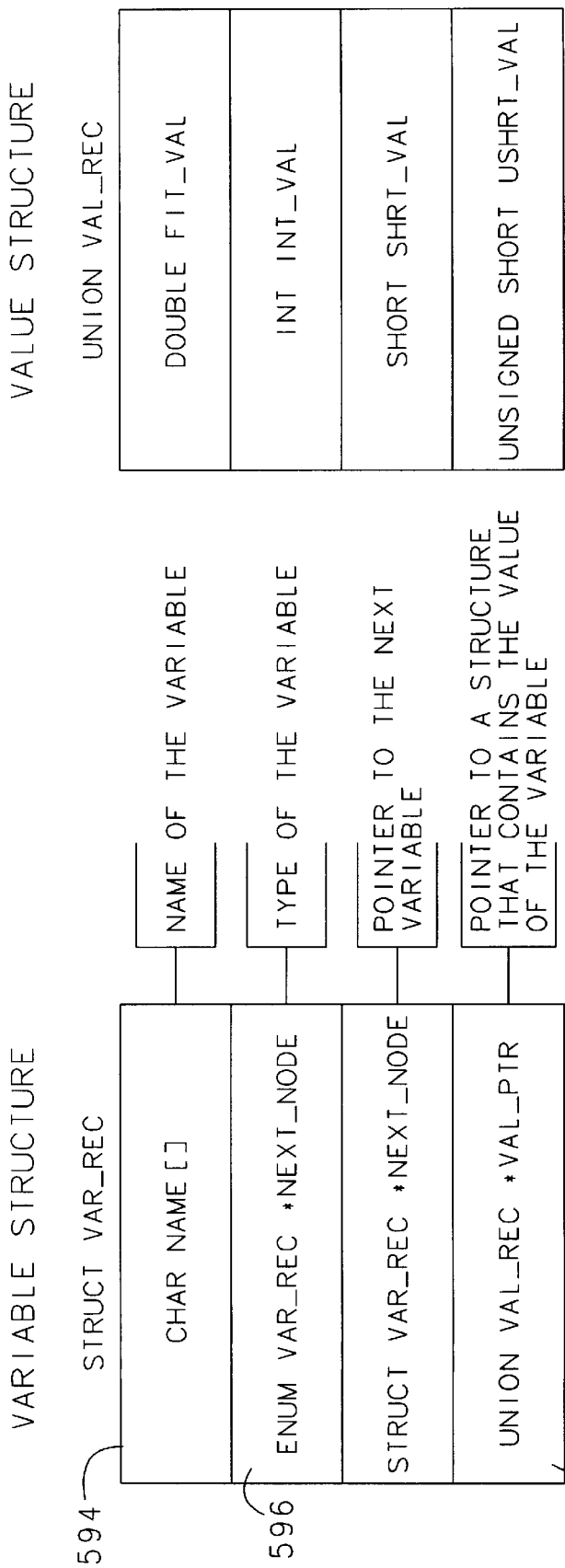
FIG. 34 illustrates a variable and a value structure in accordance with the instant invention.
Figure 35:
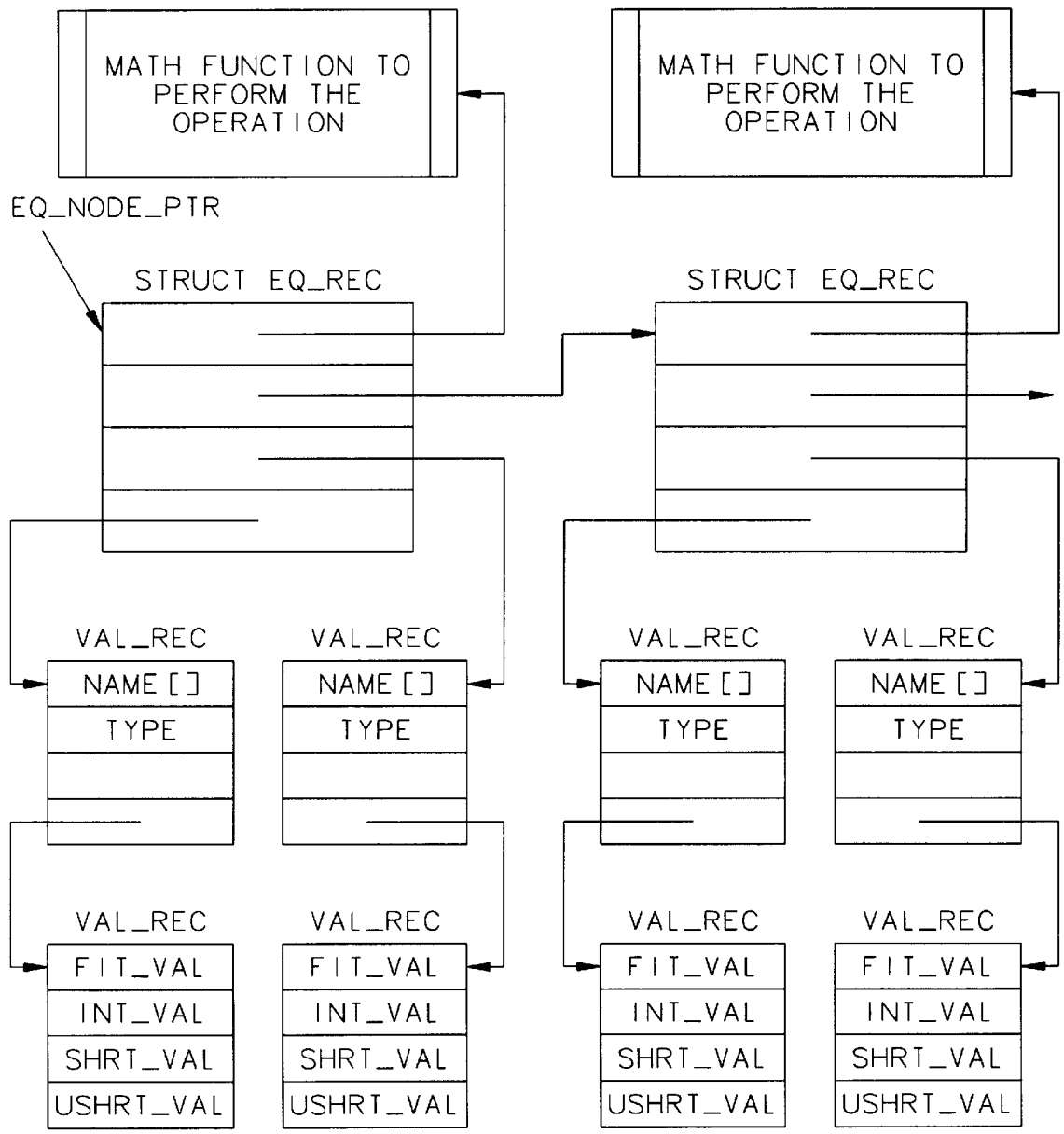
FIG. 35 illustrates a equation nodes linked with variable nodes and math functions in accordance with the instant invention.

The equations are parsed when a new configuration file is loaded into the database. The parsing is performed recursively, and correctly handles operator precedence. Temporary variables which hold intermediate results are created automatically. As the equation is parsed, a linked list is created as illustrated in FIG. 35. Each node of the linked list, as illustrated in FIG. 33, contains the four items. The first item 586 is a pointer to a function written in C that performs the arithmetic or logical operation. The second item 588 is a pointer to the result variable structure. The third item 590 is a pointer to the operand variable structure. Finally, the fourth item 592 is a pointer to the next node of the linked list. The variable structures, illustrated in FIG. 34, contain the following three fields: 1) the name of the variable 594; 2) the type of the variable 596 (Integer, float, signed short, unsigned short); and 3) a pointer to a union of integer, float, unsigned short, and signed short which contains the value of the variable 598. FIG. 32 illustrates variable nodes linked with the value nodes.

After all equations are parsed, the equation process will periodically read the digital input ports, read the analog input ports, update freshness counters and the date/time in label 409, execute the equations, and drive the digital outputs based on the results at the rates specified in the configuration file.

The digital inputs are read and the corresponding variables are set to the values defined in the configuration file allowing easy logic inversion or bit pattern creation. The analog inputs are read next and are converted to engineering unit values by the following equation based on the values of the engineering unit parameter at 0 volts and 10 volts defined in the configuration file.

$$\text{value} = \frac{\text{ad count}}{\text{max count}}(eu \text{ at } 10V - eu \text{ at } 0V) + eu \text{ at } 0V$$

The analog inputs may be filtered to reduce the effects of noise. The equation for filtering the analog inputs is shown below:

$$\text{Average} = \frac{\text{old average} \times \text{filter} + \text{new value}}{\text{filter} + 1}$$

Next, the transmit wordstring freshness counters that are scheduled to be updated are incremented. In addition the time/date contained in label 409 is updated periodically. The appropriate equations are then performed by executing the function pointer in the first node of the linked list. Each of these functions contain C code that performs the desired arithmetic, bitwise, logical, or relational operation and then chains execution to the next node. The last node of the linked list will execute a return statement that will force all the functions that have been executed to terminate. After the equations are executed, the digital outputs are driven to the proper states by examining the variables that correspond to the digital output bits and the logic conversion fields of the digital output definitions in the configuration file. This method of parsing an equation, building a linked list, and executing functions pointed to by elements of the linked list provides the user with a great amount of flexibility in meeting the requirements of the test. This method is more flexible than straight line code and is nearly as fast.

Figure 36:
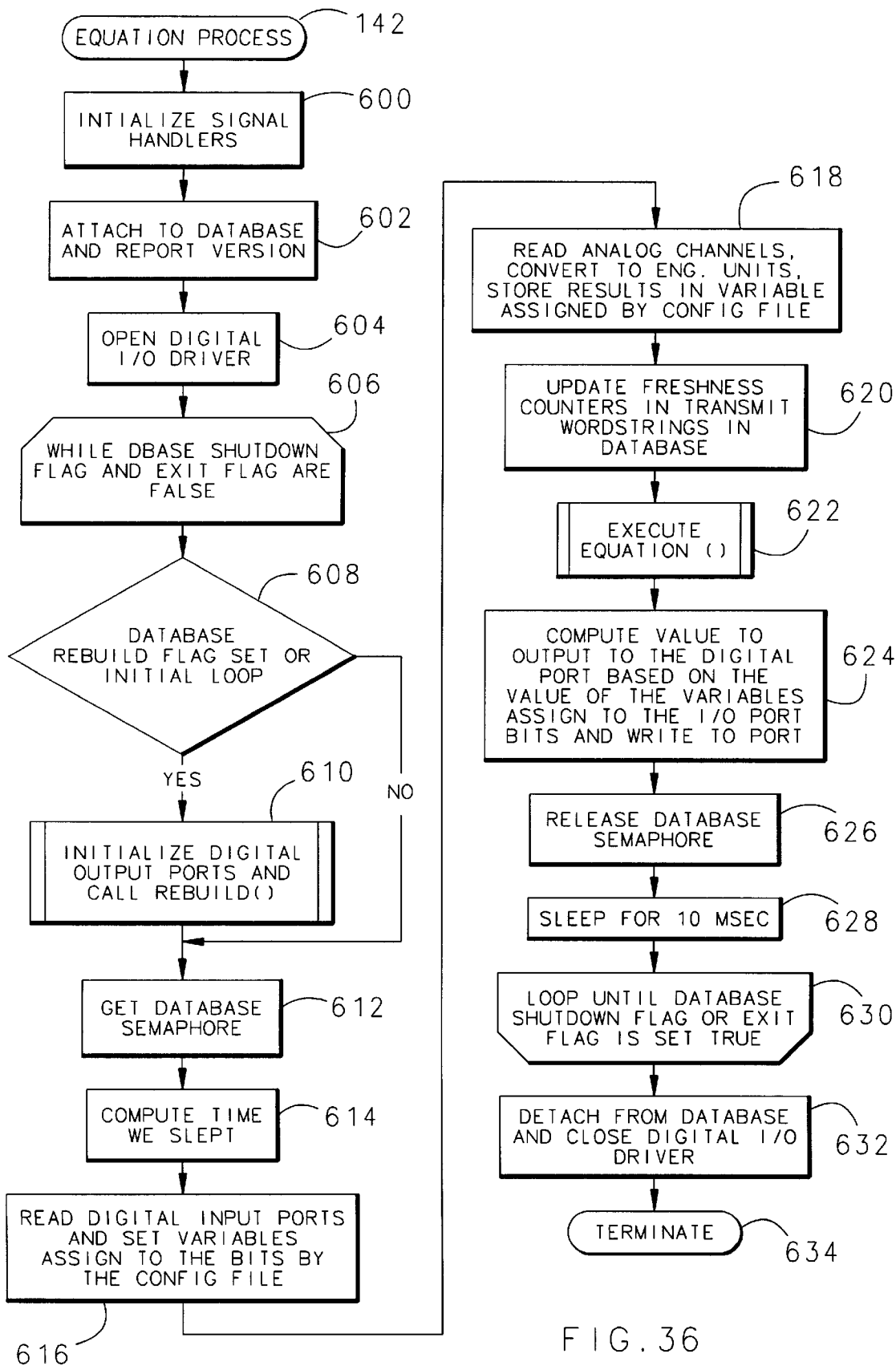
FIG. 36 is a process flow diagram illustrating the equation process of the instant invention.

Specifically with reference to FIG. 36, when the equation process is started, it initializes the signal handlers 600, attaches to the database, and reports the version to the version log 602. This process then opens the digital input output driver 604. While the database shutdown flag and exit flag are false 606, the equation process checks the database rebuild flag to see whether it is set 608. If the database rebuild flag is set or if this is the initial loop, the equation process then initializes the digital output ports and calls the rebuild function 610. Once the rebuild function has returned, or if the database rebuild flag was not set or this was not the initial loop, the equation process obtains the database semaphore 612, computes the time the process was asleep 614, reads the digital input ports, and sets variables assigned to the bits by the configuration file 616. The equation process then reads the analog channels, converts the data to engineering units, and stores the result in variables assigned by the configuration file 618. This process then updates the freshness counters for the transmit wordstrings in the database 620. Once this is complete a call is made to the execute equation process 622. Once this process is completed the equation process then computes the value to output to the digital port based on the value of the variables assigned to the input-output port bits and the write port 624. The equation process then releases the database semaphore 626 and goes to sleep for 10 mSec 628. This will loop until the database shutdown flag or exit flag is set true 630. Once this occurs, the equation process will detach from the database and close the digital input output driver 632. Once this is complete, the function terminates 634.

Figure 37:
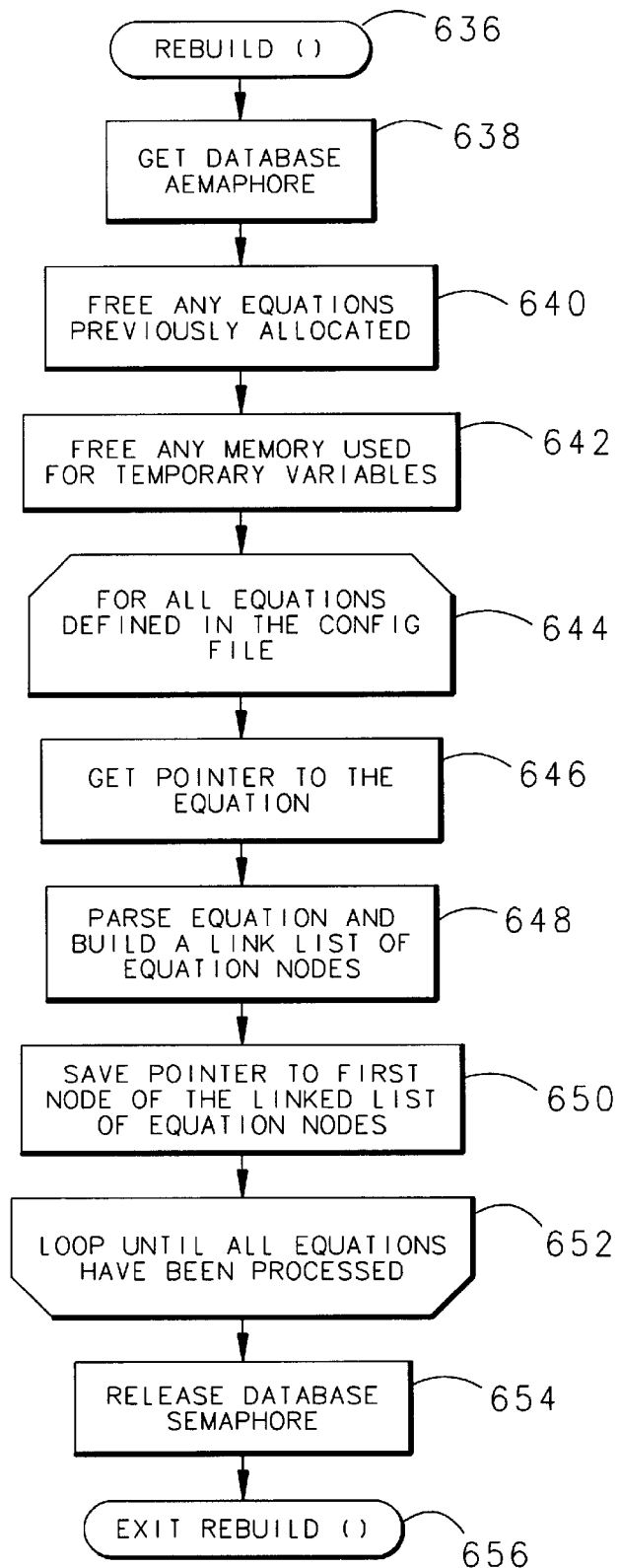
FIG. 37 is a process flow diagram illustrating the rebuild sub-process called by the equation process of the instant invention.

The rebuild function 636 as illustrated in FIG. 37, which is called as described above, first obtains the database semaphore 638, and frees any memory previously allocated for equation nodes 640 as well as any memory used for temporary variables 642. The rebuild function then loops for all equations defined in the configuration file 644. It does this by first obtaining a pointer to the equation 646, parsing the equation, and building a linked list of equation nodes 648. The rebuild function then saves the pointer to the first node of the linked list of equation nodes 650. This process continues until all equations have been processed 650, at which time the database semaphore is released 654 and the function returns 656.

Figure 38:
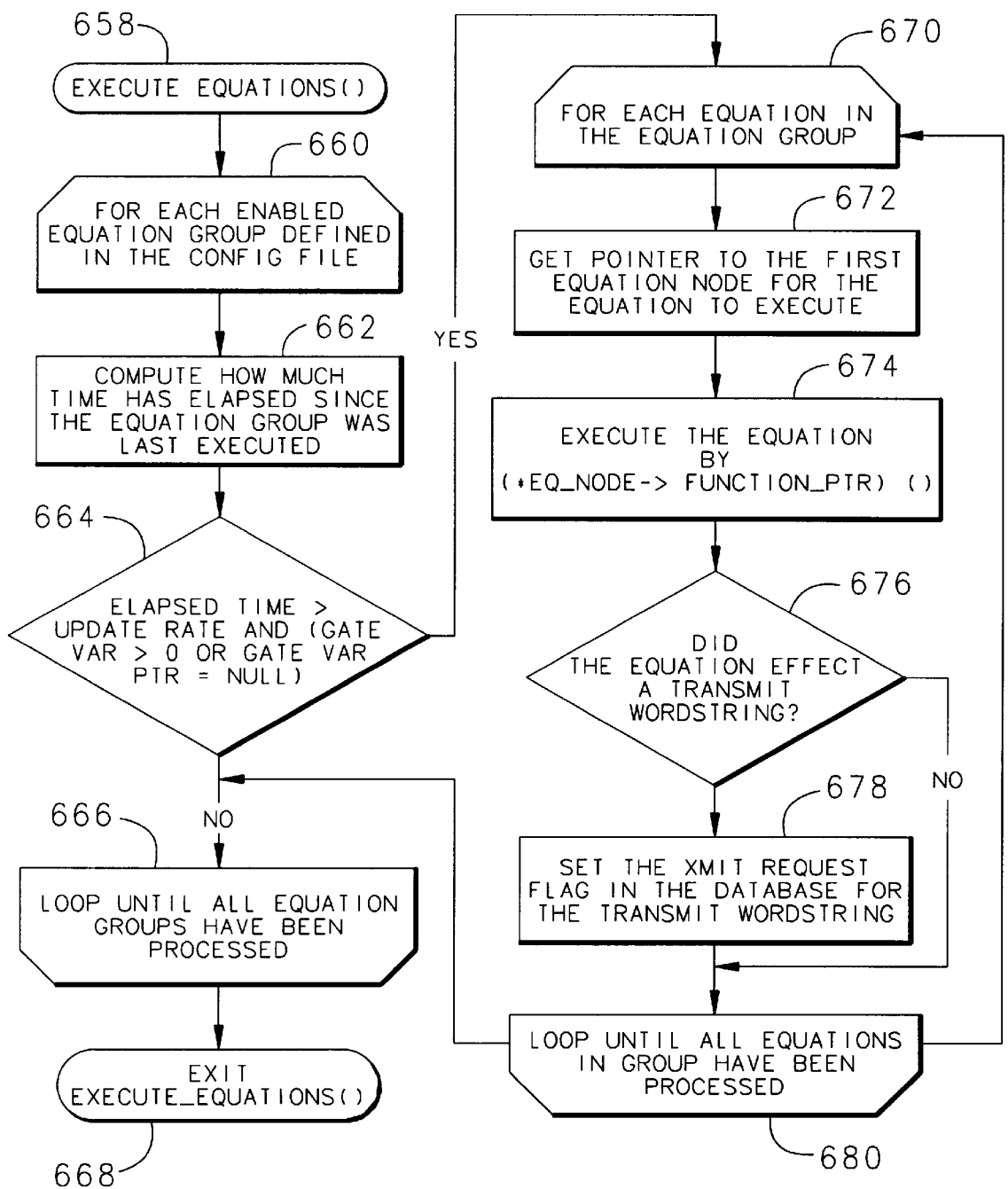
FIG. 38 is a process flow diagram illustrating the execute equations sub-process of the instant invention.

The execute equations function 658 as illustrated in FIG. 38, which is called as described above, loops for each enabled equation group defined in the configuration file 660. This function computes how much time has elapsed since the equation group was last executed 662, and checks to see whether the elapsed time is greater than the update rate and the gate variable is greater than 0 or the elapsed time is greater than the update rate and the pointer to the gate var is null 664. If either of these conditions are true, the execute equation process enters a second loop for each equation in the equation group 670. This second loop obtains the pointer to the first equation node for the equation to execute 672, and executes the equation 674. If the equation effected a transmit wordstring 676, then the transmit request flag in the data base for the transmit wordstring is set 678. Once this is done, or if the equation did not effect a transmit wordstring, the loop returns until all equations in the group have been processed 680. If the elapsed time was not greater than the update rate or the gate variable was not greater than 0 664, the loop simply continues until all equation groups have been processed 666, at which point the function returns 668.

Figure 39:
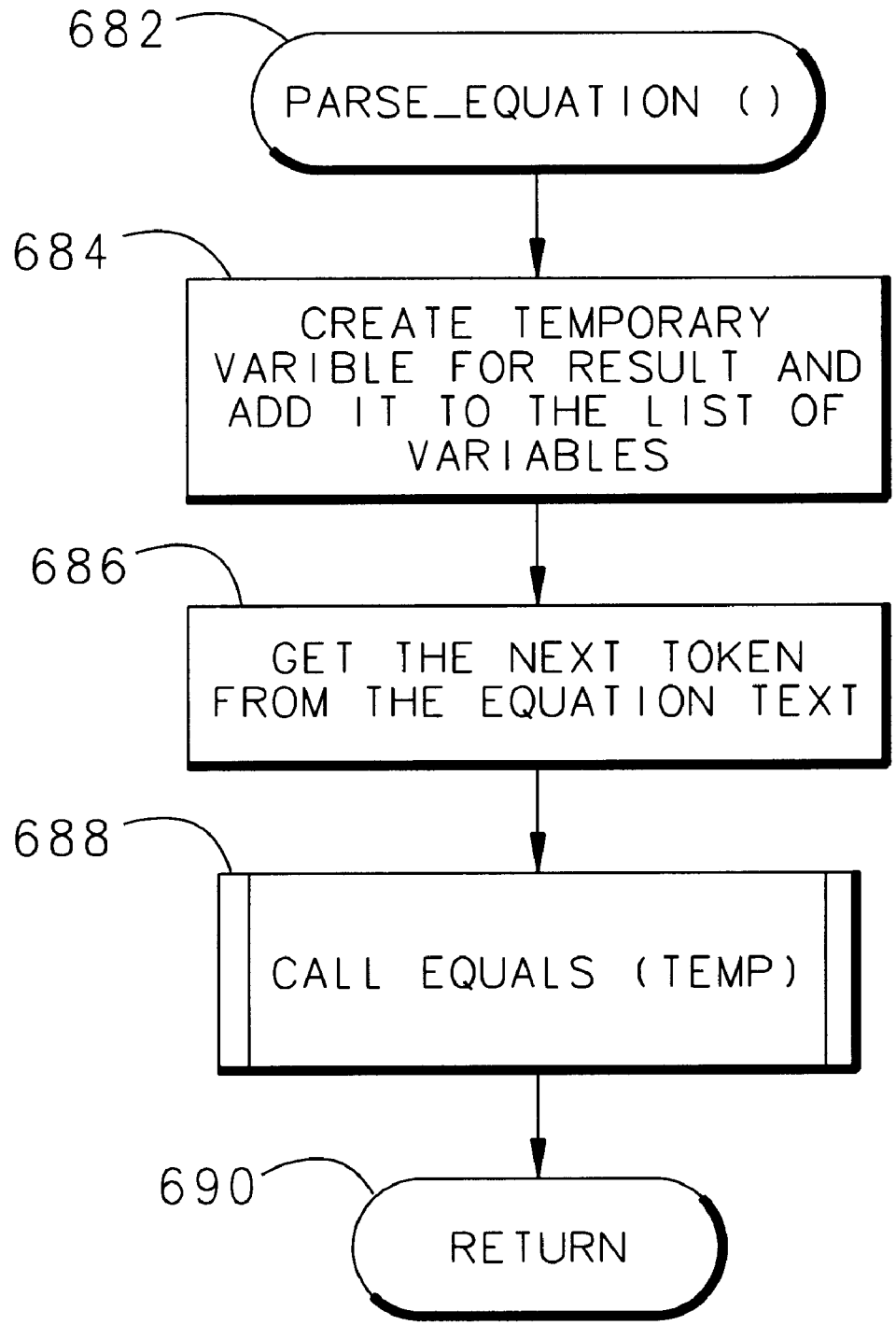
FIG. 39 is a process flow diagram illustrating the parse equation sub-process of the instant invention.

The parse equation function 682 as illustrated in FIG. 39, which is called as described above, first creates a temporary variable for the result and adds it to the list of variables 684. It then obtains the next token from the equation text 686 and calls the equals function 688, passing the temporary variable. Once this function returns, the parse equation function returns 690.

Figure 40:
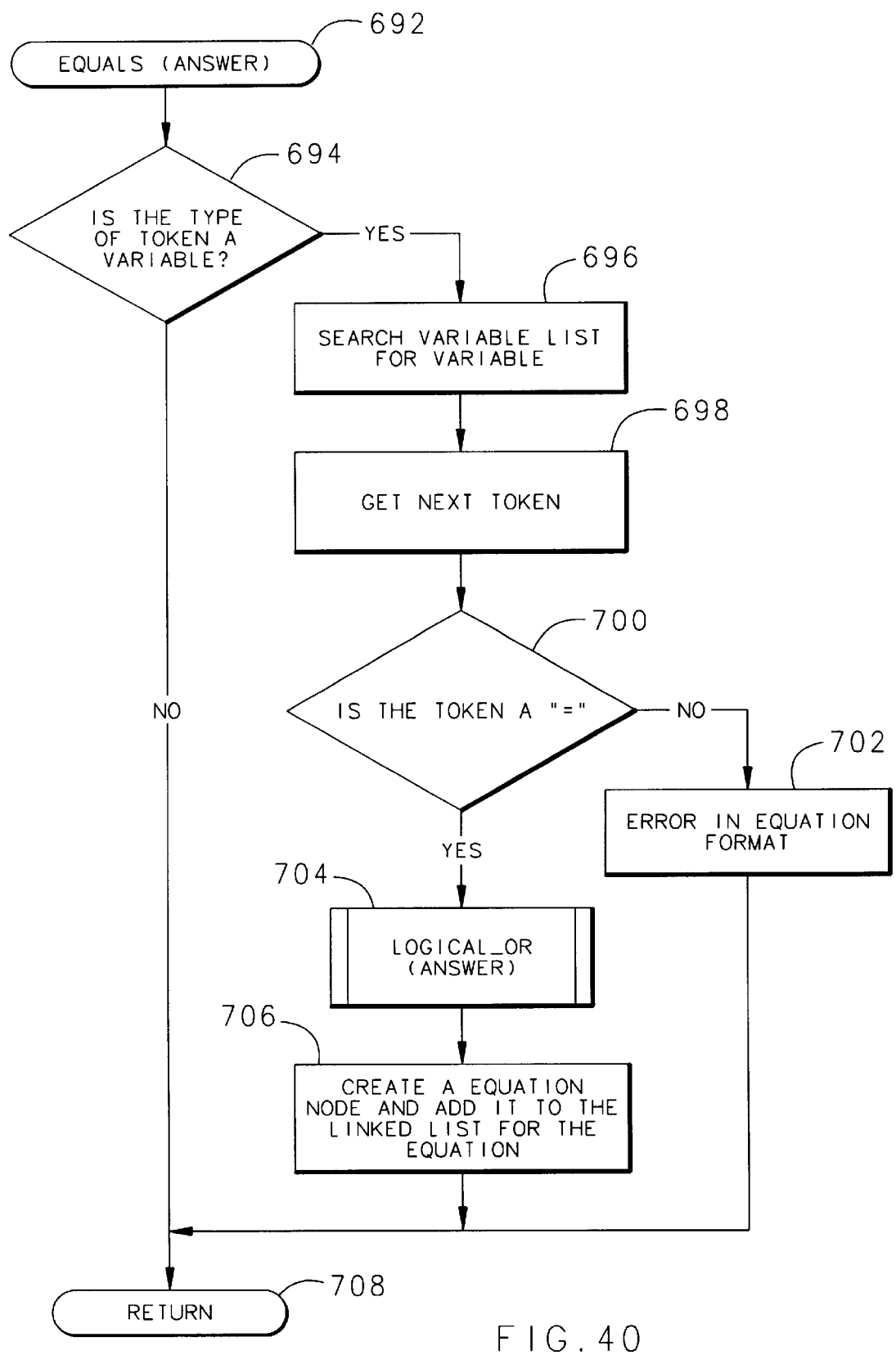
FIG. 40 is a process flow diagram illustrating the equals sub-process of the instant invention.

The equals function 692 as illustrated in FIG. 40, which is called as described above, first checks to determine whether the type of token is a variable 694. If it is not, the function returns 708. However, if the token is a variable, the equals function searches the variable list for the variable 696, obtains the next token 698, and checks to determine whether that token is an "=" 700. If not, the equals function determines that there was an error in the equation format 702 and returns 708. If the token is an equals, the equals function calls the logical_or function 704. Once an answer is returned, the equals function creates an equation node, adds it to the linked list for the equation 706, creates another equation node that will execute a return statement 707. The purpose of this node is to restore the stack pointer to the condition prior to executing an equation. This function then returns 708.

Figure 41:
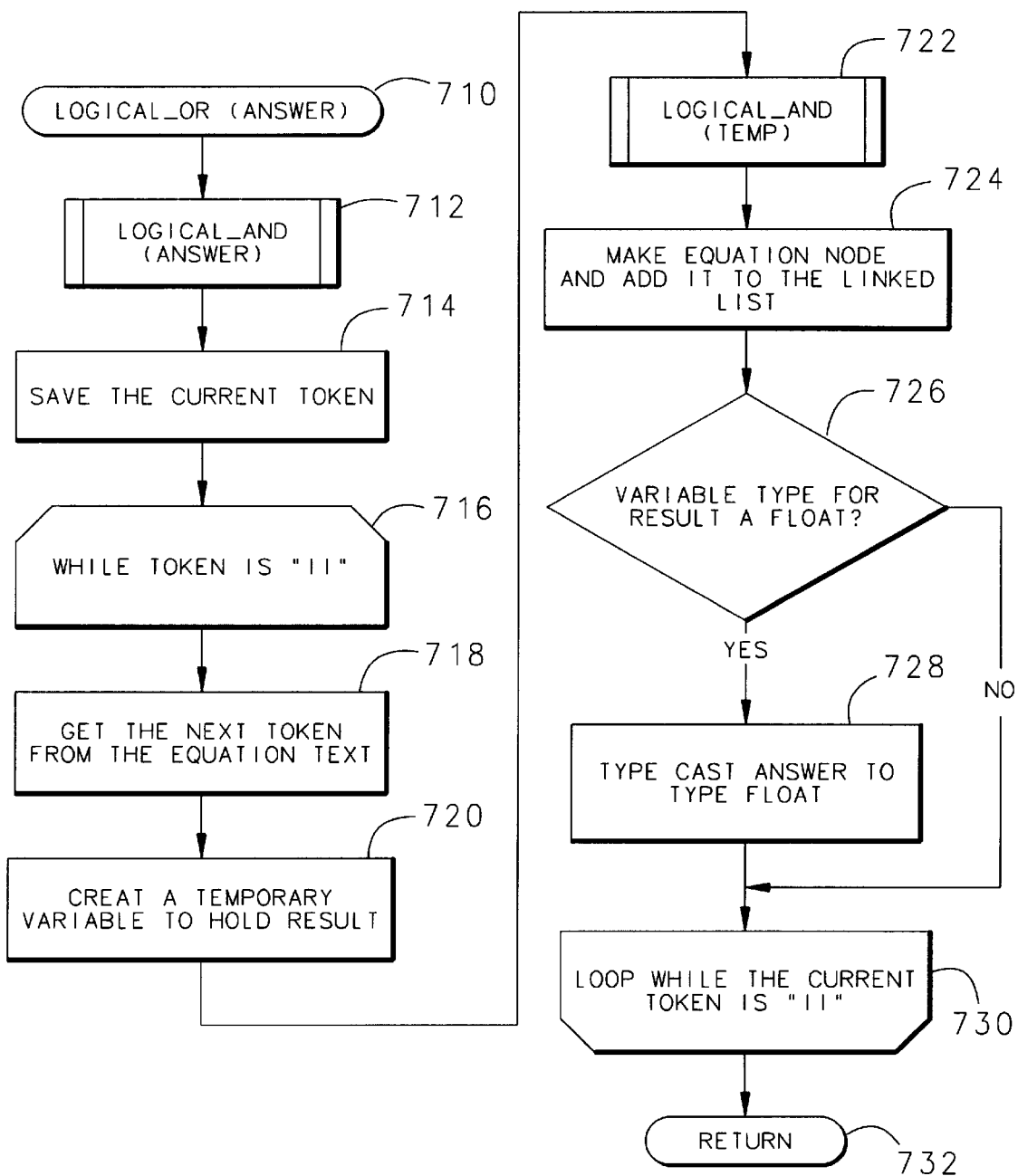
FIG. 41 is a process flow diagram illustrating the logical__or sub-process of the instant invention.

The logical_or function 710 as illustrated in FIG. 41, which is called as described above, first calls the logical_and function 712. Once the logical_and function returns, the logical_or function saves the current token 714 and loops while the token is a "||" 716. First, the logical_or loop obtains the next token from the equation text 718 and creates a temporary variable to hold the result 720, at which point the logical_and function is again called 722. Upon return, the logical_or function makes an equation node and adds it to the linked list 724. If the variable type for the result is a float variable 726, the answer is type cast to type float 728. Once this has been done, or if the variable type for the result was not a float, the function will loop while the current token is still the "||" 730. Once this is complete, the function returns 732.

Figure 42:
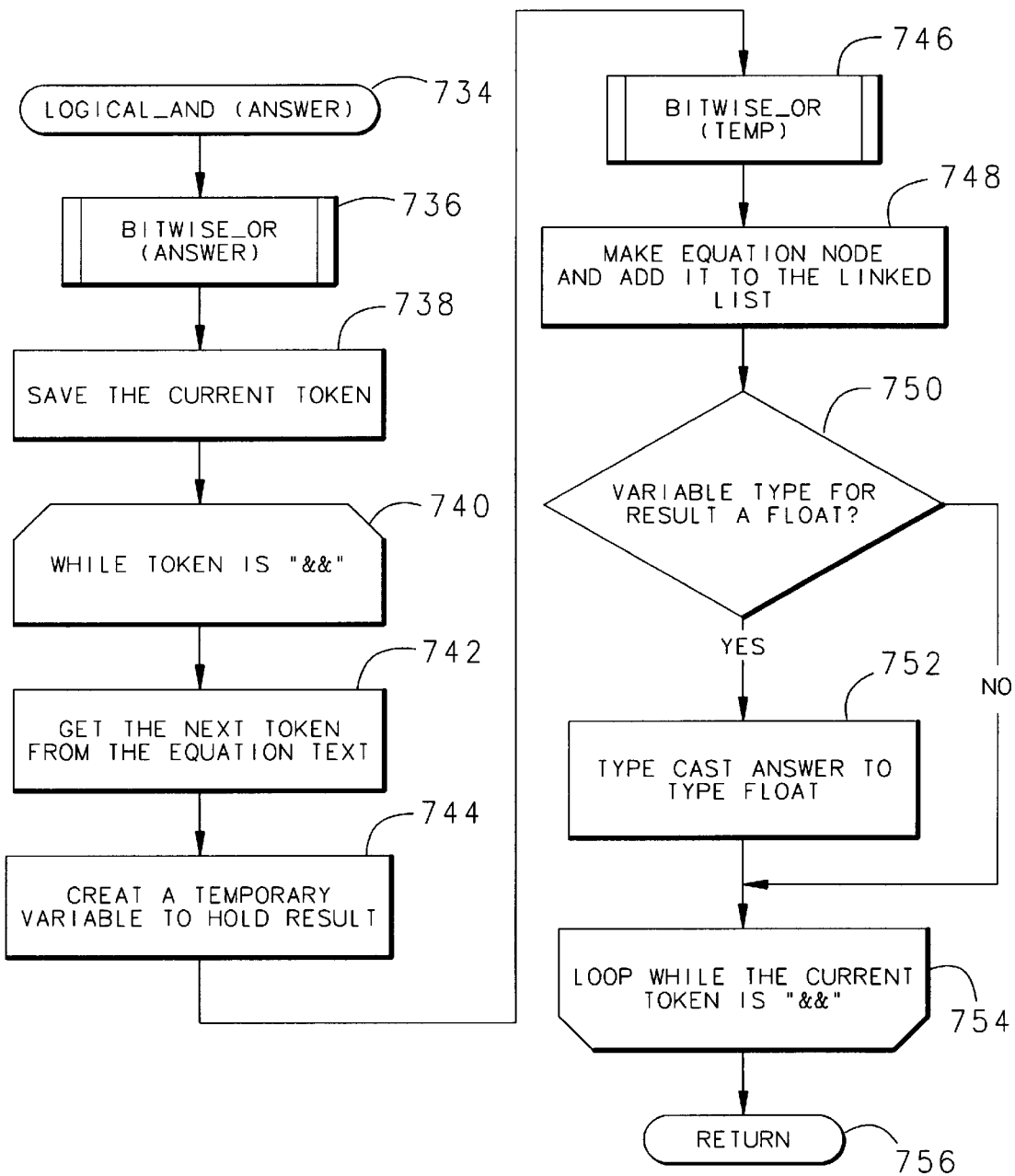
FIG. 42 is a process flow diagram illustrating the logical__and sub-process of the instant invention.

The logical_and function 734 as illustrated in FIG. 42, which is called as described above, first calls the bitwise_or function 736. Upon return the logical_and function saves the current token 738, and while the token is a "&&" 740, it will obtain the next token from the equation from the equation text 742 and create a temporary variable to hold the result 744. At this point the logical_and function calls the bitwise_or function 746. Upon return, the logical_and function makes an equation node and adds it to the linked list 748. If the variable type for the result is a float 750, the answer is type cast to type float 752. Once this is complete, or if the variable type for the result was not a float, the logical_and function loops while the current token is still is a "&&" 754. Once this loop is complete the function returns 756.

Figure 43:
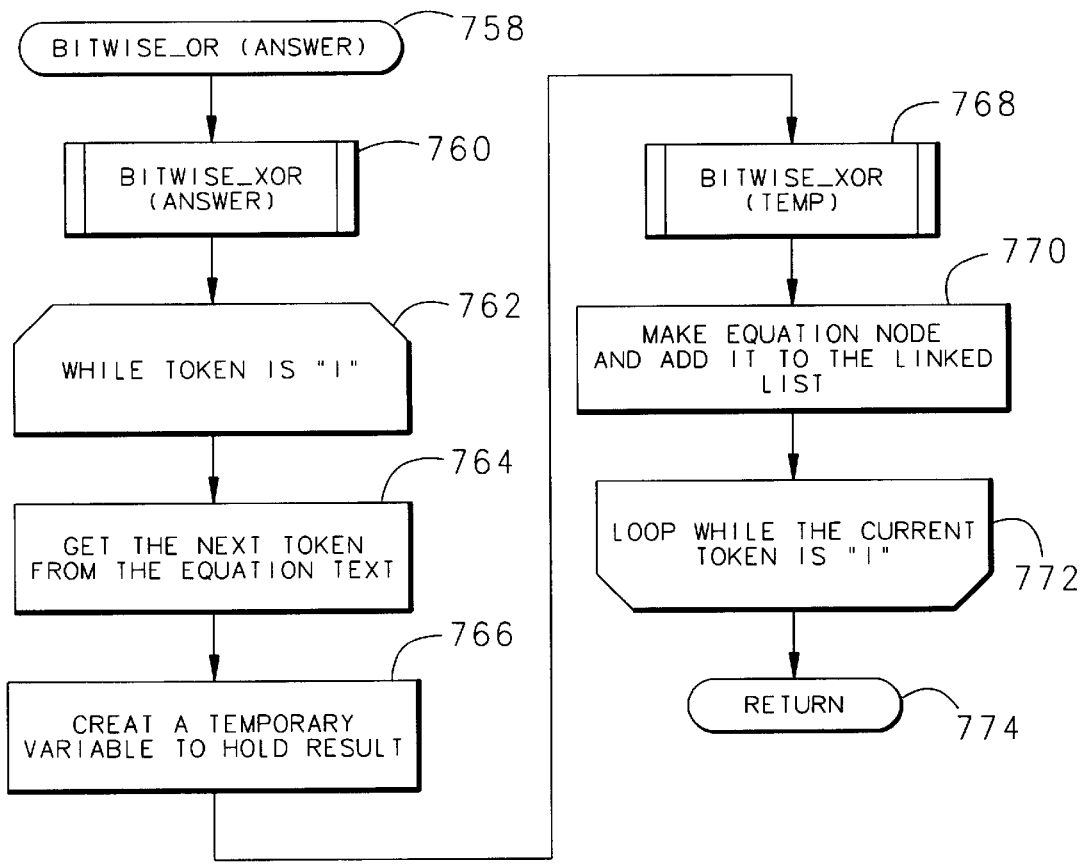
FIG. 43 is a process flow diagram illustrating the bitwise__or sub-process of the instant invention.

The bitwise_or function 758 as illustrated in FIG. 43, which is called as described above, first calls the bitwise_xor function 760. Upon return, the bitwise_or function will loop while the token is a "|" 762. It first obtains the next token from the equation text 764 and creates a temporary variable to hold the result 766. At this point the bitwise_or function calls the bitwise_xor function 768. Upon return the bitwise_or function makes an equation node and adds it to the linked list 770. This loop continues while the current token is a "|" 772. When the function is complete, it returns 774.

Figure 44:
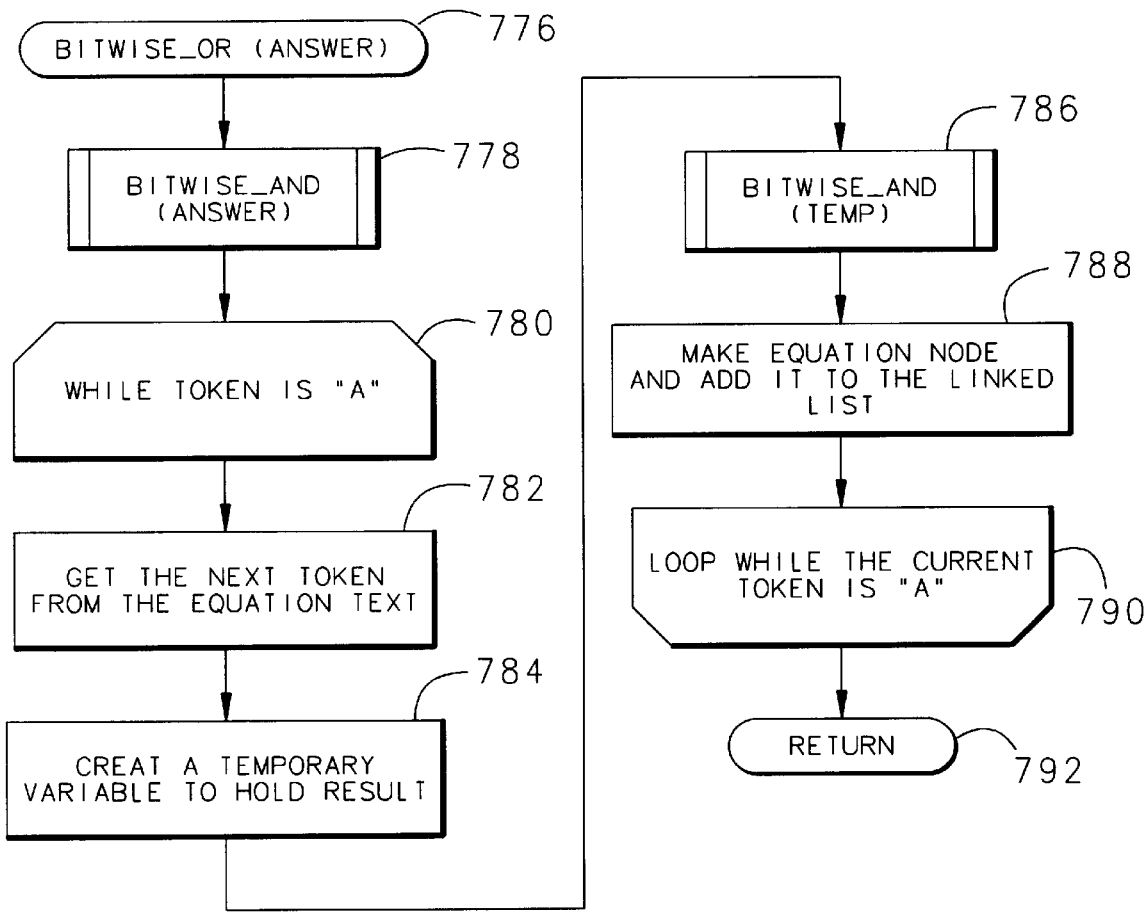
FIG. 44 is a process flow diagram illustrating the bitwise__xor sub-process of the instant invention.

The bitwise_xor function 776 as illustrated in FIG. 44, which is called as described above, first calls the bitwise_and function 778. Upon return and while the token is a "^" 780, this function will obtain the next token from the equation text 782 and create a temporary variable to hold the result 784. At this point the bitwise_xor function calls the bitwise_and function 786. Upon return, this function makes an equation node, adds it to the linked list 788, and continues to loop while the current token is a "^" 790. Upon completion, the function returns 792.

Figure 45:
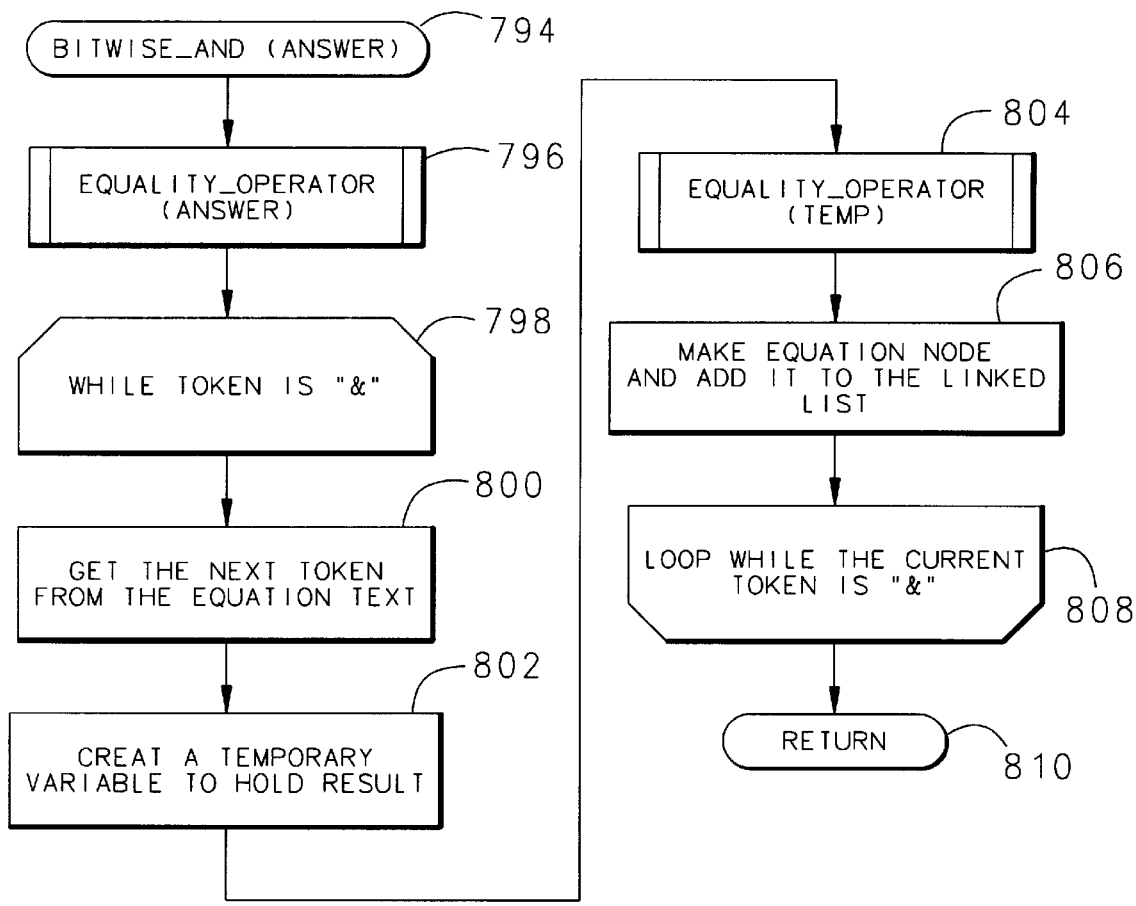
FIG. 45 is a process flow diagram illustrating the bitwise__and sub-process of the instant invention.

The bitwise_and function 794 as illustrated in FIG. 45, which is called as described above, first calls the equality_operator function 796. Upon return, the bitwise_and function loops while the token is a "&" 798. It first obtains the next token from the equation text 800 and creates a temporary variable to hold the result 802. It then calls the equality_operator function 804, and upon return makes an equation node and adds it to the linked list 806. This function continues to loop while the current token is a "&" 808. Upon completion the function returns 810.

Figure 46:
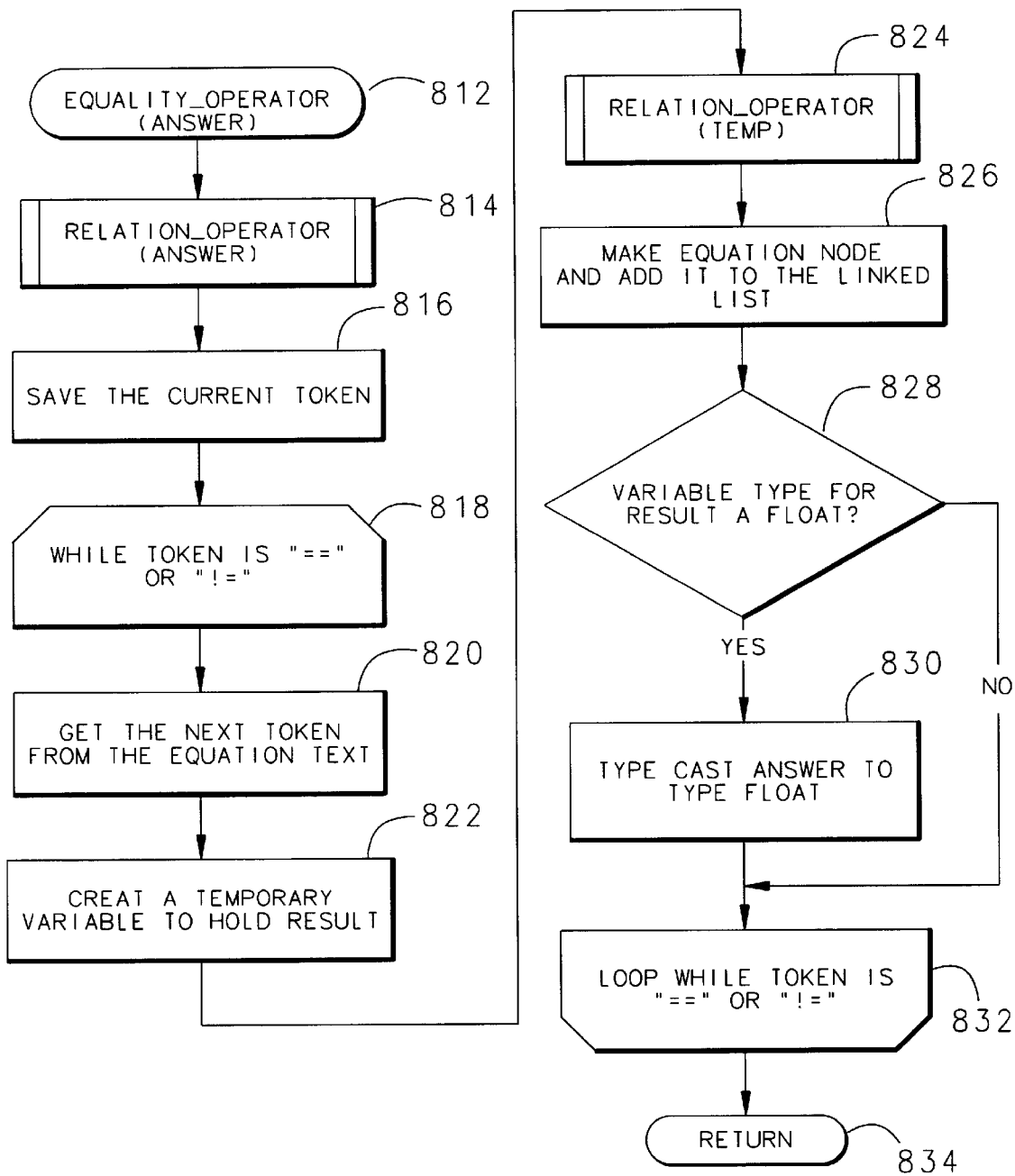
FIG. 46 is a process flow diagram illustrating the equality operator sub-process of the instant invention.

The equality_operator function 812 as illustrated in FIG. 46, which is called as described above, first calls the relation_operator function 814. Upon return, this function saves the current token 816 and loops while the token is an "==" or an "!=" 818. This function first obtains the next token from the equation text 820 and creates a temporary variable to hold the result 822. It then calls a relation_operator function 824, and upon return makes an equation node and adds it to the linked list 826. If the variable type for the result is a float 828, the answer is type cast to type float 830. Once this is complete, or if the variable type for the result was not a float, the function loops so long as the token is an "==" or an "!=" 832. Upon completion, this function returns 834.

Figure 47:
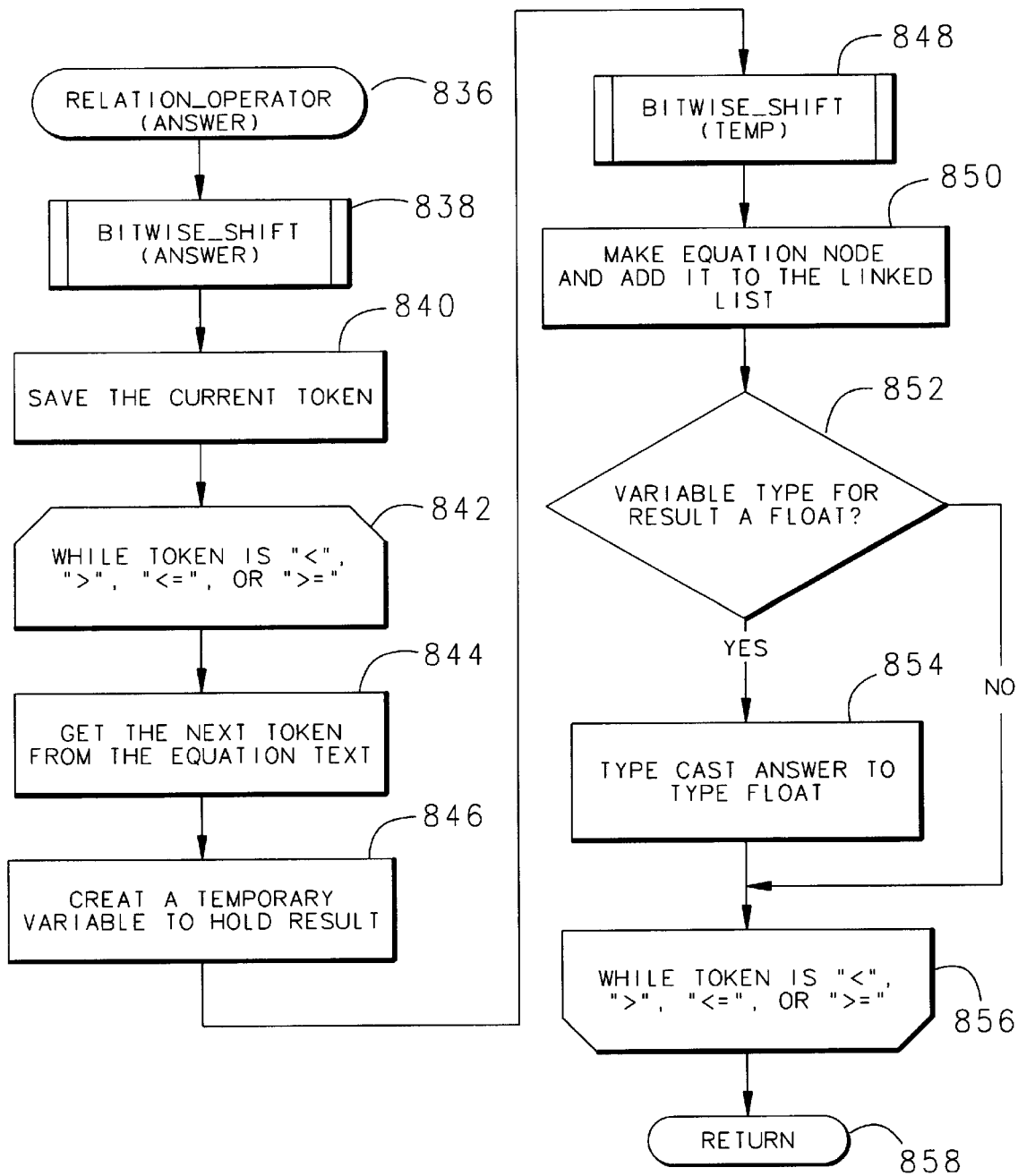
FIG. 47 is a process flow diagram illustrating the relation operator sub-process of the instant invention.

The relation_operator function 836 as illustrated in FIG. 47, which is called as described above, first calls the bitwise_shift function 838. Upon return, the current token is saved 840 and the function loops while the token is "<", ">", "<=", or ">=" 842. It first obtains the next token from the equation text 844 and creates a temporary variable to hold the result 846. The relation_operator function then calls the bitwise_shift function 848, and upon return makes an equation node and adds it to the linked list 850. If the variable type for the result is a float 852 the answer is type cast to type float 854. If the variable type for the result is not a float, or once the answer has been type cast as type float, the function will continue to loop so long as the token is "<", ">", "<=", or ">=" 856. Upon completion, this function returns 858.

Figure 48:
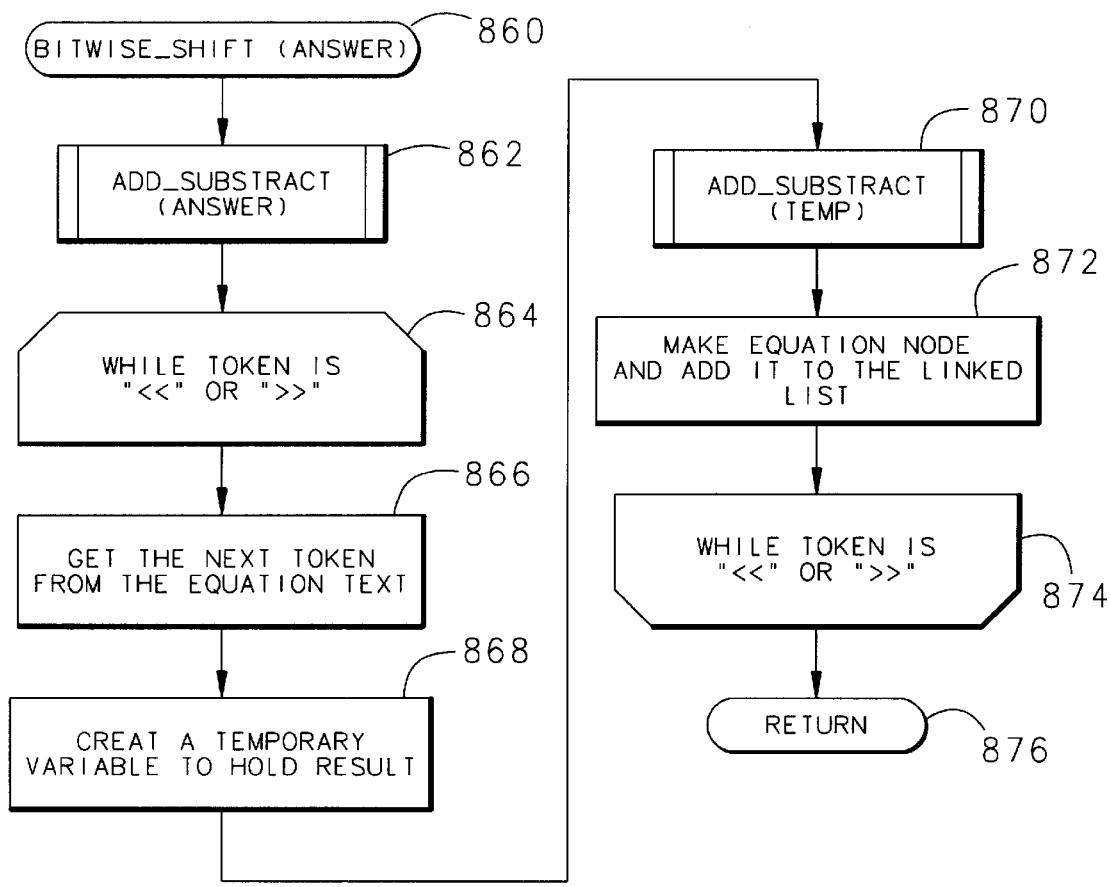
FIG. 48 is a process flow diagram illustrating the bitwise__shift sub-process of the instant invention.

The bitwise_shift function 860 as illustrated in FIG. 48, which is called as described above, first calls the add_ subtract function 862, and upon return loops while the token is "<<" or ">>" 864. This function first obtains the next token from the equation text 866, creates a temporary variable to hold the result 868, and calls the add_subtract function 870. Upon return, the bitwise shift function makes an equation node and adds it to the linked list 872. This function continues to loop while the token is a "<<" or ">>" 874. Upon completion, this function returns 876.

Figure 49:
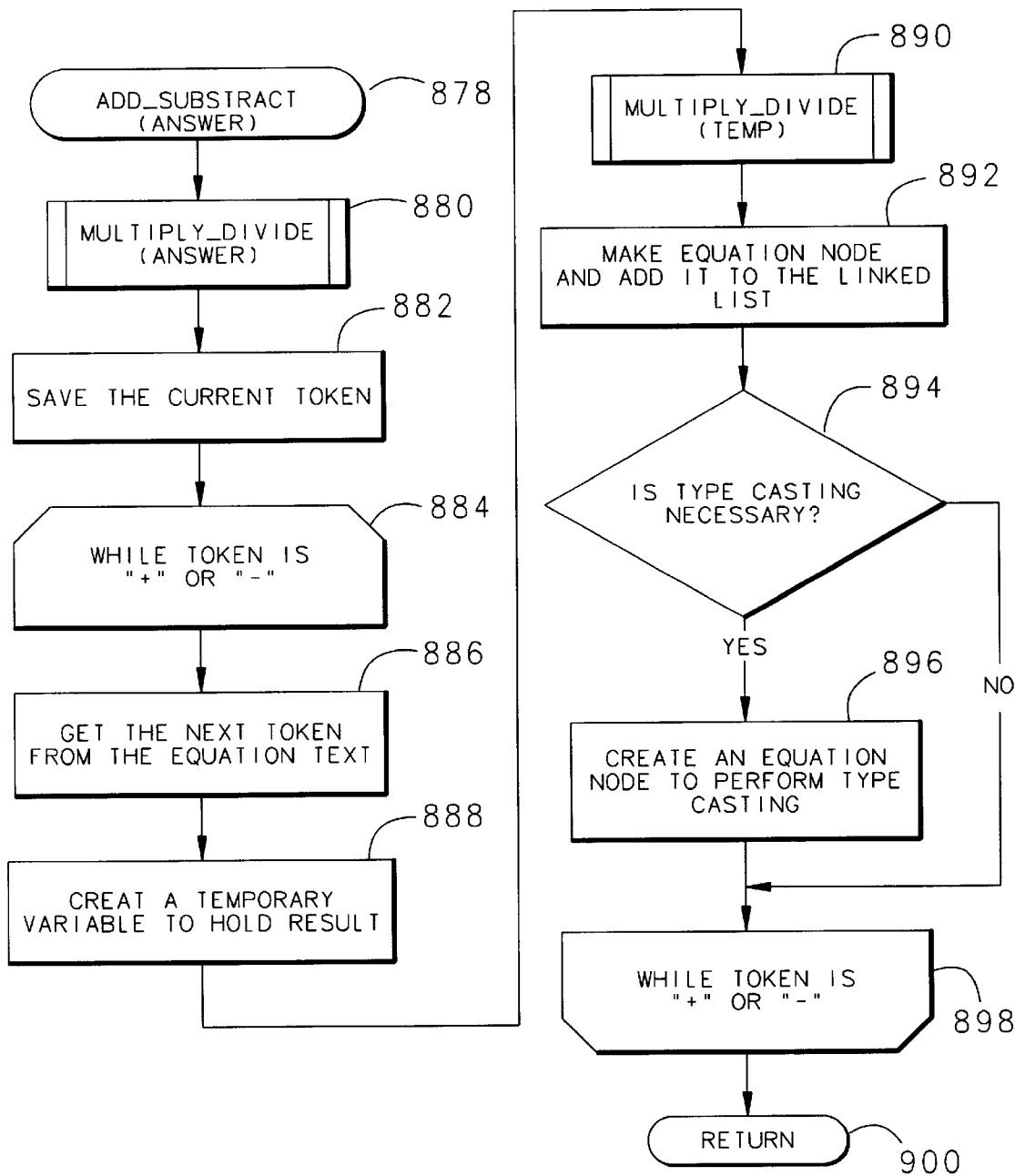
FIG. 49 is a process flow diagram illustrating the add__subtract sub-process of the instant invention.

The add_subtract function 878 as illustrated in FIG. 49, which is called as described above, first calls the multiply_divide function 880. Upon return, this function saves the current token 882 and loops while the token is "+" or "−" 884. It first obtains the next token from the equation text 886, creates a temporary variable to hold the result 888, and then calls the multiply_divide function 890. Upon return, the add_subtract function makes an equation node and adds it to the link list 892. If type casting is necessary 894, an equation node is created to perform the type casting 896. If type casting is not necessary, or once this is complete, the function will loop while the token is "+" or "−" 898. Upon completion, this function returns 900.

Figure 50:
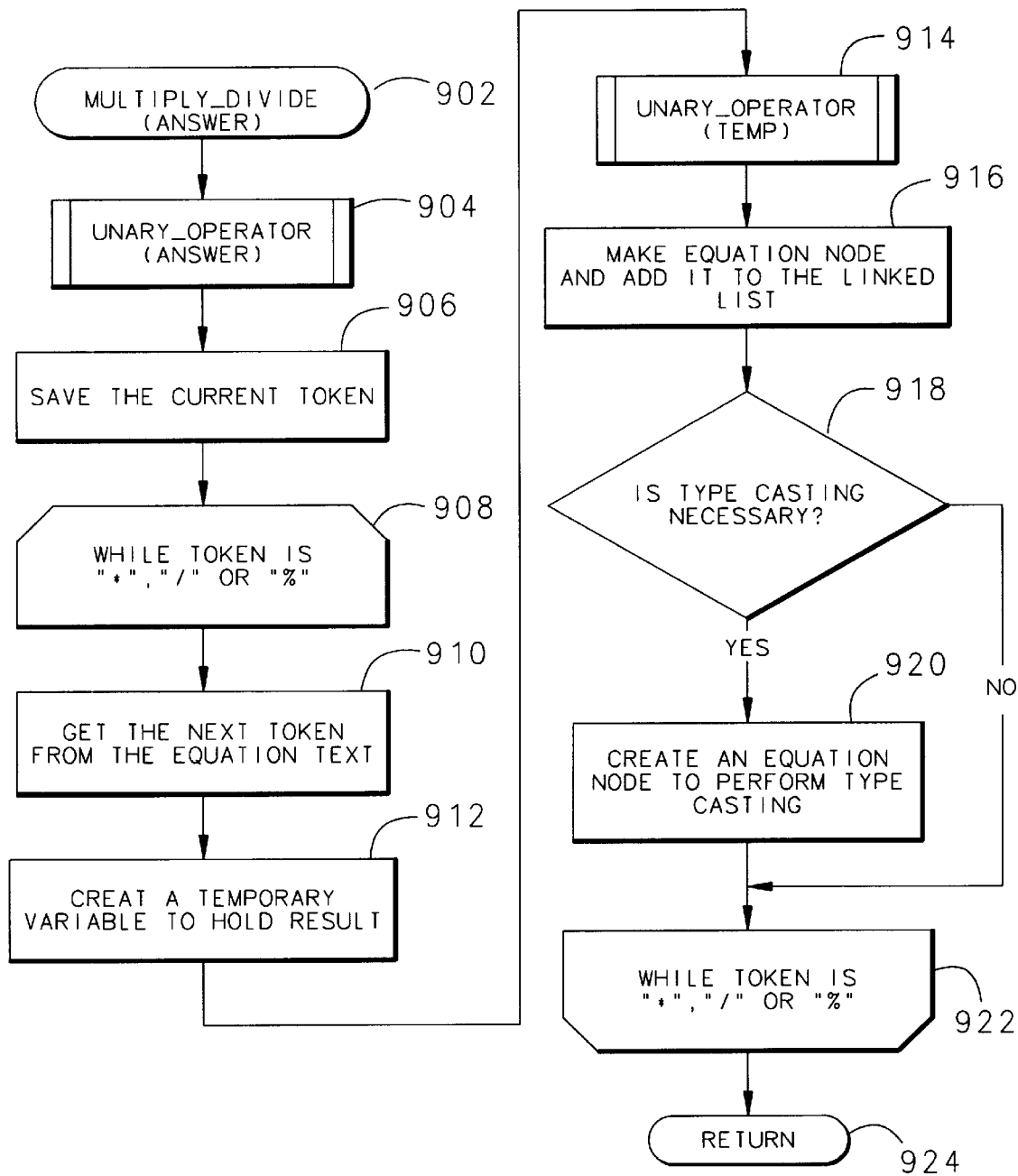
FIG. 50 is a process flow diagram illustrating the multiply__divide sub-process of the instant invention.

The multiply_divide function 902 as illustrated in FIG. 50, which is called as described above, first calls the unary_operator function 904. Upon return, the current token is saved 906 and the function loops while the token is "*", "/", or "%" 908. It first obtains the next token from the equation text 910, creates a temporary variable to hold the result 912, and then calls the unary_operator function 914. Upon return, the multiply_divide function makes an equation node and adds it to the linked list 916. If type casting is necessary 918 an equation node is created to perform the type casting 920. Once this is complete, or if type casting is not necessary, the function will loop while the token is "*", "/", or "%" 922. Upon completion, the function returns 924.

Figure 51:
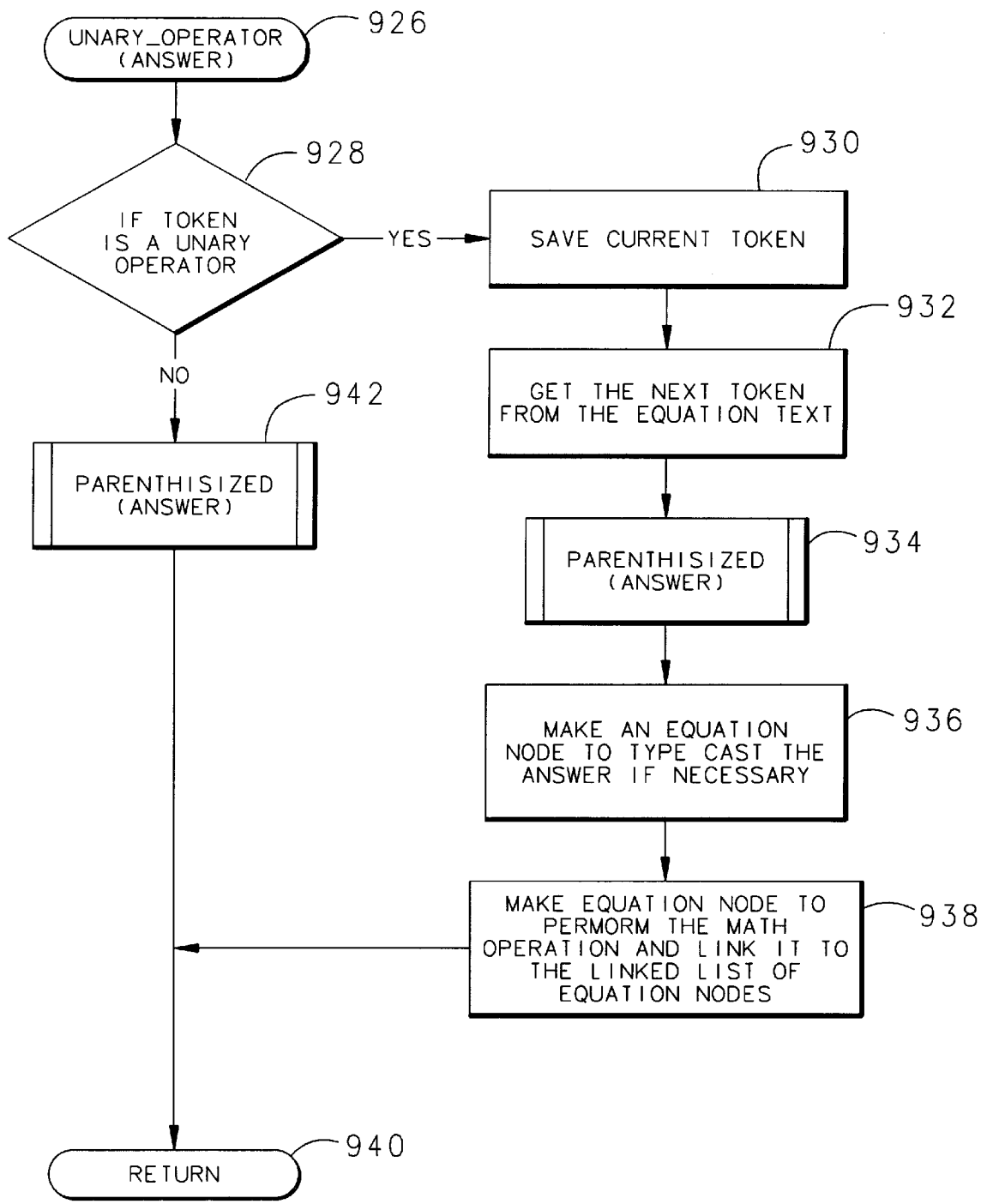
FIG. 51 is a process flow diagram illustrating the unary__operator sub-process of the instant invention.

The unary_operator function 926 as illustrated in FIG. 51, which is called as described above, first checks to determine if the token is a unary operator 928. If it is not, the parenthisized function is called 942. Upon return, this function returns 940. If the token is a unary operator, the current token is saved 930, and the next token from the equation text is obtained 932. At this point the parenthisized function is called 934, and upon return an equation node is made to type case the answer if necessary 936. Next, an equation node is made to perform the math operation and link it to the linked list of equation nodes 938. Upon completion, this function returns 940.

Figure 52:
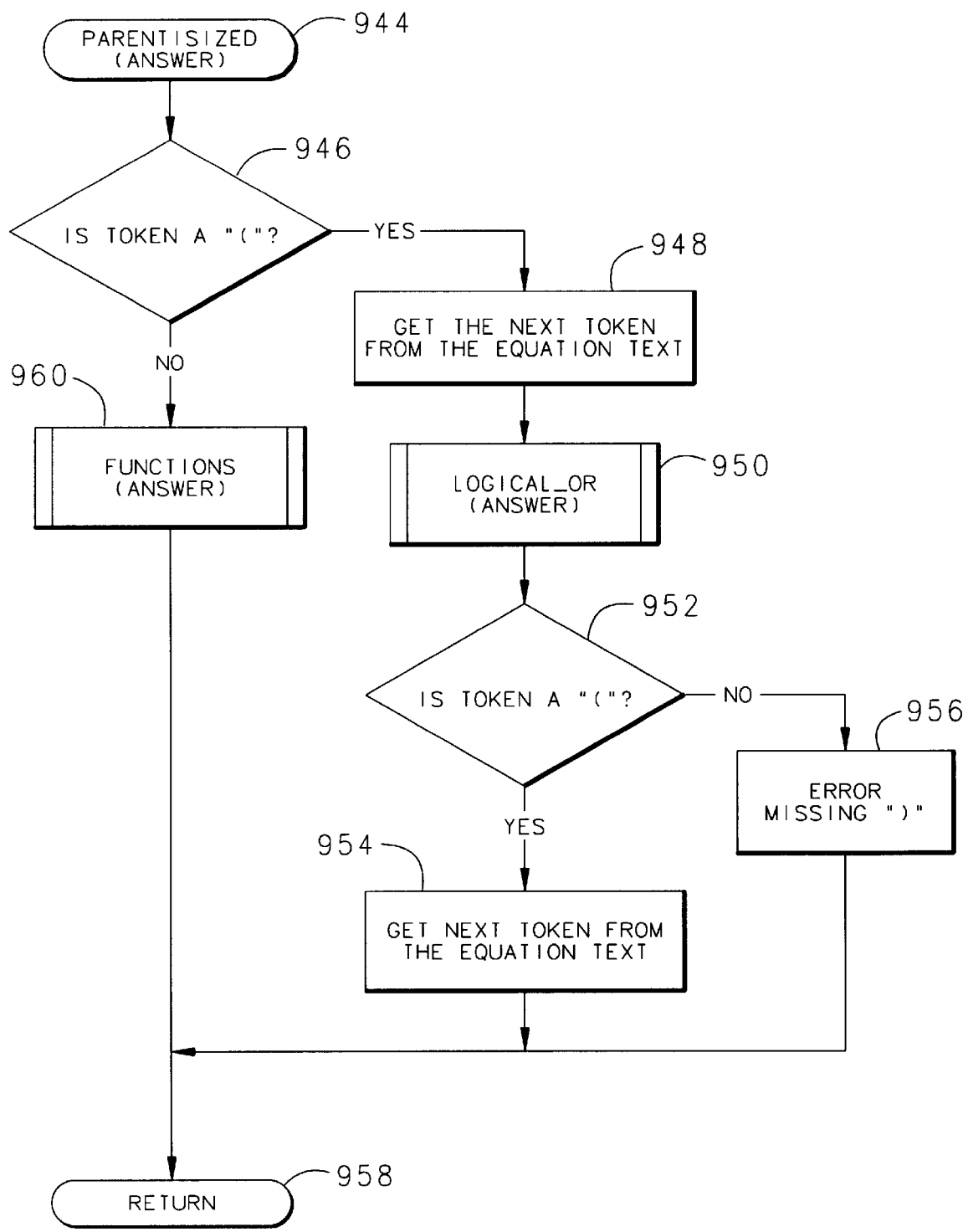
FIG. 52 is a process flow diagram illustrating the parentisized sub-process of the instant invention.

The parenthisized function 944 as illustrated in FIG. 52, which is called as described above, first checks to determine whether the token is a "(" 946. If it is not, the functions function is called 960, and upon return this function returns 958. If the token is a "(", the next token from the equation text is obtained 948, and the logical_or function is called 950. Upon return, this function then checks to determine if the token is a ")" 952. If it is, the next token from the equation text is obtained 954 and this function returns 958. If the token is not a ")", this function generates an error for missing ")" 956 and returns 958.

Figure 53:
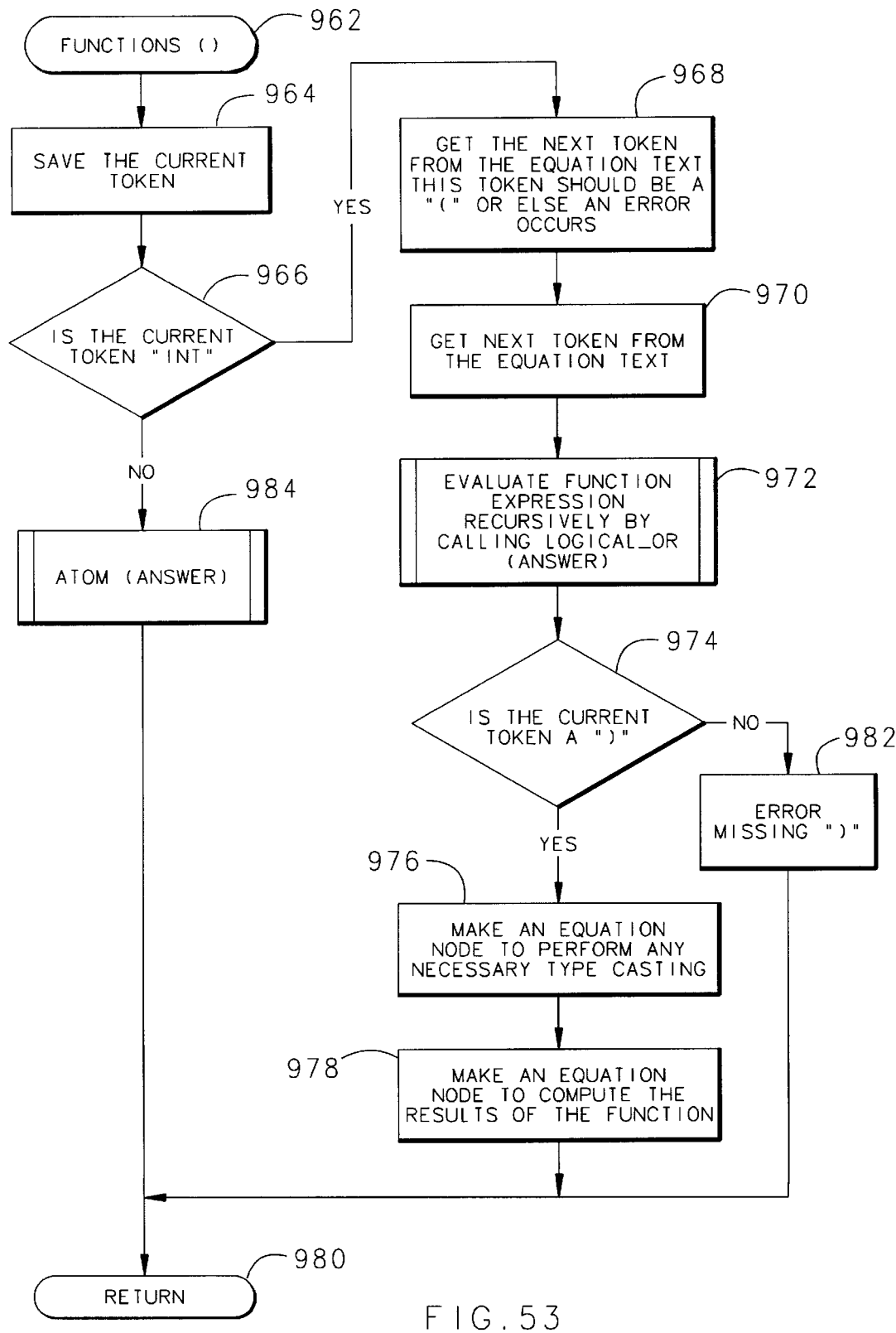
FIG. 53 is a process flow diagram illustrating the functions sub-process of the instant invention.

The functions function 962 as illustrated in FIG. 53, which is called as described above, first saves the current token 964, and then checks to determine if it is an "INT" 966. If it is not, the atom function is called 984, and upon return, this function returns 980. If the token is an "INT", the next token from the equation text is then obtained and if this token is not a "(", an error will be generated 968. At this point the next token is obtained from the equation text 970, and the function expression is evaluated recursively by calling the logical_or function 972. Upon return, a check is made to determine if the current token is a ")" 974. If it is not, an error is generated for the missing ")" 982 and the function returns 980. If the current token is a ")", an equation node is made to perform any necessary type casting 976. Next, an equation node to compute the results of the function is made 978, and the function returns 980.

Figure 54:
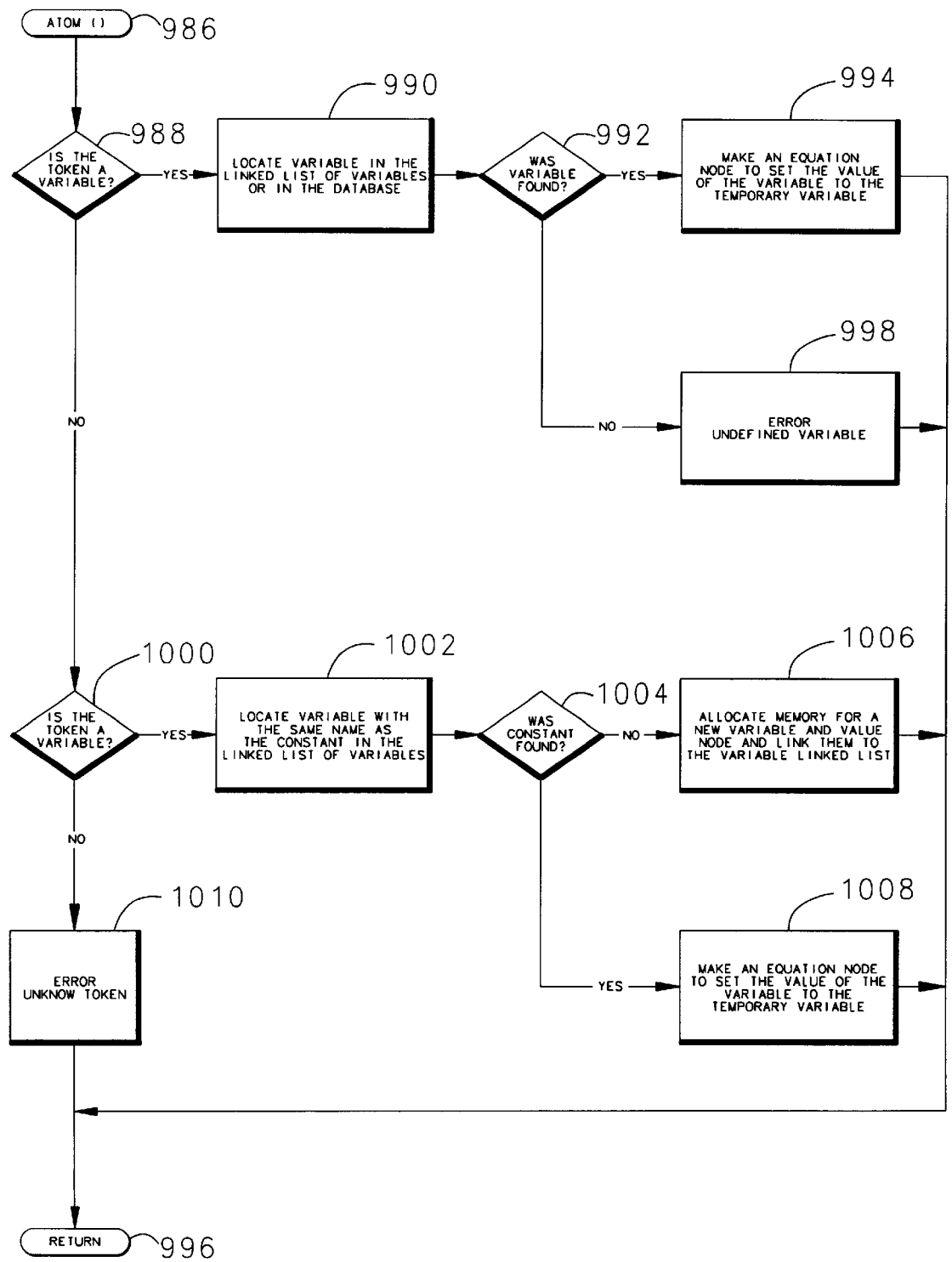
FIG. 54 is a process flow diagram illustrating the atom sub-process of the instant invention.

The atom function 986 as illustrated in FIG. 54, which is called as described above, first checks to determine whether the token is a variable 988. If the token is not a variable, this function checks to determine if the token is a number 1000. If the token is not a number an error is generated for the unknown token 1010, and the function returns 996. If upon the first query the token is determined to be a variable, the atom function locates the variable in the linked list of variables or in the database 990. If the variable was found 992, this function makes an equation node to set the value of the variable to the temporary value 994, and then returns 996. If the variable was not found, an error is generated for an undefined variable 998, and the function returns 996. If upon the second query the token is determined to be a number, this function locates the variable with the same name as the constant in the linked list of variables 1002. If the constant was found 1004, the atom function makes an equation node to set the value of the variable to the temporary value 1008, and then returns 996. If, however, the constant was not found, the atom function allocates memory for a new variable and value node, and links them to the variable linked list 1006. It then makes an equation node to set the value of the variable to the temporary value 1008 and returns 996.

Real-Time Data Monitor Process

The Real-Time Data Monitor Process continuously checks received wordstrings for conditions defined in the monitor setup file. If a monitored condition is detected, the type of event, time of event, wordstring time stamp, and a snap shot of wordstring data is written to the event file. The monitor process is used to monitor ARINC 629 receive data according to application specific conditions which have been read from a monitor setup file and stored in the database by the load monitor process. This monitor process is a high priority process which wakes up every 10 ms to check wordstrings which have been received or should have been received. This monitor process often operates in conjunction with the xmon process which serves as the X-Windows based operator interface. The real-time monitor process can also be operated by the ATE stand through the command process.

The real-time data monitor process contains two threads of execution. One thread checks receive wordstrings against the monitor conditions and, if needed, builds a queue of event reports. The second thread empties the queue as it formats and stores the event reports on disk. This two thread method allows event detection to continue in real-time even when disk operations are momentarily blocked. The first thread is run at a higher priority to insure that event detection is not delayed by event storage.

Figure 55A:
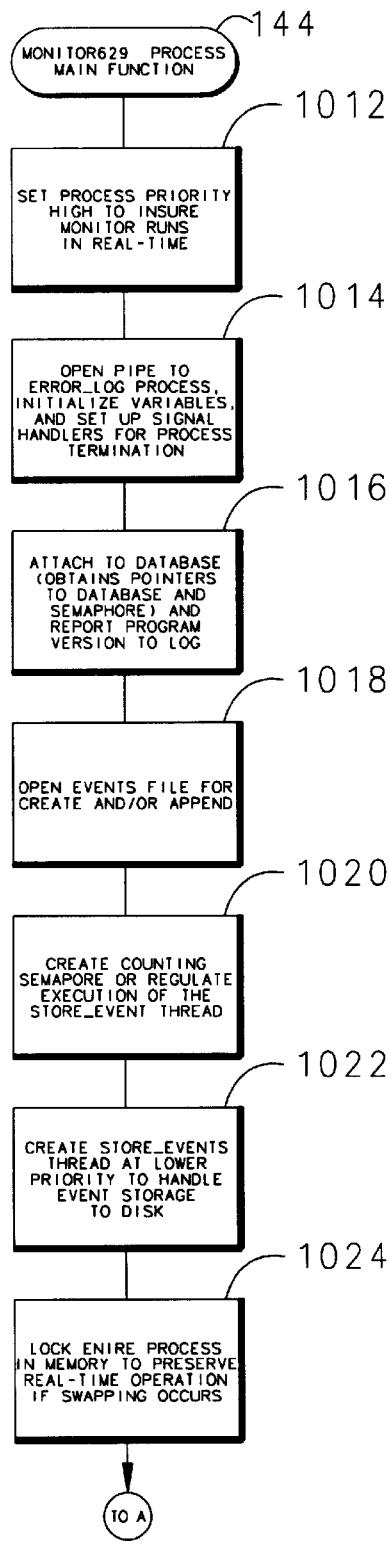
FIGS. 55A–55C are a process flow diagram illustrating the data monitor process of the instant invention.
Figure 55B:
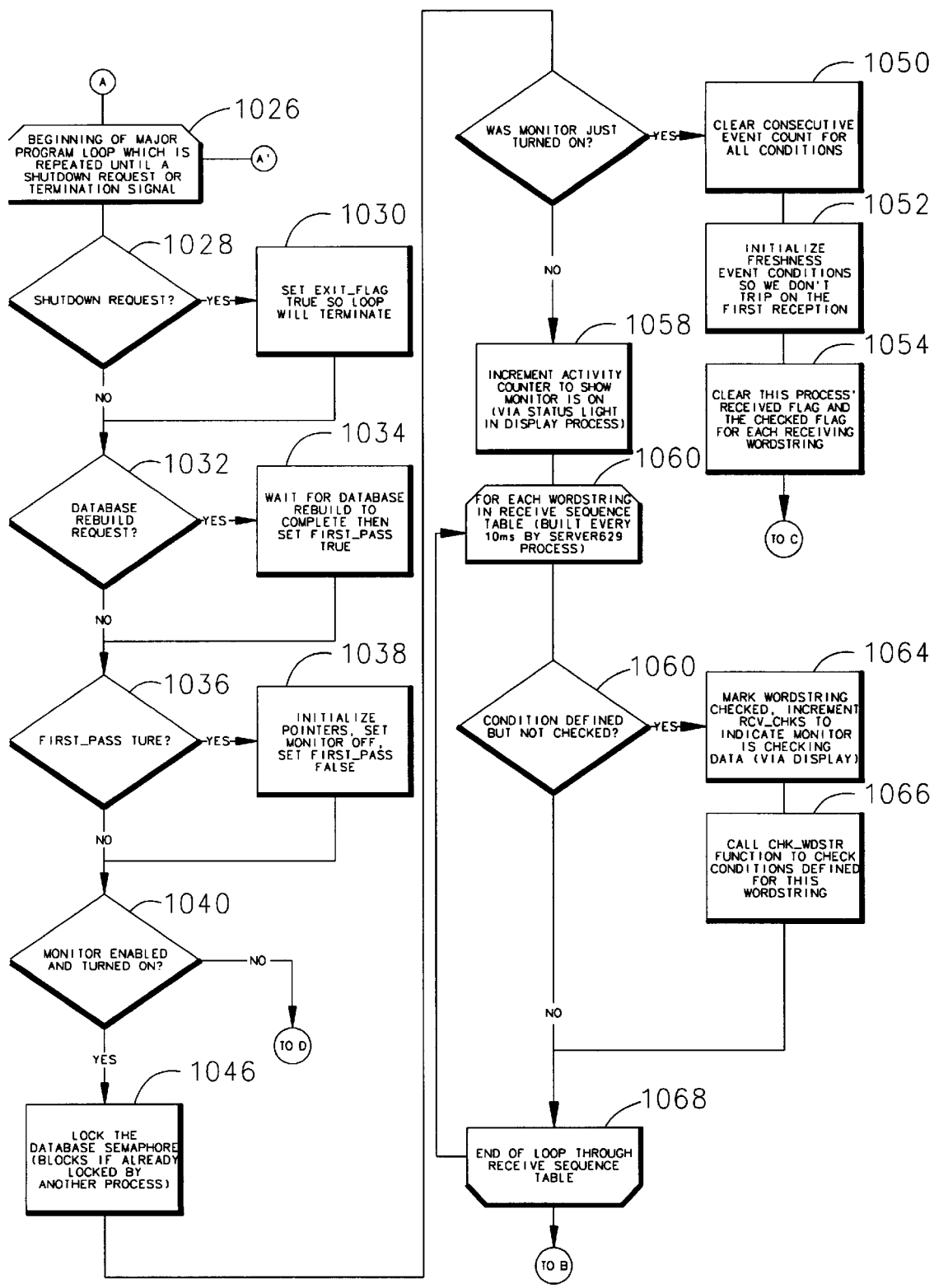
Figure 55C:
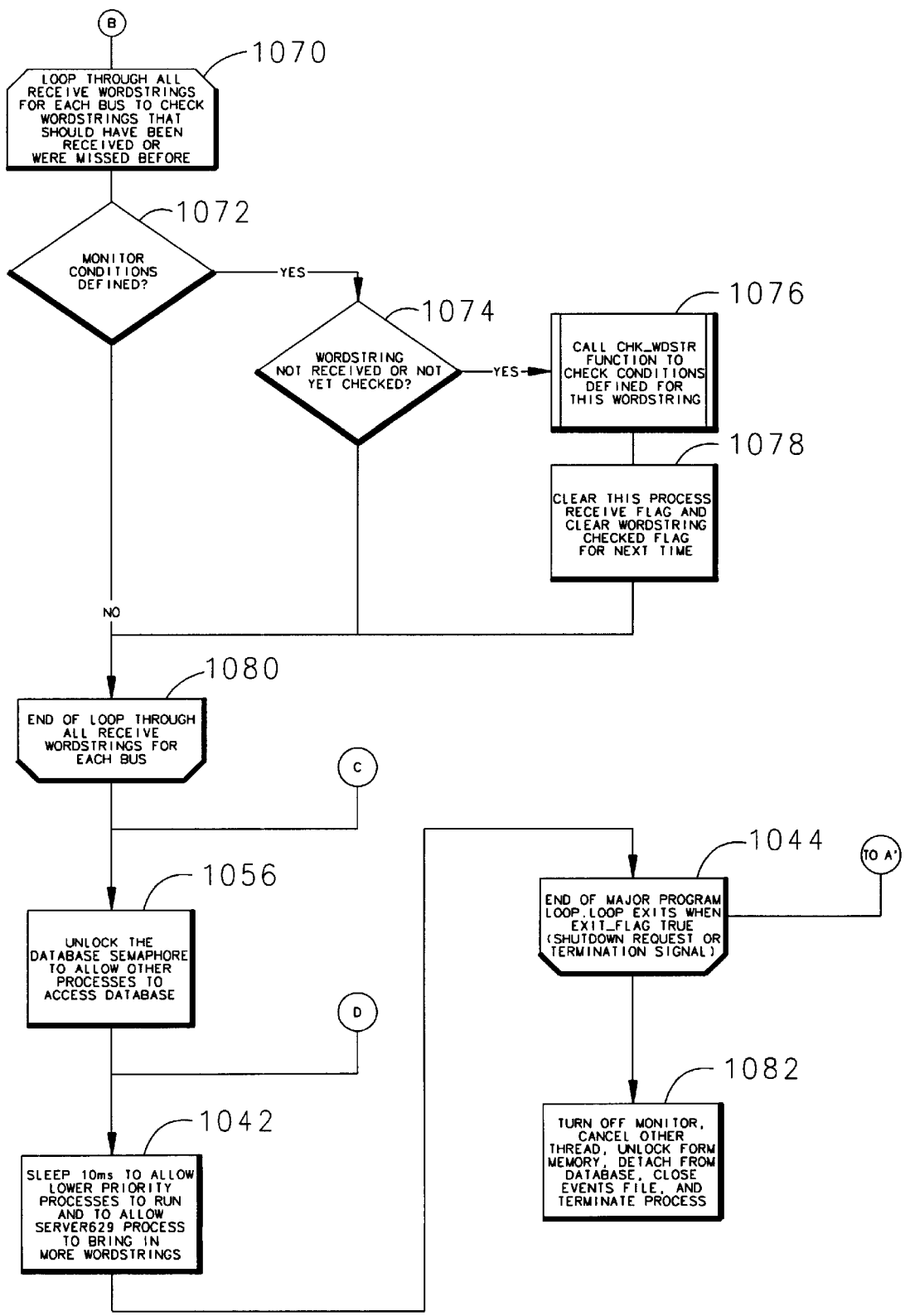
Figure 56:
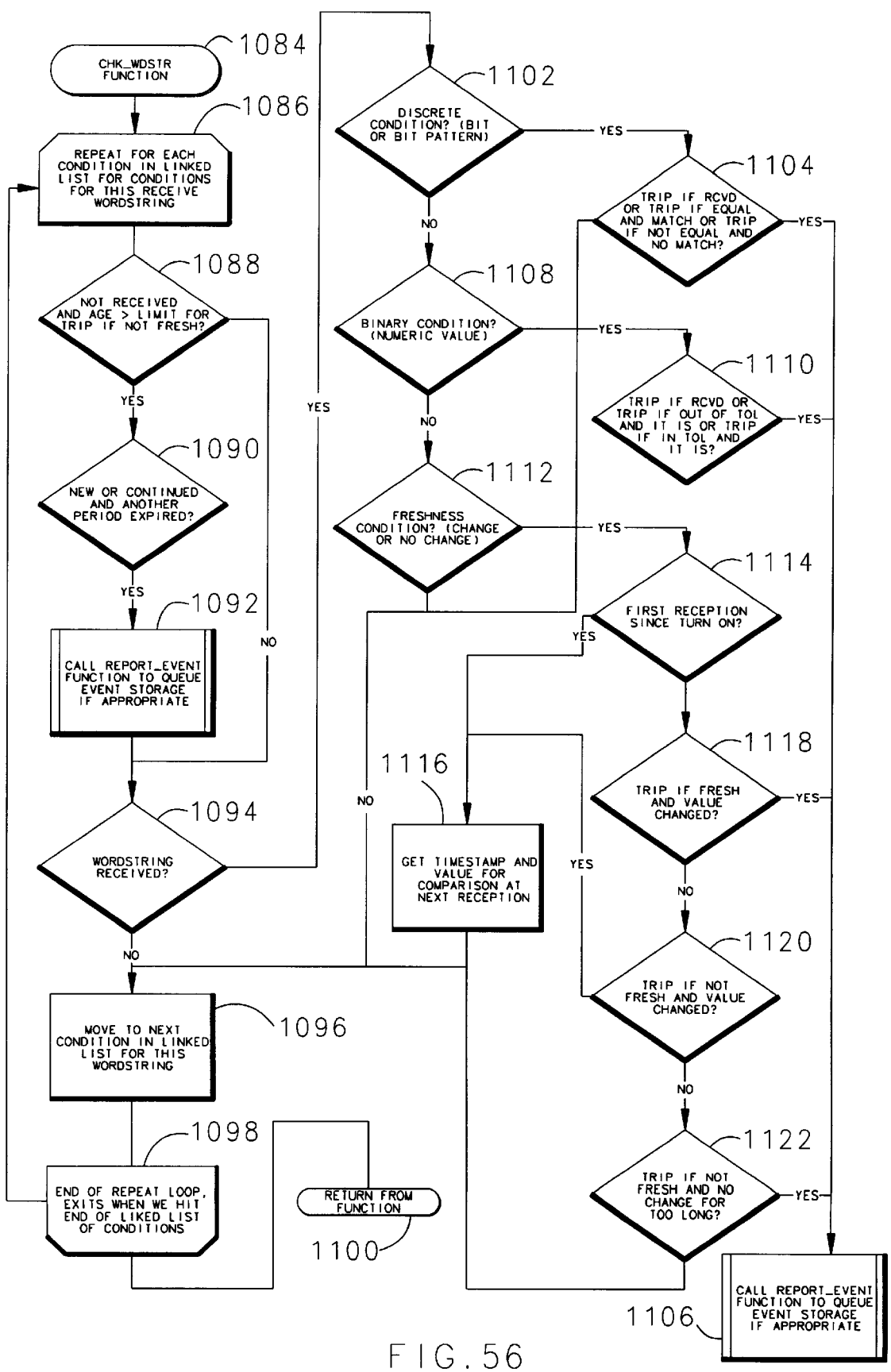
FIG. 56 is a process flow diagram illustrating the check wordstring sub-process of the instant invention.

Specifically in the preferred embodiment of the instant invention, the data monitor process 144, as illustrated in FIG. 55A–55C, sets the process priority high to ensure that it runs in real-time 1012. It then opens a pipe to the error log process, initializes variables, and sets up signal handlers for process termination 1014 prior to attaching to the database by obtaining pointers and the semaphore 1016. When this process attaches to the database, it reports the program version to the version log 1016. An events file is then opened 1018, and a counting semaphore is created to regulate execution of the store events thread 1020. The actual store events thread is then created at a lower priority to handle event storage to disk 1022. The entire process is then locked in memory to preserve real time operation if swapping occurs 1024.

At this point the major program loop is begun, as illustrated in FIG. 55B, and is repeated until a shutdown request or termination signal is received 1026. If a shutdown request is received 1028, an exit flag is set so that the loop will terminate 1030. If a database rebuild request is received 1032, this process will wait until the rebuild and configuration file load is complete and then set a first pass flag true 1034. If this flag is set 1036, the pointers are reinitialized, the first pass flag is reset, and the monitor is turned off 1038. At this point 1040, the process sleeps for one cycle to allow lower priority processes to run and to allow the server process to bring in more wordstrings 1042 (see FIG. 55C). After this period the process loops back to the beginning of the major loop 1044.

If, instead of having a shutdown requested or the database rebuilt, the monitor process is enabled and turned on, the database semaphore is locked 1046 and data monitoring begins. If the monitor function was just turned on 1048, all consecutive event counts for all conditions are cleared 1050, and the freshness event conditions are initialized so that an event is not logged for the first reception 1052. The received and the checked flags for each wordstring are then cleared 1054. Once this initialization is complete, the database semaphore is unlocked 1056 (see FIG. 55C) to allow other processes access to the database. The monitor then goes to sleep for a cycle to allow lower priority process to run and to allow the server process to bring in more wordstrings 1042. After this period the process loops back to the beginning of the major loop 1044. On the next pass through the major loop once the initialization has taken place, an activity counter is incremented to indicate that the monitor process is on 1058.

Next, the monitor process loops through each wordstring in the receive sequence table which is built each cycle by the server process 1060. If a monitor condition has been defined but not yet checked 1062, the wordstring is checked, and the received checked flag is incremented to indicate on the display that the monitor process is checking data 1064. The check wordstring function is then called 1066 to check the conditions defined for this wordstring as described in more detail below. Once each of these wordstrings have been checked 1068, this loop terminates.

Next, the monitor process loops through all receive wordstrings for each bus that should have been received or were missed previously 1070. If a monitor condition has been defined for the wordstring 1072 and if the wordstring has not yet been received or checked 1074, the check wordstring function is called 1076 to check the conditions for this wordstring as described more fully below. Once this has been done, the receive and the wordstring checked flags are reset 1078. This process continues until all receive wordstrings for each bus have been checked 1080, whereupon this loop ends. At this point the database semaphore is unlocked to allow other processes access to the database 1056. The monitor then goes to sleep for a cycle to allow lower priority process to run and to allow the server process to bring in more wordstrings 1042. After this period the process loops back to the beginning of the major loop 1044, unless the exit flag is set due to a shutdown request or a termination signal, in which case the monitor is turned off, the thread is canceled, the memory is unlocked, the database is detached, the events file is closed, and the process is terminated 1082.

Figure 58:
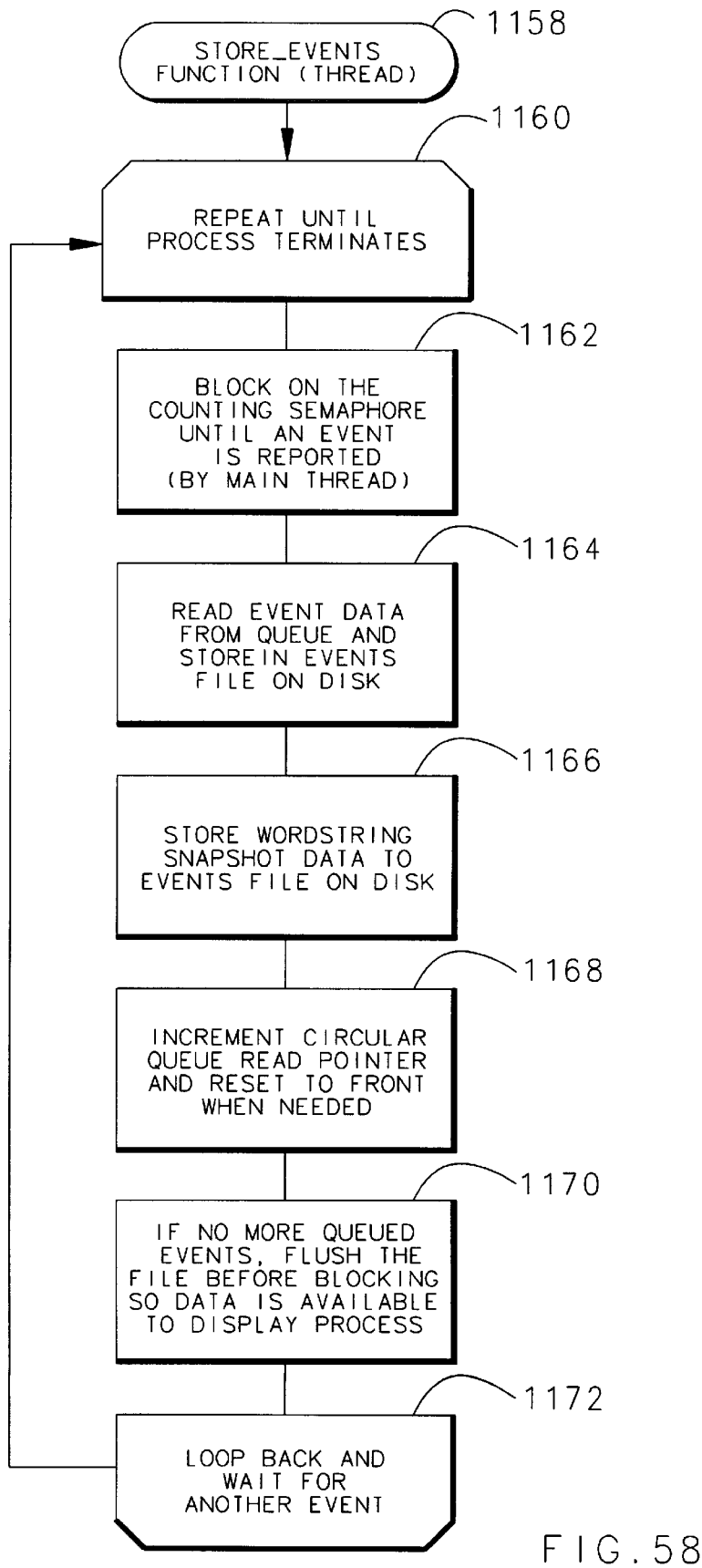
FIG. 58 is a process flow diagram illustrating the store event sub-process of the instant invention.

The check wordstring function 1084 as illustrated in FIG. 58, when called from the monitor process as described above, enters a loop which is repeated for each condition in a linked list of conditions for the particular receive wordstring for which the call was initiated 1086. For wordstrings whose monitor condition is 'trip if not fresh', if the wordstring has not been received for longer than the limit set in the monitor file 1088, 1090, the report event function is called 1092 to queue event storage as described in more detail below. If the wordstring has not been received 1094, the process moves to the next condition in the linked list 1096, and repeats 1098. Once the end of the linked list is reached for the particular wordstring, the function terminates and returns to the step of the process that called it 1100. For wordstring conditions which are not 'trip if not fresh' or have been received, if the wordstring has been received and the monitor condition is discrete 1102, the report event function is called 1106 if the condition is either trip if received, or trip if equal and a match is detected, or trip if not equal and no match is detected 1104. Further, if the wordstring has been received and the monitor condition is binary 1108, the report event function is called 1106 if the condition is either trip if received, or trip if out of tolerance and it is out of tolerance, or trip if not out of tolerance and it is within tolerance 1110.

For received wordstrings with a monitor condition of freshness 1112, that is change or no change, if this is the first reception since turn on 1114 a timestamp and value are retrieved for comparison at the next reception of the wordstring 1116. This process then moves to the next condition in the linked list 1096 for the wordstring and loops back 1098. If this is not the first reception since turn on and the condition is 'trip if fresh' and the value of the wordstring has changed 1118, the report event function is called 1106. If, instead, the condition is 'trip if not fresh' and the value of the wordstring has changed 1120, a timestamp and value are retrieved for comparison at the next reception of the wordstring 1116. This process then moves to the next condition in the linked list for the wordstring 1096 and loops back 1098. If, however, the value has not changed for too long 1122, the report event function is called 1106. For each of the above conditions which call the report event function, upon return this process moves to the next condition in the linked list for this wordstring 1096 and loops until the end of the linked list is reached 1098 at which point the function returns 1100.

Figure 57:
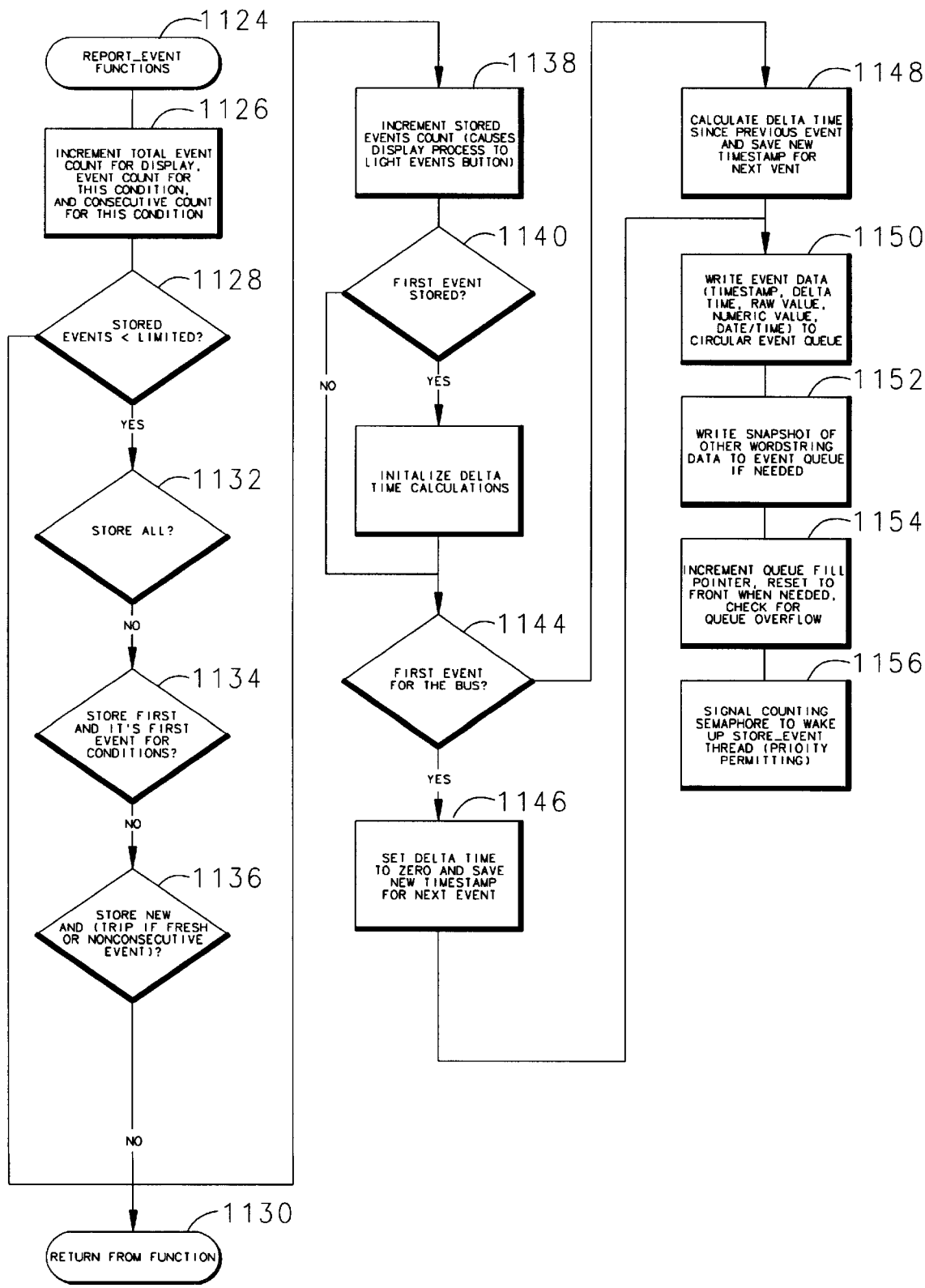
FIG. 57 is a process flow diagram illustrating the report event sub-process of the instant invention.

The report event function 1124 as illustrated in FIG. 57, which is called as described above, increments the total event count for display, the event count for this condition, and the consecutive count for this condition 1126. If the stored events exceed the limit 1128, the function returns 1130. If the limit has not been exceeded, however, and either the storage mode is 'store all' 1132, or 'store first' and this is the first occurrence of this condition 1134, or 'store new' and the condition is trip if fresh or this is a nonconsecutive event 1136, the stored events count is incremented 1138 which causes the display process to light the events button. If none of those conditions is satisfied the thread function returns 1130. In the case of the former, if this is the first event stored 1140 the delta time calculations are initialized 1142; if it is not the first event stored, this step is skipped. If this is not the first event for the particular bus 1144, a delta time is calculated since the previous event and a new time stamp is saved for the next event 1148. If, however, it is the first event for the particular bus 1144, the delta time is set to zero and a new timestamp is saved for the next event 1146. In either event, the event data is written to the circular event queue 1150, including the timestamp, delta time, raw value, numeric value, and date/time. A snapshot of other wordstring data is then written to the event queue if required by the particular condition 1152. The queue fill pointer is then incremented and moved to the front when needed, and the queue overflow is checked 1154. At this point, the counting semaphore is signaled to wake up the store event thread, priority permitting 1156.

The store events thread 1158 as illustrated in FIG. 58 simply loops until the monitor process terminates 1160. It blocks on the counting semaphore until an event is reported 1162, at which point the event data is read from the queue and is stored in the events file on disk 1164. Any wordstring snapshot data is also stored to the events file on disk 1166. Once this storage is complete, the circular queue read pointer is incremented and reset to front when needed 1168. If no more events are queued, the file is flushed before blocking so that the data will be available to the display process 1170. The store events thread process then loops back and waits for another event 1172.

The real-time data monitor process is adapted to a particular application by a configuration (.cfg) file and a monitor setup (.mon) files. The configuration file defines which ARINC 629 wordstrings will be received by the simulator. The monitor setup file defines which receive data words should be monitored. Several hundred conditions can be monitored at a time. For each monitor condition, the file specifies the bus number, channel ID, label, word number, parameter name, condition type, trip condition, discrete bit specification or binary tolerance, number of data words to capture (0 to 10), and the first data word to capture.

There are three possible condition types and several trip conditions for each as shown below.

| Condition_type | Trip_condition | Description |
| --- | --- | --- |
| discrete | equal | Trip each time the received word value is equal to a specified bit pattern of 1's, 0's, and X's where X indicates a don't care position. 1 Bn or 0 Bn can also be used for a single bit position where n is 0 (lsb) to 15 (msb). This may be used for discrete, coded, and character ARINC 629 parameters. |
|  | not_equal | Trip each time the received word value is not equal to a specified bit pattern as described above. |
|  | received | Trip each time the word is received with any bit pattern. This can be used to verify label transmission rates. |
| binary | in_tol | Trip each time the binary word value, as converted to engineering units, is within specified min and max tolerance limits. This is typically used for voltage, frequency, current, and load parameters. |
|  | out_of_tol | Trip each time the binary word value, as converted to engineering units, is outside specified min and max tolerance limits. |
|  | received | Trip each time the binary word is received with any engineering unit value. |
| freshness | fresh | Trip each time the specified bit or bits of the receive word change state. The bits of interest are specified as with a discrete condition except 1's and 0's both indicate bits to analyze for change of state. X's indicate don't care positions. 1 Bn or 0 Bn can also be used for a single bit position where n is 0 (lsb) to 15 (msb). This may be used to record parameter changes or freshness counter update rates. |
|  | not_fresh | Trip each time the specified bit or bits of a receive word do not change state within a specified time limit in ms. The bits of interest are specified as above. This may be used to verify continued freshness counter update as well as wordstring transmission since the data will not change if its not received. |

The following are some examples of monitor condition definitions:
define_monitor_condition:
    cond_enab:    enable
    bus_num:    all
    cid:    1
    label:    F6F
    word_num:    1
    param_name:    SYSTEM_STATUS
    cond_type:    discrete
    trip_if:    not_equal
    bitspec:    00000000XXXXXXXX
    num_words:    0
    begin_at:    1
end_define:
define_monitor_condition:
    cond_enab:    enable
    bus_num:    1

-continued

| Condition_type | Trip_condition | Description |
|---|---|---|
| cid: | 8 | |
| label: | F6C | |
| word_num: | 5 | |
| param_name: | PEP_VOLTAGE | |
| cond_type: | binary | |
| trip_if: | out_of_tol | |
| sign_enab: | enable | |
| lsb_pos: | 0 | |
| lsb_res: | 0.09699 | |
| offset: | 0.0 | |
| min: | 114.0 | |
| max: | 116.0 | |
| end_define: | | |
| define_monitor_condition: | | |
| cond_enab: | enable | |
| bus_num: | 2 | |
| cid: | 2 | |
| label: | F6F | |
| word_num: | 4 | |
| param_name: | RGCB_AUX | |
| cond_type: | freshness | |
| trip_if | fresh | |
| bitspec: | 1B3 | |
| num_words: | 10 | |
| begin_at: | 1 | |
| end_define: | | |
| define_monitor_condition: | | |
| cond_enab: | enable | |
| bus_num: | all | |
| cid: | 2 | |
| label: | F6F | |
| word_num: | 2 | |
| param_name: | FRESHNESS_CNTR | |
| cond_type: | freshness | |
| trip_if: | not_fresh | |
| bitspec: | 1111XXXXXXXXXXXX | |
| max_update: | 40 | |
| end_define: | | |

Load Monitor Process

The load monitor process is started by the dispatch process when the user loads a monitor setup file. This process parses the monitor setup file and initializes the structures related to the Data Monitor Process in the database. This method permits the user to have multiple monitor files for various conditions to monitor without having multiple main configuration files. The load monitor process is used to load application specific monitor setup files selected by the operator through the data monitor display process and/or selected by the ATE stand through the command process. Both of these methods invoke the load monitor process indirectly through the dispatch process and provide the pathname of the desired monitor setup file in a command line argument.

Figure 59:
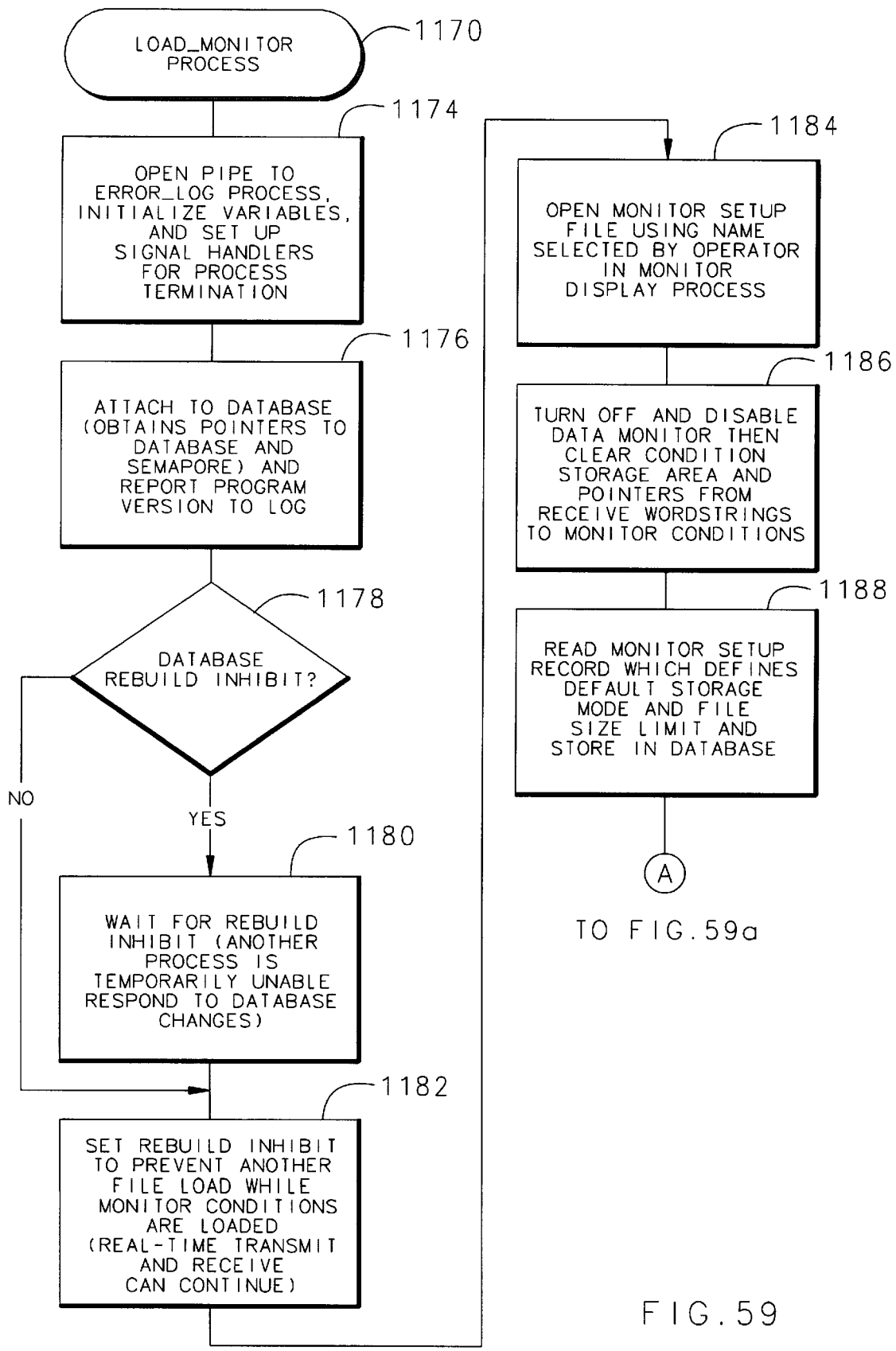
FIGS. 59–59A is a process flow diagram illustrating the load monitor process of the instant invention.
Figure 59A:
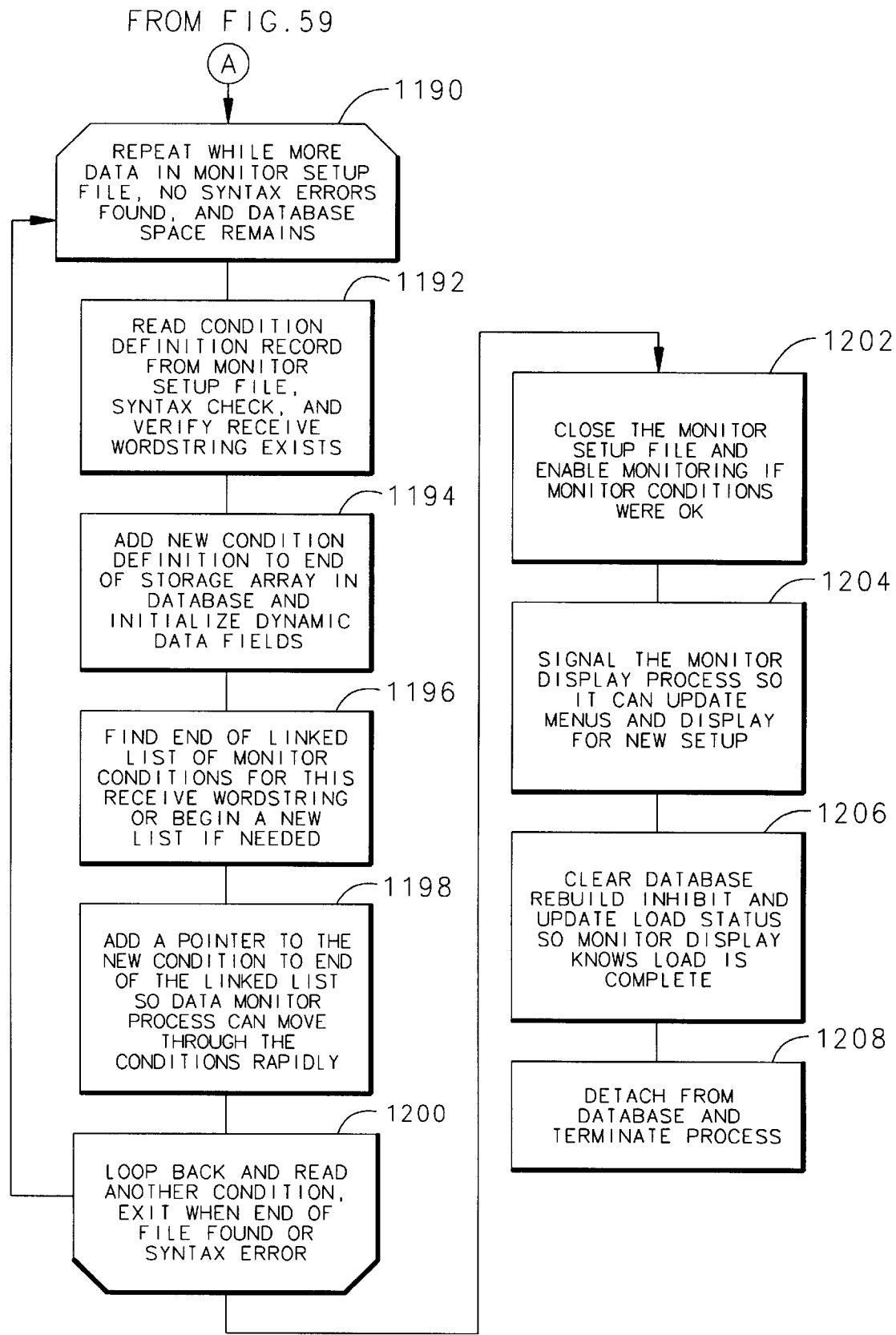

The load monitor process 170 as illustrated in FIG. 59 and 59A opens a pipe to the error log process, initializes variables, and sets up signal handlers for process termination 1174 prior to attaching to the database by obtaining pointers and the semaphore. When this process attaches to the database, it reports the program version to the version log 1176. If the database rebuild inhibit is set 1178, which signifies that another process is temporarily unable to respond to database changes, the process waits until the inhibit is reset 1180. Once this rebuild inhibit is reset, or if it was reset when first checked, this process sets this rebuild inhibit to prevent another file load while the monitor conditions are loaded 1182, however, during this time real-time transmit and receive may continue.

Once this inhibit is set, the monitor setup file is opened using the name selected by the operator in the monitor display process 1184. The process then turns off and disables the real-time data monitor and initializes the monitor condition storage area in the ARINC 629 database 1186. It then reads and parses the monitor setup file into the database 1188. Each monitor condition 1190 is checked for compatibility with a matching receive wordstring which must already exist in the database 1192. This process adds a new condition definition to the end of the storage array in the database and initializes the dynamic data fields 1194. The process is then connected into the linked list of monitor conditions for that wordstring 1196. A pointer is then added to the new condition to the end of the linked list so the data monitor process can move through the conditions rapidly 1198. Once the end of the file is found and all conditions are added to the storage array, and if no errors are detected 1200, the real-time data monitor is enabled (but not restarted) 1202. The monitor display process is then signaled to allow display menus to be updated 1204. Once this is complete, the rebuild inhibit is reset and the load status is updated to inform the monitor display process that the load is complete 1206. This process then detaches form the database and terminates 1208.

Data Monitor Display Process

Figure 60:
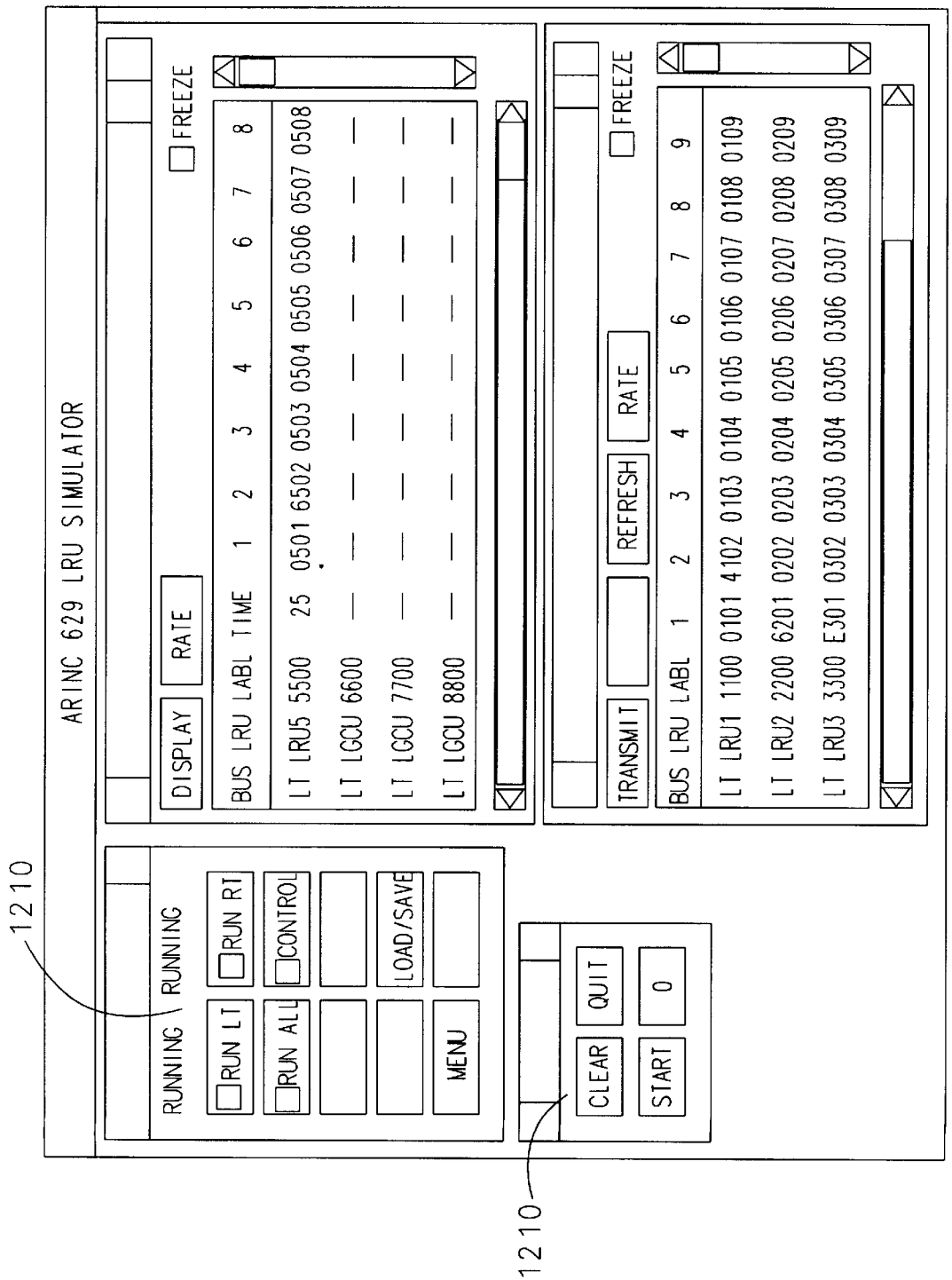
FIG. 60 illustrates a graphical and textural display in accordance with the instant invention.
Figure 61:
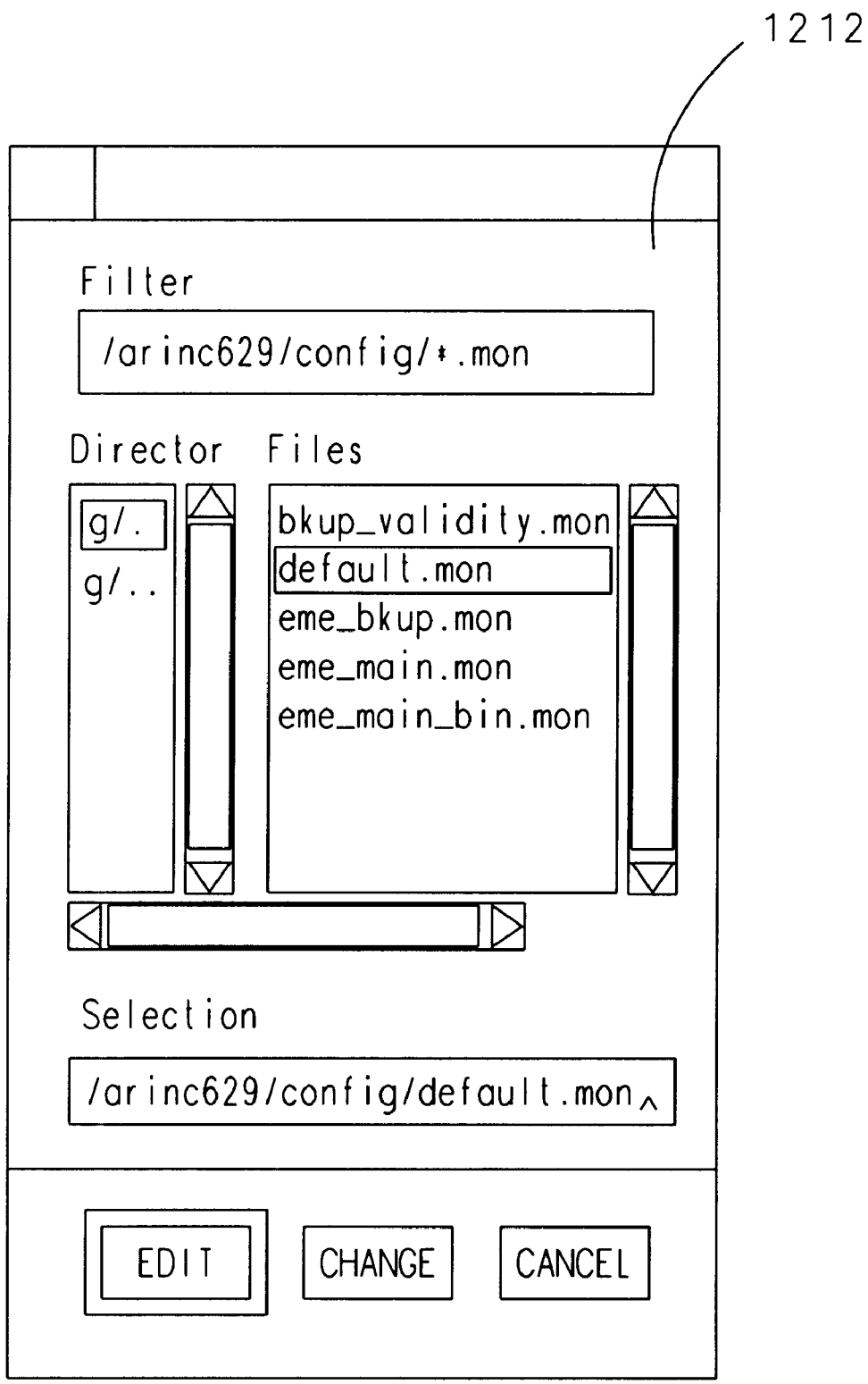
FIG. 61 illustrates a graphical and textural display in accordance with the instant invention.

The data monitor display process allows the operator to select and load a monitor file and start and stop monitoring via the monitor menu 1210 illustrated in FIG. 60. The load monitor file menu 1212 is illustrated in FIG. 61. This process also displays the number of events detected and allows the operator to view the events file 1214 illustrated in FIG. 62 that was created when events are detected. When the user selects a monitor file to load, the dispatch process 150 (see FIG. 3) is used to start the load monitor process 170 with the selected monitor file.

Dispatch Process

The dispatch process 150 (see FIG. 3) serves all application and support process start up requests. It reads the name of the requested process, the priority level, and any passed parameters from the dispatch pipe. The dispatch process will then attempt to start the new process executing at the desired priority. If a priority was not specified, a default value is used.

Error Log Process

Any process which detects a program, configuration file, or non UUT hardware error writes an error message to the error pipe 1216 (see FIG. 3). The error log process 148 reads the error message from the pipe 1216 and writes it to a new error file and an old error file. The new error file contains the current errors since the error log process was started. The old error file contains a history of the errors that have occurred. If the old error file exceeds a predetermined number of lines, the file is automatically trimmed when the error log process is started.

Figure 11:
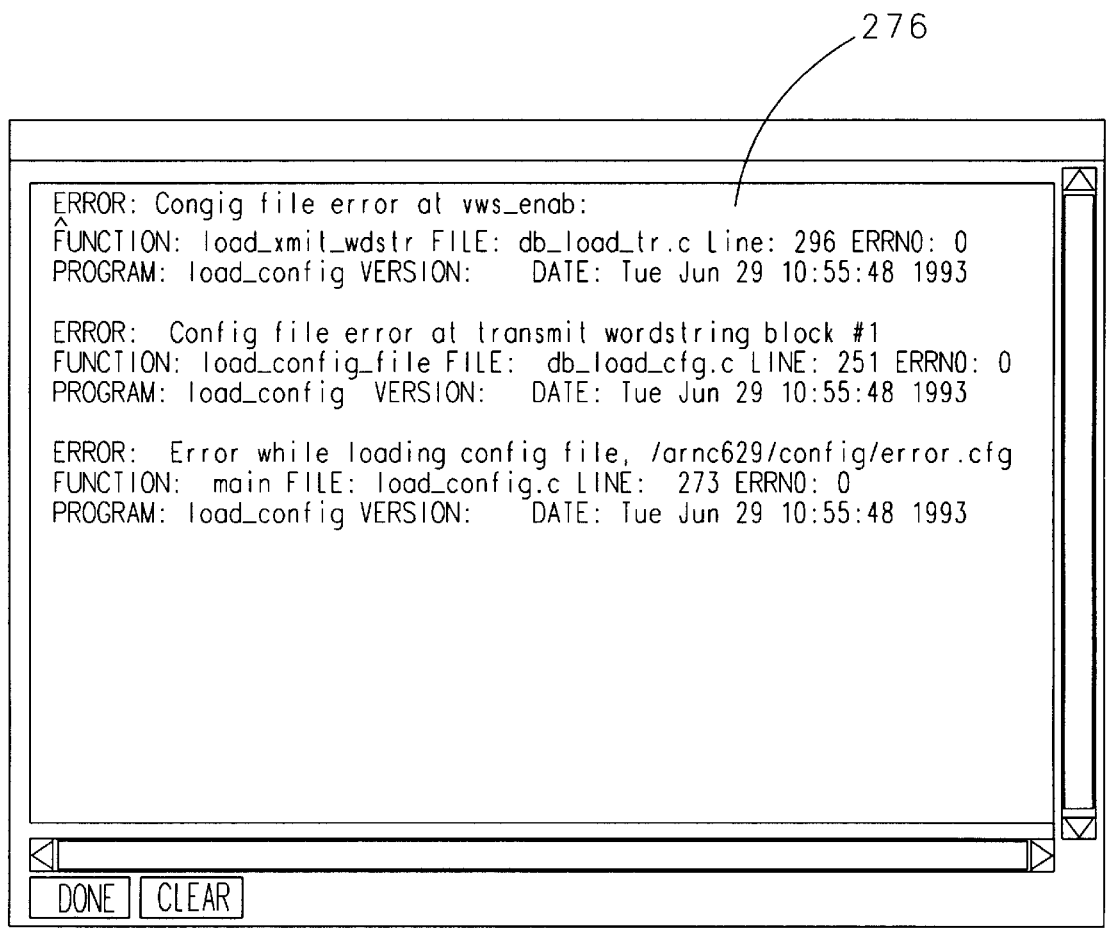
FIG. 11 illustrates a graphical and textural display in accordance with the instant invention.

Each error message contains text describing the error, the name of the process detecting the error, the line number and the name of the source file, the date and time the error message was generated, and the system error number as is illustrated on the program errors menu 276 in FIG. 11. This information is primarily used for debugging purposes to allow a determination why the error occurred and to inform the user that errors were detected when loading a configuration or monitor setup file. The error log process also increments an error count in the database. This causes the control panel process to annunciate the error and permits the user to view and clear the error file.

Automatic Test Equipment Interface Process

The automatic test equipment interface process 152, 153 (see FIG. 3) serves as an interface to the command processor for commands generated by an ATE stand. The ATE interface process forks into two processes when the computer boots up, prior to a user login. Each of the processes are blocked on a socket waiting for a connect request from the ATE stand. After a connect request is received, one process blocks on a socket waiting for commands from the ATE stand and the other process blocks on a named pipe waiting for responses from the command processor.

Commands, in the form of ASCII strings generated by the ATE stand, are written to the socket. The ATE Interface process reads each command from the socket and writes it to a named pipe for the command processor. Responses from the command processor, also in the form of ASCII strings, are written to another named pipe. The forked copy of the ATE Interface process receives the response from the pipe and writes it to the other socket to permit the ATE stand to obtain the response.

Command Processor

The command processor receives ASCII commands from a named pipe connected to the ATE Interface process, performs the command, and writes an ASCII response into a named pipe connected to a duplicate copy of the ATE interface process 152, 153 (see FIG. 3).

Configuration Files

Figure 1:
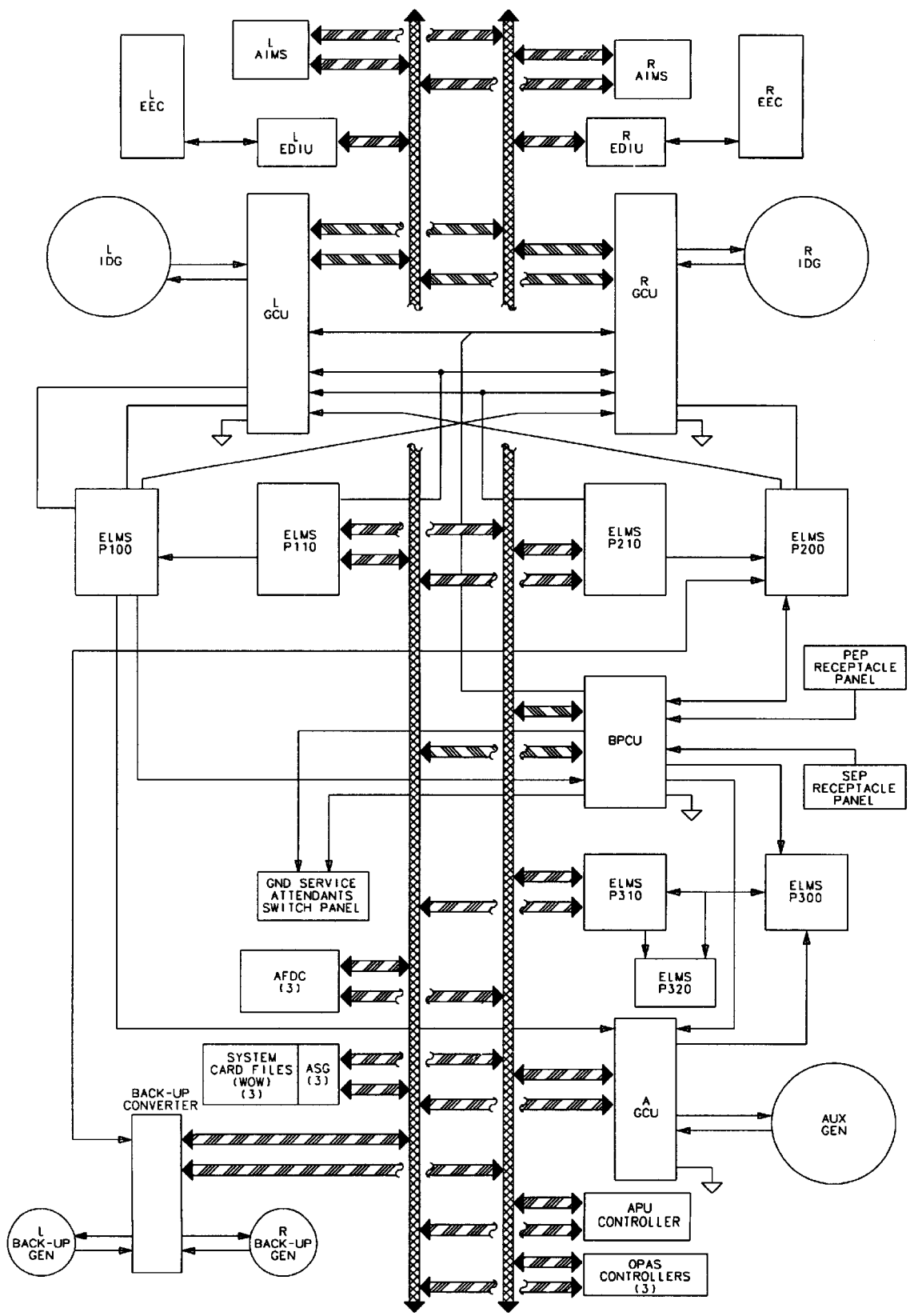
FIG. 1 is a single line communications schematic illustrating ARINC 629 communications for an electric power generating system.

A configuration file 176 (see FIG. 3) is an ASCII text file which is used to set up and initialize the simulator 100 (see FIG. 2) for a particular application, such as LGCU HSIT which configures the simulator to perform hardware/software integration testing on the left generator control unit of the Main EPGS (see FIG. 1). Each configuration file contains all ARINC 629 related data which is specific to the LRU(s) to be tested, the test stand hardware to be utilized, and the test to be performed. The configuration file is read by the load configuration process 156 and loaded into the database. The data is then used to create the XPT, RPT, and other tables needed to set up the ARINC 629 cards, configure the various data display and control processes, and initialize the system. Configuration file names end with a .cfg suffix.

Each configuration file contains several different types of structures which define: the method to be used to build the XPTs, bus timing parameters, wordstrings and data to be transmitted including transmit and update rates, wordstrings to be received, engineering unit display content and conversions, digital inputs and outputs, analog inputs, named parameter menus and default values, user defined variables, macros, and mathematical equations. Each of these are described hereinbelow.

The build control definition allows the user to select the XPT layout method (auto or manual) and specify the mode of XPT access by the DATAC terminal controller (independent or block). This definition is optional and defaults to the values shown. Auto mode is preferred and will create XPT pages which provide the label transmit rates requested with a minimum of user effort. Manual mode should be used only when the exact label transmission order is important and should only be attempted by those who are familiar with DATAC operation. An example of the build control definition follows:

```
define_build_control
    build_mode:     auto
    xpp_mode:       independent
end_define:
```

The bus setup definition defines the bus number and name, bus timing parameters (i.e. Transmit Interval, Terminal Gap, and Sync Gap), bus type and signal threshold, a global bus freshness counter update enable flag, and which time stamp clock to use. Other optional parameters control the initial xpp page and txrx mode. A bus setup definition is needed for each ARINC 629 bus. An example of a bus setup record is shown below:

```
define_bus_setup:
    bus_num:        1
    bus_name:       LT
    ti:             25
    tg:             101
    sg:             127
    bus_type:       sim_bus
    sim_thresh:     high_thresh
    update_enab:    enable
    extclk_enab:    enable
    xpp_page:       1
    txrx_mode:      txrx
end_define:
```

Transmit wordstring definitions contain fields to describe the bus number, channel identification, label, an enable flag, which XPT page(s) the label should appear in, the name of the LRU that transmits the label, a flag to indicate whether the wordstring is variable length, the maximum number of data words, the location of the system status and parameter validity (freshness counter) words, the rate the label is to be transmitted, the rate the freshness counter is to be updated, a freshness counter update enable, a raw data display enable, and the initial data words for the wordstring. A transmit wordstring definition is required for each label to be transmitted. An example of a transmit wordstring definition follows:

```
define_transmit_wordstring:
    bus_num:         1
    cid:             2
    label:           408
    wdstr_enab:      enable
    page_enab:       1234
    lru_name:        AIMS
    vws_enab:        disable
    max_len:         8
    ssw_loc:         1
    pvw_loc:         2
    xmit_rate:       500
    update_rate:     1000
    update_enab:     enable
    raw_disp_enab:   enable
    xdata:           0000 1000 0000 0000 0000 0000 0000 0000
end_define:
```

The receive wordstring definition contains fields to describe the bus number, channel identification, label, an enable flag, which LRU transmits the label, whether the wordstring is variable length, the maximum number of data words, the location of the system status and parameter validity words, a display enable flag, and the maximum allowed time between receptions. A receive wordstring definition must exist for each label to be received. An example of the receive wordstring definition is shown below:

```
define_receive_wordstring:
    bus_num:         1
    cid:             8
    label:           F60
    wdstr_enab:      enable
    lru_name:        BPCU
    vws_enab:        disable
    max_len:         10
    ssw_loc:         1
    pvw_loc:         2
    raw_disp_enab:   enable
    max_rate:        40
end_define:
```

Engineering unit parameters are defined in groups that form display windows. Each group definition contains parameters for a group enable, a display enable flag, the group name, and the group type, receive or transmit, which identifies the source of the wordstrings. An engineering unit group contains of one or more engineering unit items. Engineering unit items can be of discrete (single bit), coded (two to four bits), or binary type. All engineering unit item definitions contain an item enable flag, the item type, the bus number, CID, label, and word number. Discrete items contain additional parameters for the bit position, the normal value, and ASCII text strings that are displayed for each of the two states. Coded items contain additional parameters for the LSB position, the number of bits, the normal value, and ASCII text strings that are displayed for each of the four to sixteen possible states.

Binary items contain additional parameters to indicate a signed value, LSB position, LSB resolution, offset, minimum and maximum value, and an ASCII string that contains the parameter name and format specifier. Binary engineering units are calculated using the formula below:

$$result = (dataword[word\_number] >> lsb\_pos) \times lsb\_value + offset$$

An example of an Engineering group showing each of the three engineering units is shown below:

```
define_eng_unit_group:
    group_enab:      enable
    disp_enab:       disable
    group_name:      lgcu bite
    group_type:      receive
    define_eng_unit_item:
        item_enab:   enable
        item_type:   discrete
        bus_num:     2
        cid:         2
        label:       F6F
        word_num:    3
        bit_pos:     6
        norm_val:    0
        state_0:     RBTB_AUX CLOSED
        state_1:     RBTB_AUX OPEN
    end_define:
    define_eng_unit_item:
        item_enab:   enable
        item_type:   coded
        bus_num:     1
        cid:         2
        label:       F71
        word_num:    3
        lsb_pos:     0
        num_bits:    2
        norm_val:    0
        state_0:     OIL_LEVEL NORMAL
        state_1:     OIL_LEVEL SERVICE
        state_2:     OIL_LEVEL INVALID
        state_3:     OIL_LEVEL INVALID
    end_define:
    define_eng_unit_item:
        item_enab:   enable
        item_type:   binary
        bus_num:     1
        cid:         2
        label:       F71
        word_num:    4
        sign_enab:   enable
        lsb_pos:     0
        lsb_res:     0.03125
        offset:      0.0
        min:         375.0
        max:         425.0
        name_frmt:   POR_FREQ %8.1 f
    end_define:
end_define:
```

In order to make engineering unit data more accessible by the ATE stand through the test language, such as ATL, an new parameter, item_name can be added to the structure. This serves as the base name of the parameter and the appropriate state text is appended to it during display. Configuration files may use either the new or old method but old definitions are automatically converted to the new format when loaded. Here are the same engineering unit definitions in the new format.

```
define_eng_unit_group:
    group_enab:      enable
    disp_enab:       disable
    group_name:      lgcu bite
    group_type:      receive
    define_eng_unit_item:
        item_enab:   enable
```

```
                item_type:      discrete
                item_name:      RBTB_AUX
                bus_num:        2
                cid:            2
                label:          F6F
                word_num:       3
                bit_pos:        6
                norm_val:       0
                state_0:        CLOSED
                state_1:        OPEN
        end_define:
        define_eng_unit_item:
                item_enab:      enable
                item_type:      coded
                item_name:      OIL_LEVEL
                bus_num:        1
                cid:            2
                label:          F71
                word_num:       3
                lsb_pos:        0
                num_bits:       2
                norm_val:       0
                state_0:        NORMAL
                state_1:        SERVICE
                state_2:        INVALID
                state_3:        INVALID
        end_define:
        define_eng_unit_item:
                item_enab:      enable
                item_type:      binary
                item_name:      POR_FREQ
                bus_num:        1
                cid:            2
                label:          F71
                word_num:       4
                sign_enab:      enable
                lsb_pos:        0
                lsb_res:        0.03125
                offset:         0.0
                min:            375.0
                max:            425.0
                format:         % 8.1 f
        end_define:
end_define:
```

Digital input ports are defined by specifying a port enable flag, the port name, the I/O address, the update rate for the port, and an update enable flag. The port definition also contains definitions for up to eight input bits. These definitions contain the bit number, a bit enable flag, the name of a variable to hold the input data, the input mode (normal, delay, always_on, always_off), and the values the variable takes when the input bit is off and on. There are four modes of operation for an input bit: normal, delay, always_on, and always_off. The normal mode will change the variable defined for the bit when the bit changes state. The delay mode will change the variable after the bit has changed state for the time specified in the delay time parameter. If the bit changes state and changes again prior to the time limit specified by delay time, the variable does not change value. This permits input ports to be debounced easily. Always_on and always_off modes permit the operator to simulate a failure. An example of a digital input port definition is shown below:

```
define_digital_input_port:
        port_enab:      enable
        port_name:      DIO-32B PORT A
        port_addr:      280
        update_rate:    10
        update_enab:    enable
        define_bit_num: 0
                bit_enab:       enable
                var_name:       RIGHT_BTS
                input_mode:     normal
                off_becomes:    0
                on_becomes:     1
        end_define:
        define_bit_num: 1
                bit_enab:       enable
                var_name:       RIGHT_GCS
                input_mode:     delay
                off_becomes:    0
                on_becomes:     1
                delay_time:     50
        end_define:
end_define:
```

Definitions of digital output ports are similar to those for digital input ports and operate in a similar manner with the following exception. The output bit is driven to a value based on the value of the variable which is typically an equation result. A example definition of a digital input port is shown below:

```
define_digital_output_port:
        port_enab:      enable
        port_name:      DIO-32B PORT C
        port_addr:      282
        update_rate:    10
        update_enab:    enable
        define_bit_num: 0
                bit_enab:       enable
                var_name:       RIGHT_GEN
                init_val:       0
                output_mode:    normal
                nzero_becomes:  on
        end_define:
end_define:
```

The definition for an analog input card consist of the card enable field, the name of the analog input card, and the card address. Each of the input channels are defined further by a channel enable flag, a variable name to hold the converted input value, the input mode (normal, filter, or preset), the update rate (in ms), an update enable flag, the engineering values at 0 volts and 10 volts, and a filter constant or preset constant if applicable. An example of a analog input definition follows.

```
define_analog_input_card:
        card_enab:      enable
        card_name:      RTI-800
        card_addr:      2A0
        define_channel: 0
                chan_enab:      enable
                var_name:       RT_IDG_RPM
                input_mode:     filter
                update_rate:    50
                update_enab:    enable
                eu_at_0v:       4000.0
                eu_at_10v:      9500.0
                filter:         10.0
        end_define:
end_define:
```

The configuration file may also define named parameters. A named parameter is a user variable with an associated menu, toggle, or numeric entry routine allowing flexible on-screen controls. The named parameters function by initializing a variable that is used by one or more equations to control ARINC 629 transmit data, or digital outputs. Named parameters are defined in groups that form display windows. The definition of a named parameter group includes a group enable flag, a display enable flag, an update enable flag, the name of the group, and definitions for each named parameter item in the group. The update enable field controls whether the group is periodically updated, or is updated only when a user selection is made. This permits display of named values controlled manually, by equations, or by the ATE stand and permits momentary and latched parameters. There are three different types of named parameters:

| | |
|---|---|
| menu | the user may chose a selection from a menu of possible states |
| toggle | the user may toggle the selection between two defined values. |
| numeric | the user can enter a numeric value within a specified range. |

All named parameter item definitions contain a variable name, variable type, the entry mode (menu, toggle, or numeric), and an initial value. If the entry mode is menu, the state count and the text for each choice is provided. When the user selects an option from the menu, the variable is set to the a value corresponding to its order in the menu. Named parameters with the entry mode of toggle are similar with the exception that only two choices are allowed and the corresponding values can be any two integers. Numeric named parameters specify the minimum and maximum limits and display format for a numeric entry from the keyboard. The following are some examples.

```
define_named_param_group:
    group_enab:        enable
    disp_enab:         disable
    update_enab:       enable
    group_name:        engine
    define_named_param_item:
                       item_enab:     enable
                       var_name:      ENGINE_TYPE
                       var_type:      integer
                       entry_mode:    menu
                       state_cnt:     4
                       state_0:       PW
                       state_1:       GE
                       state_2:       RR
                       state_3:       INVLD
                       cur_val:       0
    end_define:
    define_named_param_item:
                       item_enab:     enable
                       var_name:      LT_DELTA_PRESSURE
                       var_type:      integer
                       entry_mode:    toggle
                       val_state_0:   0, NORMAL
                       val_state_1:   1, BYPASS
                       cur_val:       0
    end_define:
```

-continued

```
    define_named_param_item:
                       item_enab:     enable
                       var_name:      LT_IDG_OIL_IN_TEMP
                       var_type:      float
                       entry_mode:    numeric
                       format:        % 6.2 f
                       min:           −65.0
                       max:           210.0
                       cur_val:       80.0
    end_define:
end_define:
```

The configuration file may also contain definitions for additional variables to help simplify user equations. This allows the user to compute an intermediate value that may be used in other equations. Variables consist of two types: integer, and floating point values. An example variable definition in the configuration file follows:

```
define_variable:
    var_name:       ENG_100_PCNT
    var_type:       float
    init_val:       9332.0
end_define:
```

Macro definitions may also be contained in the configuration file. Macros are used to associate a name with some other text. If a macro name is encountered while parsing an equation, the text of the macro is substituted for the name. An example macro definition is

```
define_macro:
    name:           open
    stands_for:     0
end_define:
```

The configuration file may also contain definitions for equation groups. An equation group consists of one or more equations that will be calculated together. Each equation group includes a group enable flag, a group name, the update rate (in ms), and an update enable flag which controls whether or not the equation group is calculated. An equation group may optionally contain the name of a gate variable that is used to enable (variable>0) or disable (variable=0) the equation group thus allowing dynamic control of group execution. Each equation group defines one or more equations by specifying an equation enable flag and the ASCII text of the equation. The equations may contain the '\' character as the last character of a line to permitting long equations to cover multiple lines if necessary. An example of the equation definition follows:

```
define_equation_group:
    group_enab:     enable
    group_name:     rt_engine_equations
    update_rate:    50
    update_enab:    enable
    gate_var:       DYNAMIC_CONTROL
    define_equation:
                    eq_enab:     enable
```

-continued

```
              equation:    ARINC[TX,2,2,FDB,3,U] = \
                           ARINC[TX,2,2,FDB,3,U] & 0x9FFF | \
                           (ENGINE_TYPE < < 13)
    end_define:
    define_equation:
              eq_enab:     enable
              equation:    RT_ENG_PCNT = RT_IDG_RPM/ \
                           GEAR_RATIO / ENG_100_PCNT
    end_define:
    define_equation:
              eq_enab:     enable
              equation:    ARINC[TX,2,2,FDB,4,S] = \
                           ((int(RT_ENG_PCNT / 0.015625)) < < 1)
    end_define:
end_define:
```

The configuration file, with the exception of equations, is parsed by the load configuration process and loaded into data structures in the database. The equations are parsed by the equation process after the database is loaded.

Monitor Setup Files

The monitor files 178 (see FIG. 3) are ASCII text files that define the conditions the user wishes to monitor. For each condition, the user specifies the bus number, channel ID, label, word number, parameter name, condition type, trip condition, and a bit specifier or binary limits. The num_words and begin_at fields allow a snapshot of up to ten datawords in the wordstring to be captured when the event is detected. Monitor setup file names end with a .mon suffix. The user may specify the following types of conditions:

| | |
|---|---|
| Discrete | Bit or bits equal to, or not equal to an expected value |
| Binary | Numeric value in or out of tolerance limits |
| Fresh | Change of state detection |
| Not Fresh | Values that have not changed within a given time frame. |
| Received | Values which have been received. |

The following are some possible monitoring condition definitions:

```
define_monitor_condition:
    cond_enab:     enable
    bus_num:       all
    cid:           1
    label:         F6F
    word_num:      1
    param_name:    SYSTEM_STATUS
    cond_type:     discrete
    trip_if:       not_equal
    bitspec:       00000000XXXXXXXX (X = Don't care)
    num_words:     10
    begin_at:      1
end_define:
define_monitor_condition:
    cond_enab:     enable
    bus_num:       1
    cid:           8
    label:         F6C
    word_num:      5
    param_name:    PEP_VOLTAGE
    cond_type:     binary
    trip_if:       out_of_tol
    sign_enab:     enable
    lsb_pos:       0
    lsb_res:       0.09699
    offset:        0.0
    min:           114.0
```

-continued

```
    max:           116.0
end_define:
define_monitor_condition:
    cond_enab:     enable
    bus_num:       2
    cid:           2
    label:         F6F
    word_num:      4
    param_name:    RGCB_AUX
    cond_type:     freshness
    trip_if:       fresh
    bitspec:       1B3
    num_words:     10
    begin_at:      1
end_define:
define_monitor_condition:
    cond_enab:     enable
    bus_num:       1
    cid:           5
    label:         500
    word_num:      2
    param_name:    LABEL_500_Fresh
    cond_type:     freshness
    trip_if:       not_fresh
    bitspec:       1111XXXXXXXXXXXX
    max_update:    40
end_define:
define_monitor_condition:
    cond_enab:     enable
    bus_num:       2
    cid:           3
    label:         300
    word_num:      1
    param_name:    LABEL_300
    cond_type:     discrete
    trip_if:       received
    bitspec:       XXXXXXXXXXXXXXXX
    num_words:     10
    begin_at:      1
end_define:
```

The user may also specify an event storage mode and a file size limit. The allowed storage modes are:

| | |
|---|---|
| All | All events are stored |
| New | Store new events but not consecutive occurrences of the same event |
| First | Store the first event of each condition |
| None | Do not store events but continue to count and annunciate events |

An example of the structure is shown below:
define_monitor_setup:

```
store_mode:    all
file_limit:    1000
end_define:
```

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A data communication analysis and simulation tool capable of simulating in real time the communication data transmissions and communication data responses of at least one line replaceable unit communicating on at least one communication bus with at least one line replaceable unit under test, comprising:
   a computer operating under a real time operating system, said computer having available memory and means for accepting user input;
   a programmed simulator resident in said computer, said programmed simulator comprising a plurality of processes to effectuate the simulation of the communication data transmissions and communication data responses of at least one line replaceable unit, said programmed simulator allocating a portion of said available memory as a shared memory segment serving as a central database and supporting inter-process communication, said programmed simulator further generating graphical and textural images in response to communicated data from the at least one line replaceable unit under test and user input;
   a monitor coupled to said computer for displaying graphical and textural images generated by said programmed simulator;
   at least one communication protocol interconnect module coupled to said simulator; and wherein
      said simulator configures said communication protocol interconnect module to enable said simulator to communicate using a specific communication protocol as used by the at least one line replaceable unit under test;
      means for inputting at least one user defined configuration file to said programmed simulator for use thereby, said configuration file containing data and rules which are specific to the line replaceable unit under test and parameters required during a particular test to be performed; and wherein
         said programmed simulator automatically updates said communicated data based on said rules in said configuration file.

2. The data communication analysis and simulation tool of claim 1, wherein said programmed simulator utilizes a user defined monitor file which defines a plurality of data conditions the user wishes to monitor, and wherein said programmed simulator monitors the communicated data from the line replaceable unit under test and generates graphical and textural displays in response thereto.

3. The data communication analysis and simulation tool of claim 2, further comprising at least one external signal conditioning module coupled to said computer for communicating information from a plurality of external signals to said programmed simulator, and wherein said programmed simulator monitors said information against said communicated data and generates a graphical and textural display in response thereto.

4. The data communication analysis and simulation tool of claim 3, wherein at least one of said at least one external signal conditioning module is a digital input/output card communicating external digital information with said programmed simulator, and wherein said programmed simulator drives digital output signals, modifies said communicated data, and generates graphical and textural images in response to a relationship between said external digital information and said communicated data.

5. The data communication analysis and simulation tool of claim 3, wherein at least one of said at least one external signal conditioning module is an analog input card communicating external analog information with said programmed simulator, and wherein said programmed simulator modifies said communicated data and generates graphical and textural images in response to a relationship between said external analog information and said communicated data.

6. The data communication analysis and simulation tool of claim 3, wherein said graphical and textural images comprise hexadecimal data displays of received and transmitted communication data.

7. The data communication analysis and simulation tool of claim 3, wherein said graphical and textural images comprise engineering unit data displays of received and transmitted communication data converted by said programmed simulator as defined in the user defined monitor file.

8. The data communication analysis and simulation tool of claim 1, wherein said programmed simulator generates freshness counters to maintain validity of the simulated transmissions, and wherein said programmed simulator creates invalid data by changing transmit schedules of the simulated transmissions.

9. The data communication analysis and simulation tool of claim 1, further comprising an Ethernet interface card coupled to said computer for allowing communication over an Ethernet network, and wherein said programmed simulator further comprises an automatic test equipment interface process to permit interface to an external automatic test equipment stand, said automatic test equipment interface process enabling automation of functions within said programmed simulator.

10. The data communication analysis and simulation tool of claim 1, wherein said at least one communication protocol interconnect module is an ARINC 629 card allowing bi-directional real-time communication using the ARINC 629 communication protocol.

11. The data communication analysis and simulation tool of claim 10, wherein said programmed simulator generates a receive personality table and a transmit personality table based on the data contained in the configuration file to configure said ARINC 629 card to allow proper reception and transmission of said simulated data transmissions.

12. The data communication analysis and simulation tool of claim 1, wherein one of said plurality of processes of said programmed simulator allows a user to alter an operating configuration of said programmed simulator as originally defined by the user defined configuration file.

13. The data communication analysis and simulation tool of claim 12, wherein said programmed simulator saves a current operating configuration to a reloadable configuration file to enable a user to continue or repeat a test configuration at another time.

14. The data communication analysis and simulation tool of claim 13, wherein said programmed simulator saves a current operating configuration to a diagnostic dump file.

15. The data communication analysis and simulation tool of claim 12, wherein said programmed simulator generates a graphical user interface, and wherein said user alteration of an operating configuration is effectuated by said graphical user interface.

16. A data communication analysis and simulation tool capable of simulating in real time the communication data transmissions and communication data responses of at least one line replaceable unit communicating on at least one communication bus with at least one line replaceable unit under test, comprising:

a computer operating under a real time operating system, said computer having available memory and means for accepting user input;

a programmed simulator resident in said computer, said programmed simulator comprising a plurality of processes to effectuate the simulation of the communication data transmissions and communication data responses of at least one line replaceable unit, said programmed simulator allocating a portion of said available memory as a shared memory segment serving as a central database and supporting inter-process communication, said programmed simulator further generating graphical and textural images in response to communicated data from the at least one line replaceable unit under test and user input;

a monitor coupled to said computer for displaying graphical and textural images generated by said programmed simulator;

at least one communication protocol interconnect module coupled to said simulator; and wherein said simulator configures said communication protocol interconnect module to enable said simulator to communicate using a specific communication protocol as used by the at least one line replaceable unit under test;

means for inputting at least one user defined configuration file to said programmed simulator for use thereby, said configuration file containing data and rules which are specific to the line replaceable unit under test and parameters required during a particular test to be performed; and wherein said programmed simulator automatically updates said communicated data based on said rules in said configuration file, generates freshness counters to maintain validity of the simulated transmissions, and wherein said programmed simulator creates invalid data by changing transmit schedules of the simulated transmissions.

17. A data communication analysis and simulation tool for use in both line replaceable unit (LRU) and system level development, verification, and qualification testing, comprising:

first means for transmitting and receiving on one or more ARINC 629 buses;

second means connected to said first means for continuously monitoring bus, LRU, and label activity, as well as bus errors in real-time on said one or more ARINC 629 buses;

third means connected to said first means for continuously receiving and displaying LRU/system ARINC 629 outputs in hexadecimal and engineering units such as volts, amps, signal true/false, and breaker open/closed, said third means displaying said ARINC 629 outputs with color highlighting of state changes and when tolerances are exceeded;

fourth means connected to said first means for continuously transmitting LRU/system ARINC 629 inputs in hexadecimal and engineering units such as air/ground, autoland request true/false, switch on/off status, said fourth means simulating data from many other LRUs thereby;

fifth means connected to said first means for monitoring hardware discrete and analog signals, said fifth means automatically driving corresponding transmit data to real values to suppress and test LRU/system responses thereto;

sixth means connected to said first means for monitoring received data, said sixth means driving corresponding hardware signals, said sixth means further providing automatic transmit data responses to instrument LRU/system status and to simulate reactions of other LRUs; and seventh means connected to said first means for maintaining validity of transmit data by updating freshness counters at expected rates, said seventh means further creating invalid data by changing transmit schedules, inhibiting freshness update, setting system status bits, and parameter validity bits, and by creating data/data or data/hardware disagreements.

18. The data communication analysis and simulation tool of claim 17, further comprising eighth means connected to said first means for continuously monitoring a plurality of ARINC 629 parameters in real time for change-of-state, out-of-tolerance, pattern match, and invalid and stale data conditions.

19. The data communication analysis and simulation tool of claim 18, further comprising ninth means connected to said tool for interfacing said tool to an automatic test equipment (ATE) stand to permit automation of ARINC 629 functions during LRU/system integration, qualification, and acceptance testing.

20. The data communication analysis and simulation tool of claim 19, further comprising tenth means connected to said first means for rapidly reconfiguring said tool for different LRU combinations and test stand configurations, said reconfiguration means providing automatic transmit personality table (XPT) and receive personality table (RPT) generation, user defined engineering unit conversions, user defined data monitoring conditions, and user defined real-time calculations relating transmit and receive data and hardware signals.

* * * * *